(12) United States Patent
Curt et al.

(10) Patent No.: US 7,669,061 B2
(45) Date of Patent: Feb. 23, 2010

(54) SYSTEM AND METHOD FOR PROVIDING FOR REMOTE MONITORING AND CONTROLLING OF VOLTAGE POWER TRANSMISSION AND DISTRIBUTION DEVICES

(75) Inventors: Walter Curt, Harrisonburg, VA (US); Glen Shomo, Harrisonburg, VA (US); Chris Mullins, Harrisonburg, VA (US); Wayne Bruffy, Mount Crawford, VA (US)

(73) Assignee: Power Monitors, Inc., Harrisonburg, VA (US)

( * ) Notice: Subject to any disclaimer, the term of this patent is extended or adjusted under 35 U.S.C. 154(b) by 170 days.

(21) Appl. No.: 10/958,684

(22) Filed: Oct. 6, 2004

(65) Prior Publication Data
US 2005/0273183 A1 Dec. 8, 2005

(51) Int. Cl.
*G06F 1/28* (2006.01)
*G06F 11/30* (2006.01)
*G01R 15/12* (2006.01)

(52) U.S. Cl. .................. 713/300; 713/310; 702/57; 702/188

(58) Field of Classification Search .............. 713/310, 713/300; 702/62, 57, 188; 700/286
See application file for complete search history.

(56) References Cited

U.S. PATENT DOCUMENTS

| 5,107,202 | A  | * | 4/1992  | Renda .......................... 324/96 |
| 5,752,046 | A  | * | 5/1998  | Oprescu et al. ............. 713/300 |
| 6,049,880 | A  | * | 4/2000  | Song ........................... 713/300 |
| 6,789,206 | B1 | * | 9/2004  | Wierzbicki et al. ......... 713/300 |
| 6,928,564 | B2 | * | 8/2005  | Tada et al. ................... 713/321 |
| 6,957,158 | B1 | * | 10/2005 | Hancock et al. ............... 702/61 |
| 2003/0046377 | A1 | * | 3/2003 | Daum et al. ................. 709/223 |
| 2004/0124247 | A1 | * | 7/2004 | Watters ....................... 235/492 |

* cited by examiner

*Primary Examiner*—Thuan N Du
(74) *Attorney, Agent, or Firm*—K&L Gates LLP

(57) ABSTRACT

The present invention provides a system and method for providing remote controlling of a power device. In architecture, the service device comprises a receiver circuitry that receives operating status data of the power device, and a data input circuitry accepts control information from a user. In addition, the transmitter circuitry transmits the control information to the power device. The present invention can also be viewed as a method for providing remote controlling of a power device. The method operates by acquiring an operating status data of the power device, and transmitting control information to the power device.

53 Claims, 46 Drawing Sheets

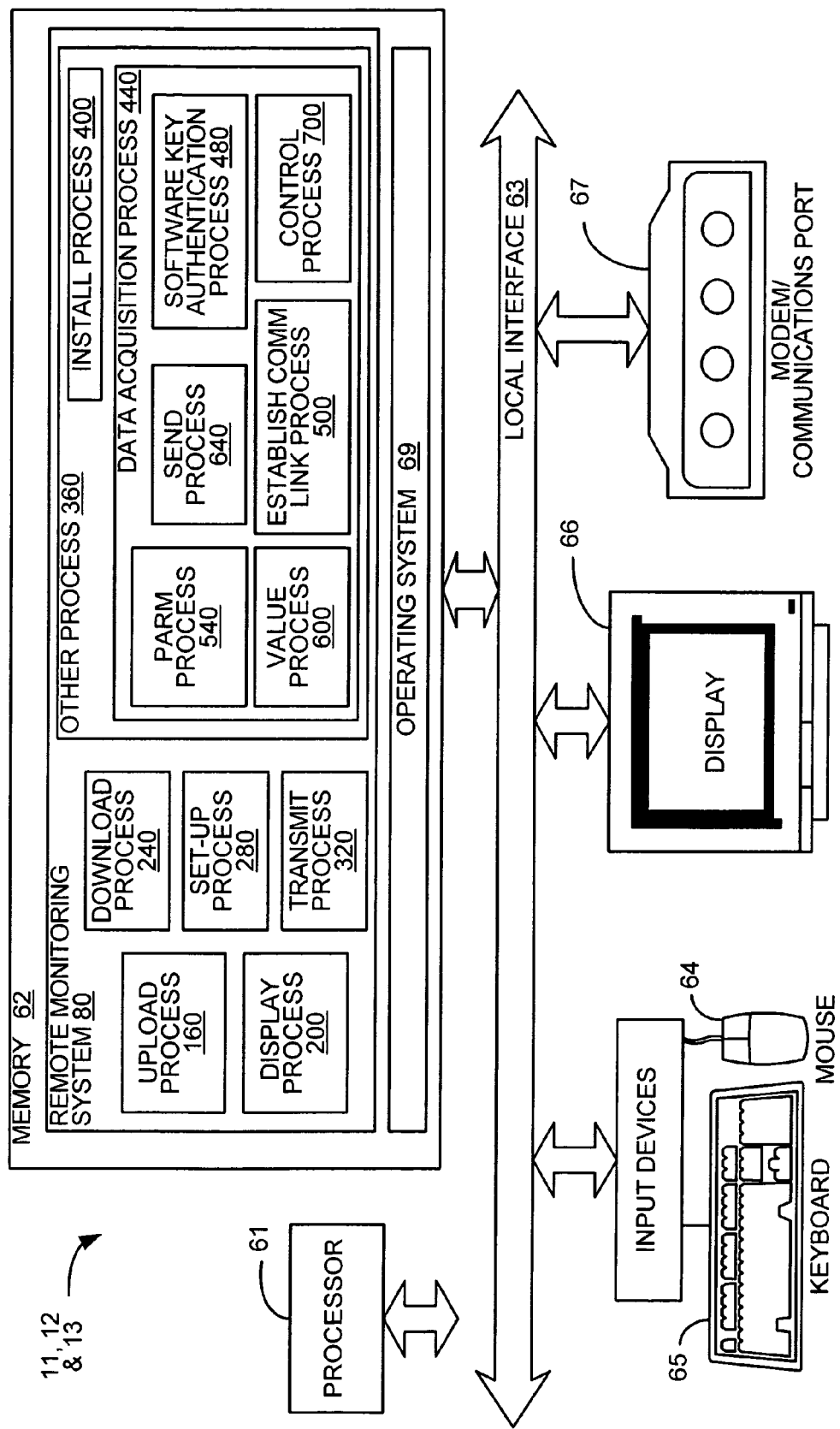

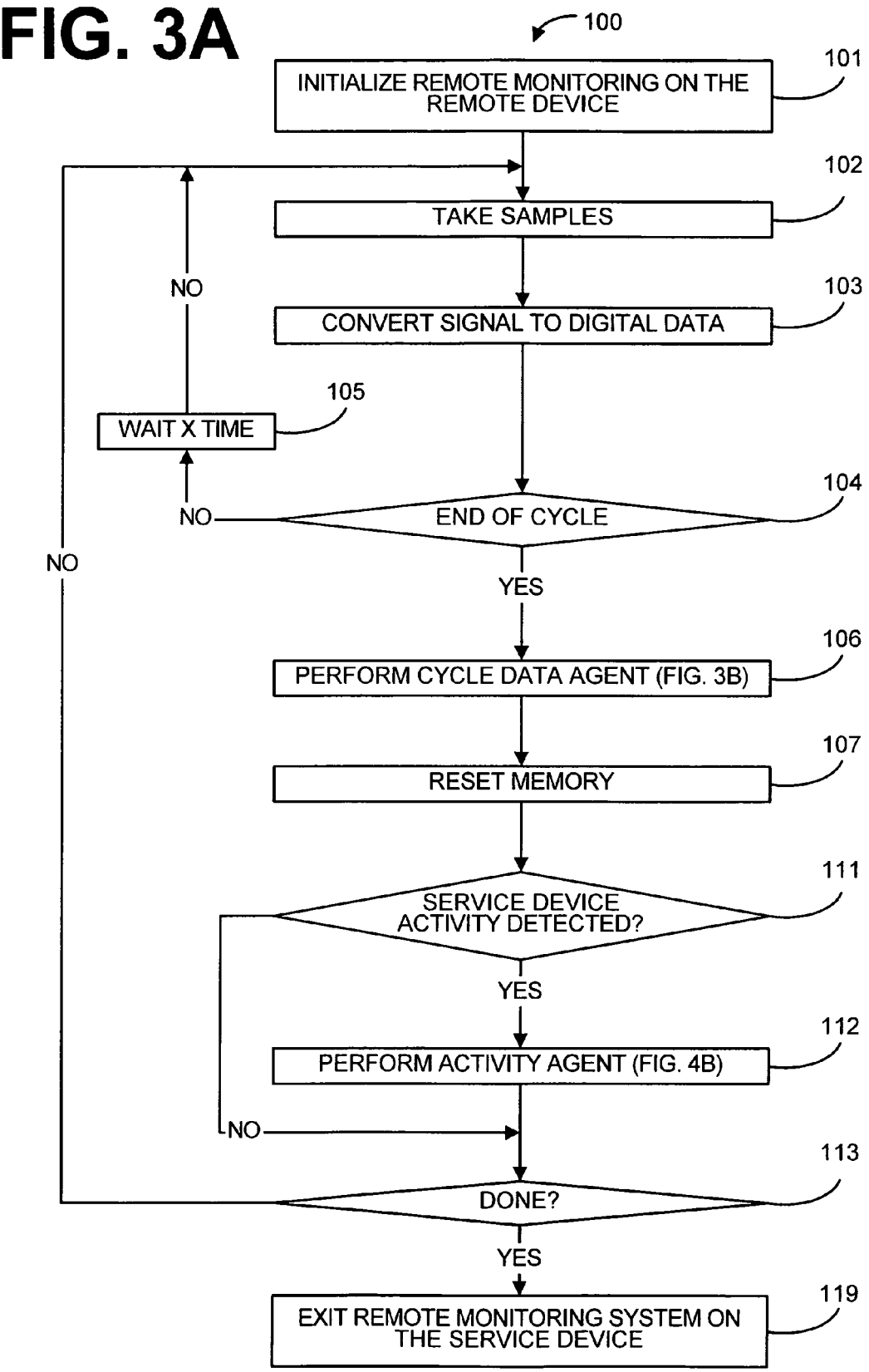

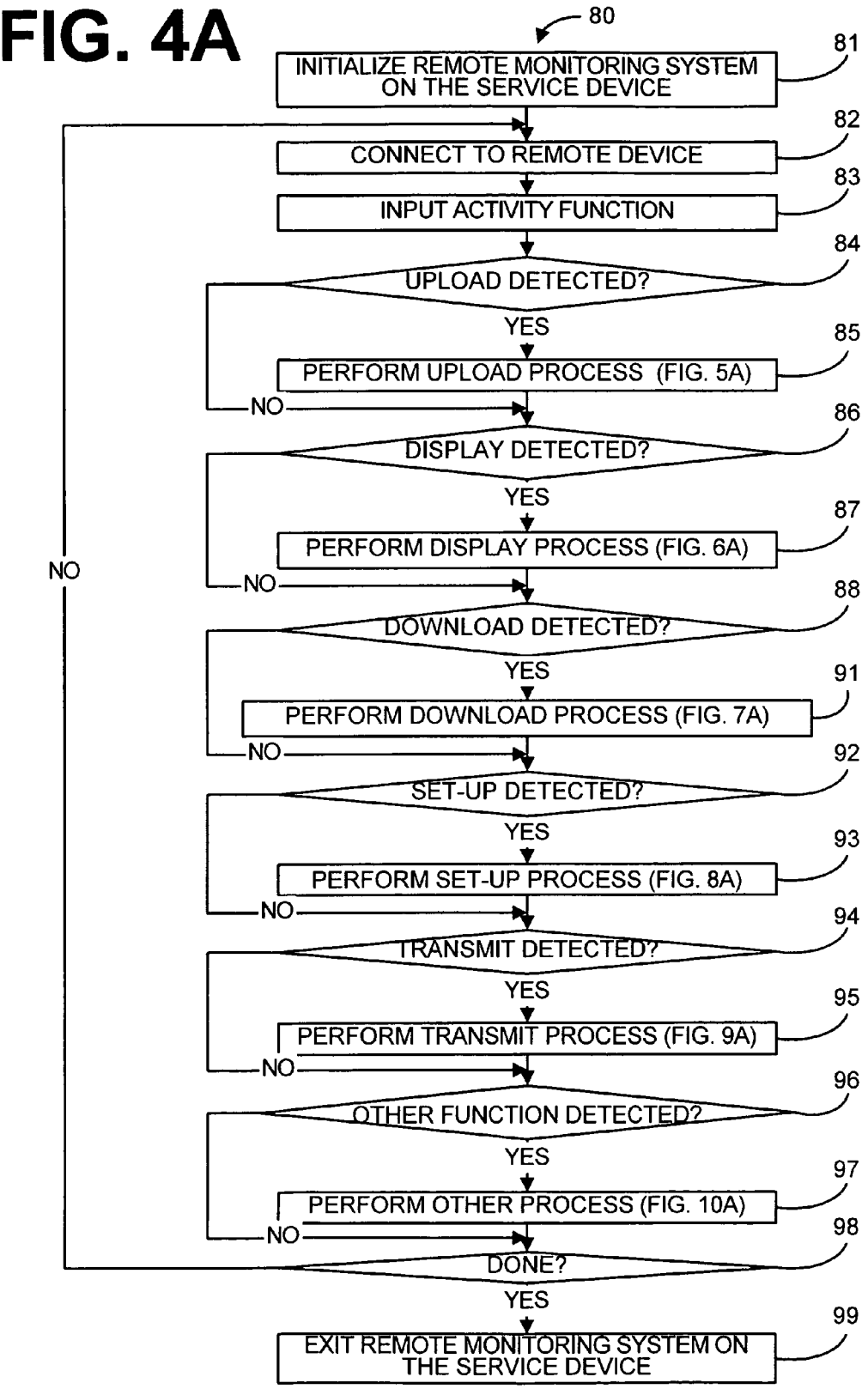

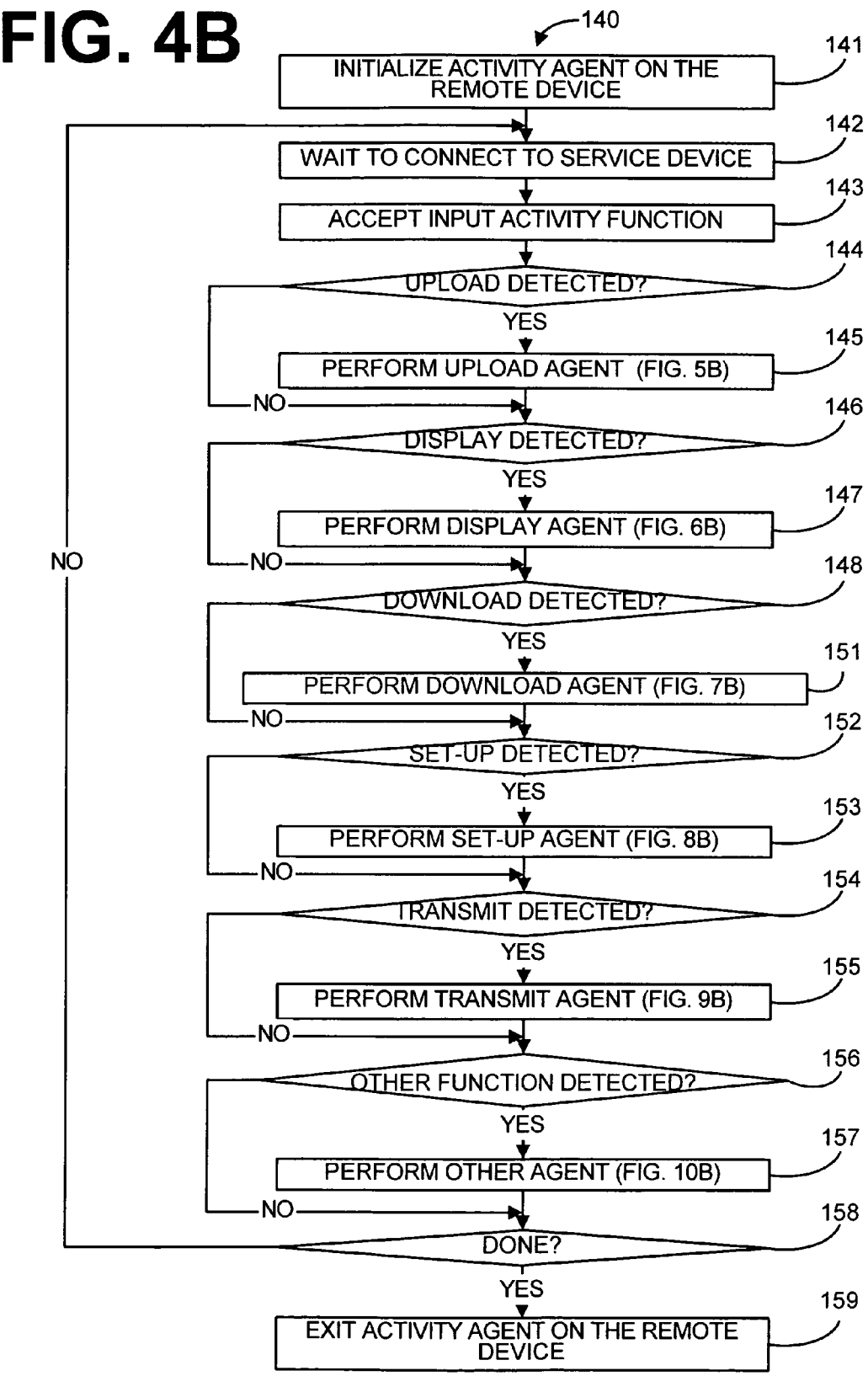

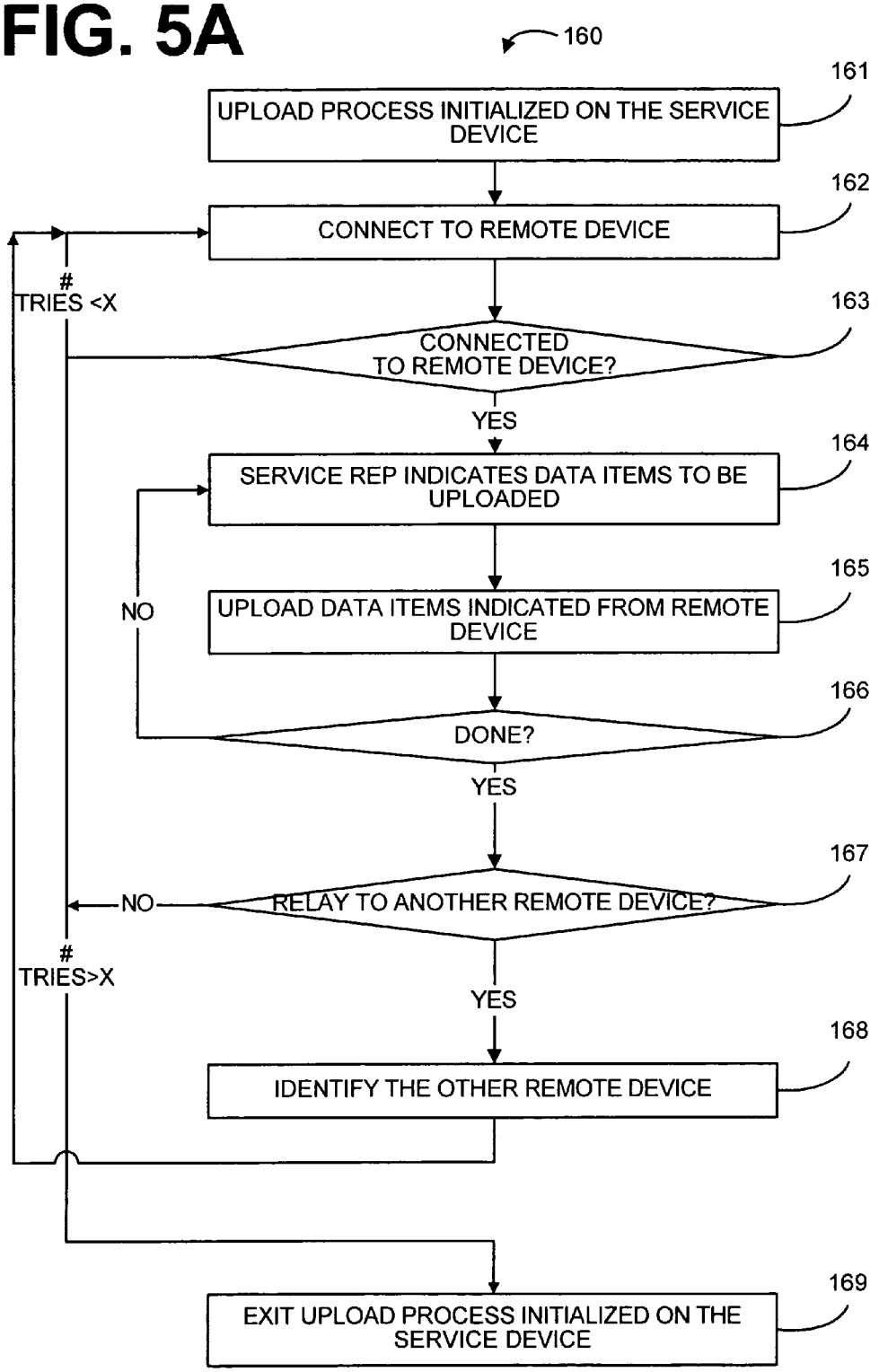

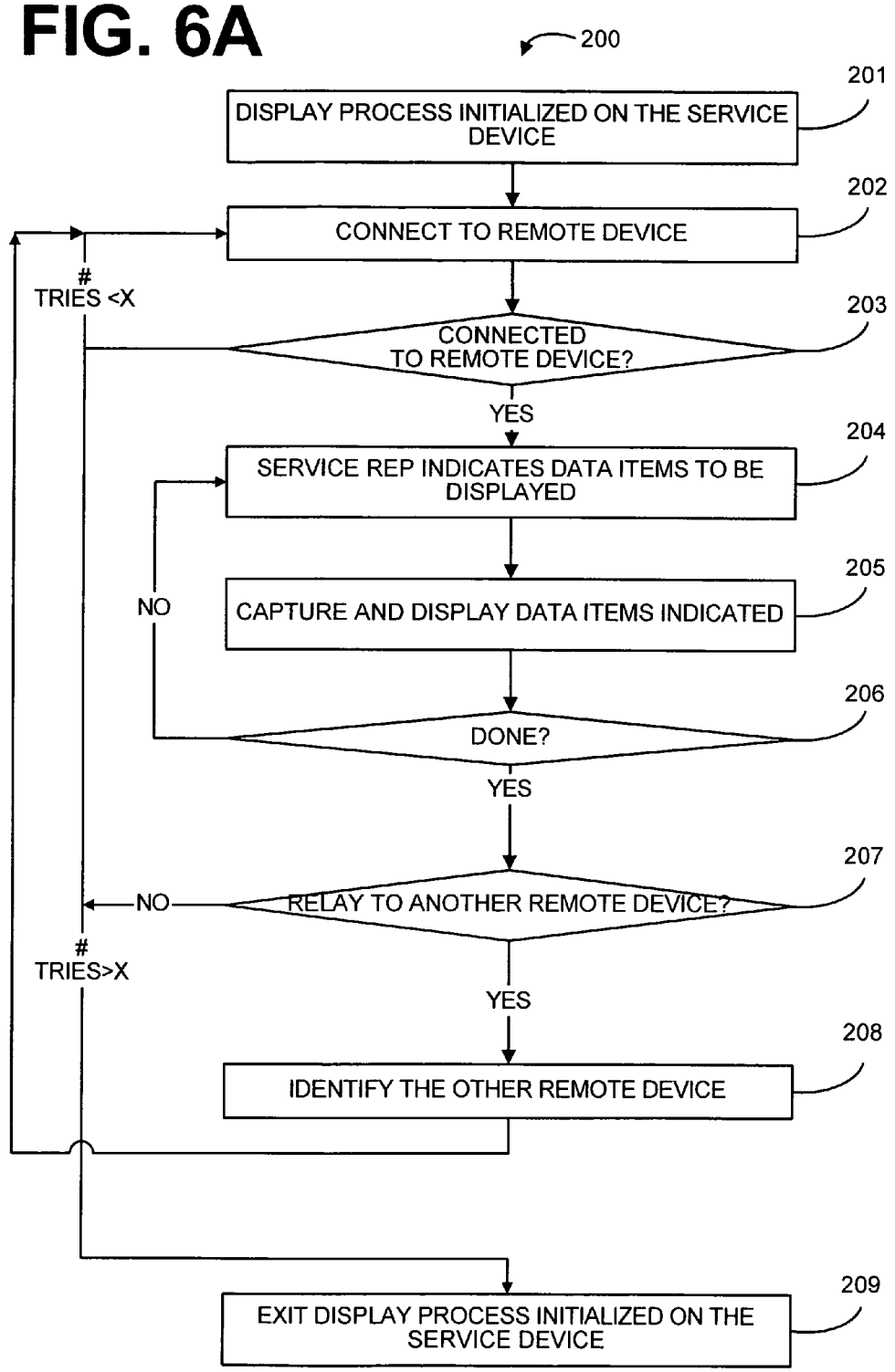

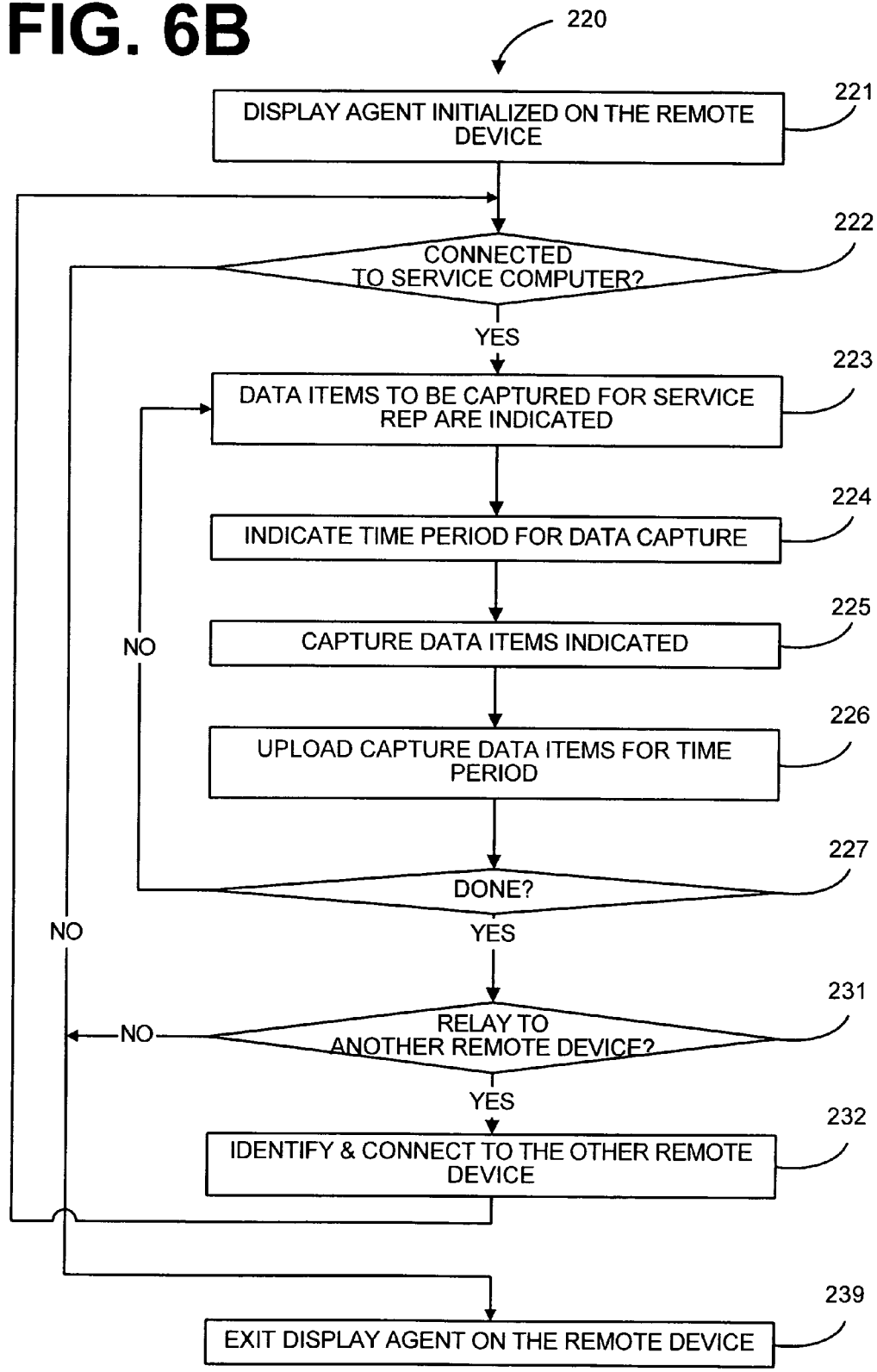

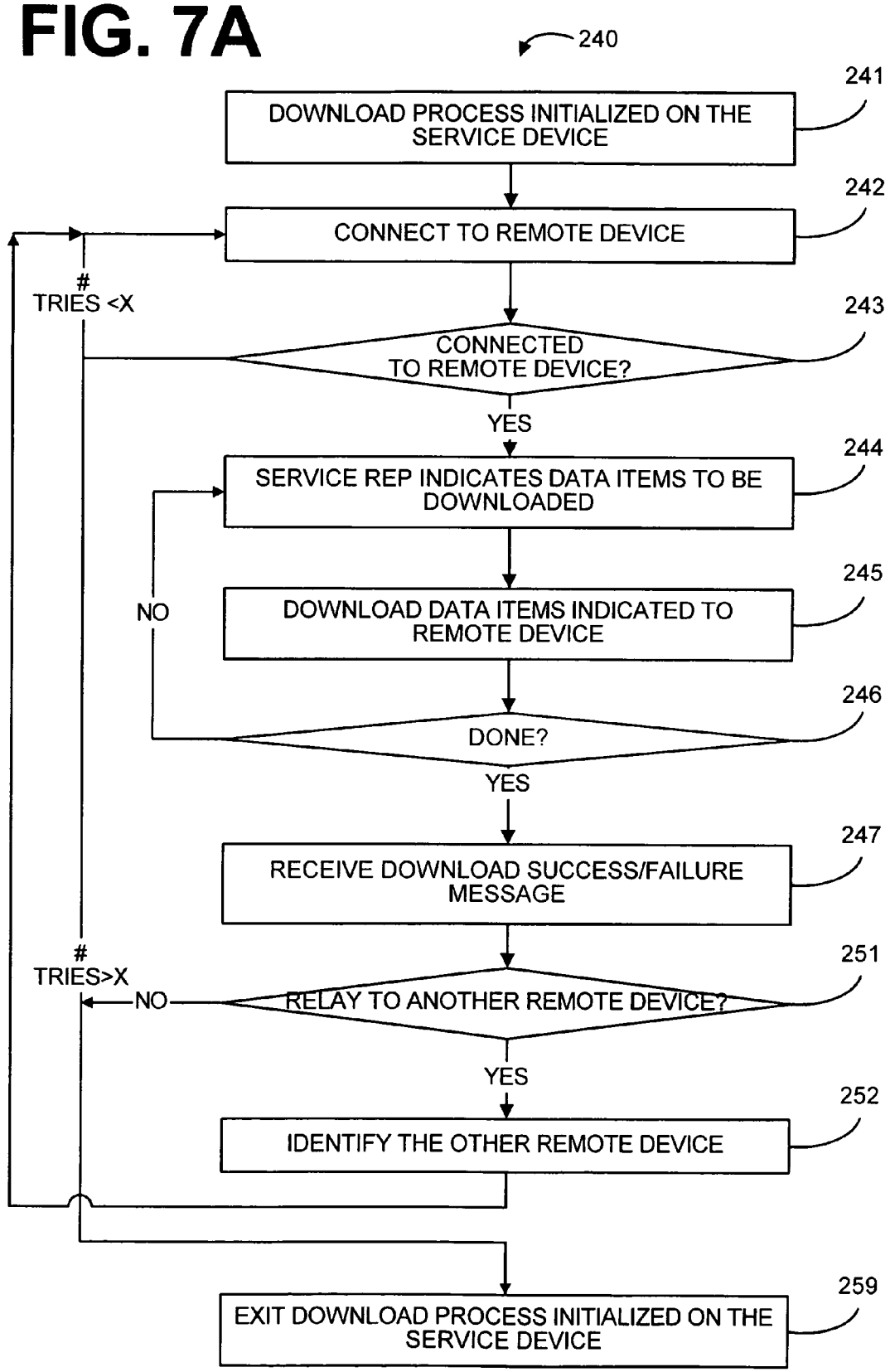

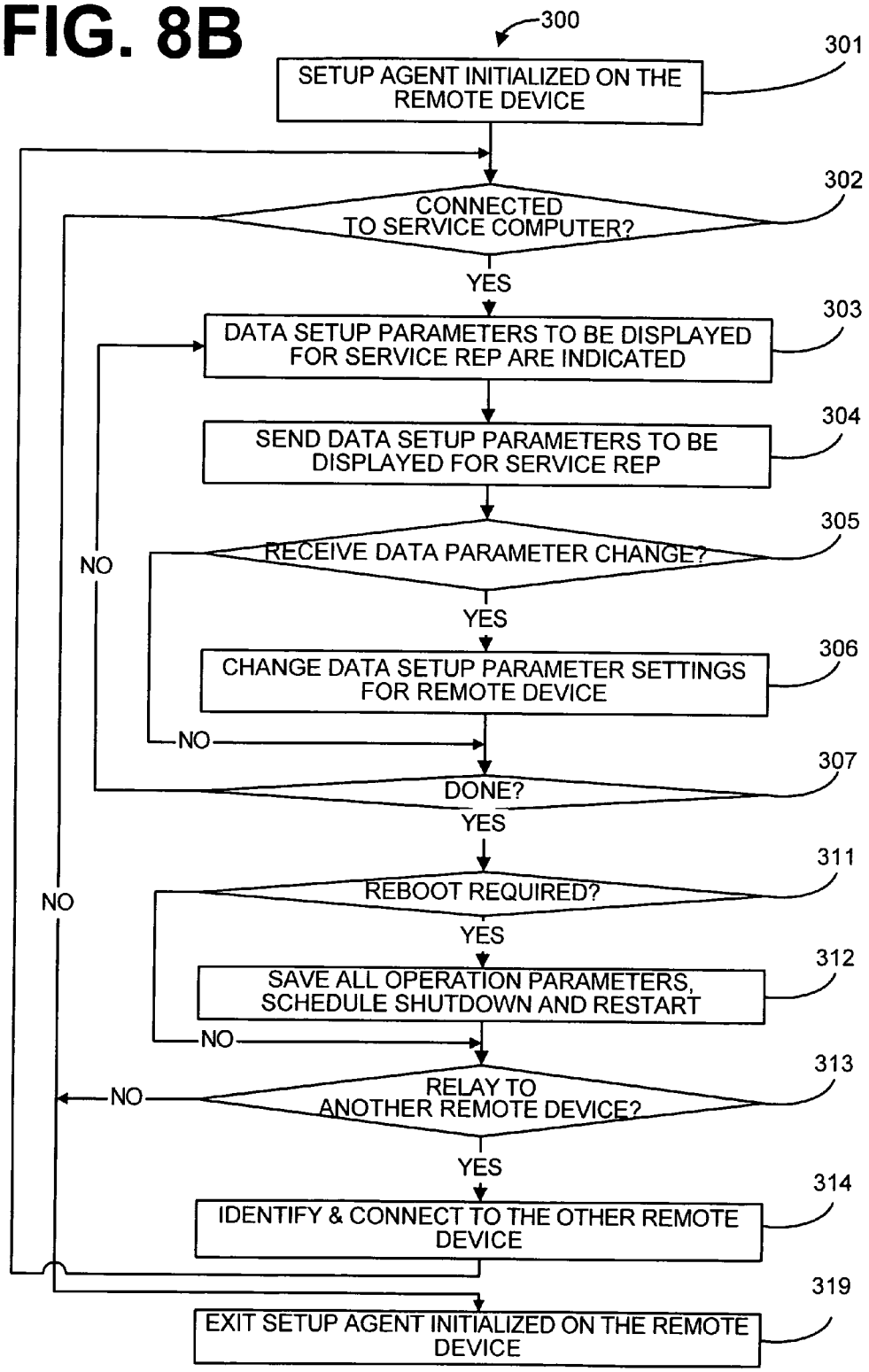

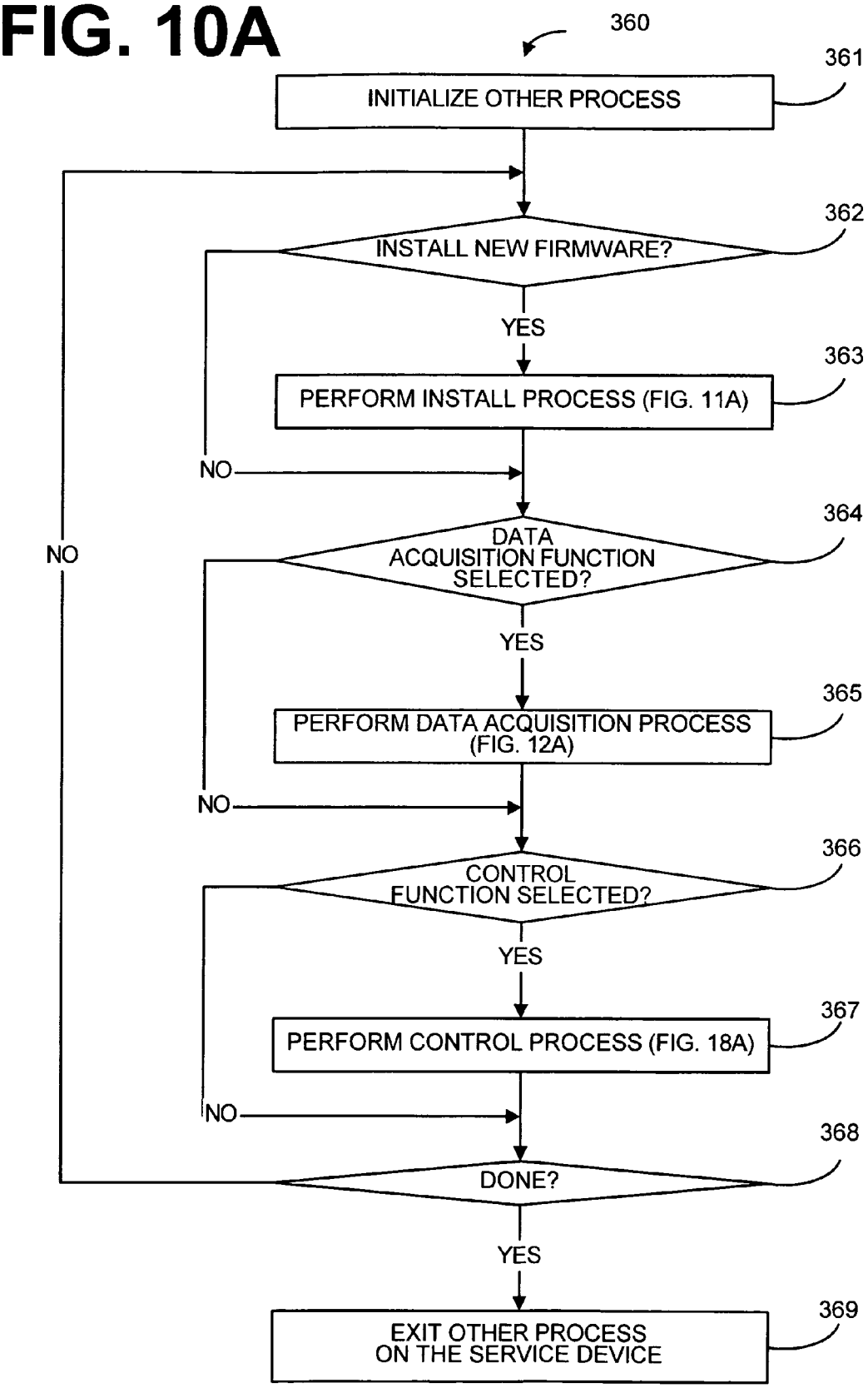

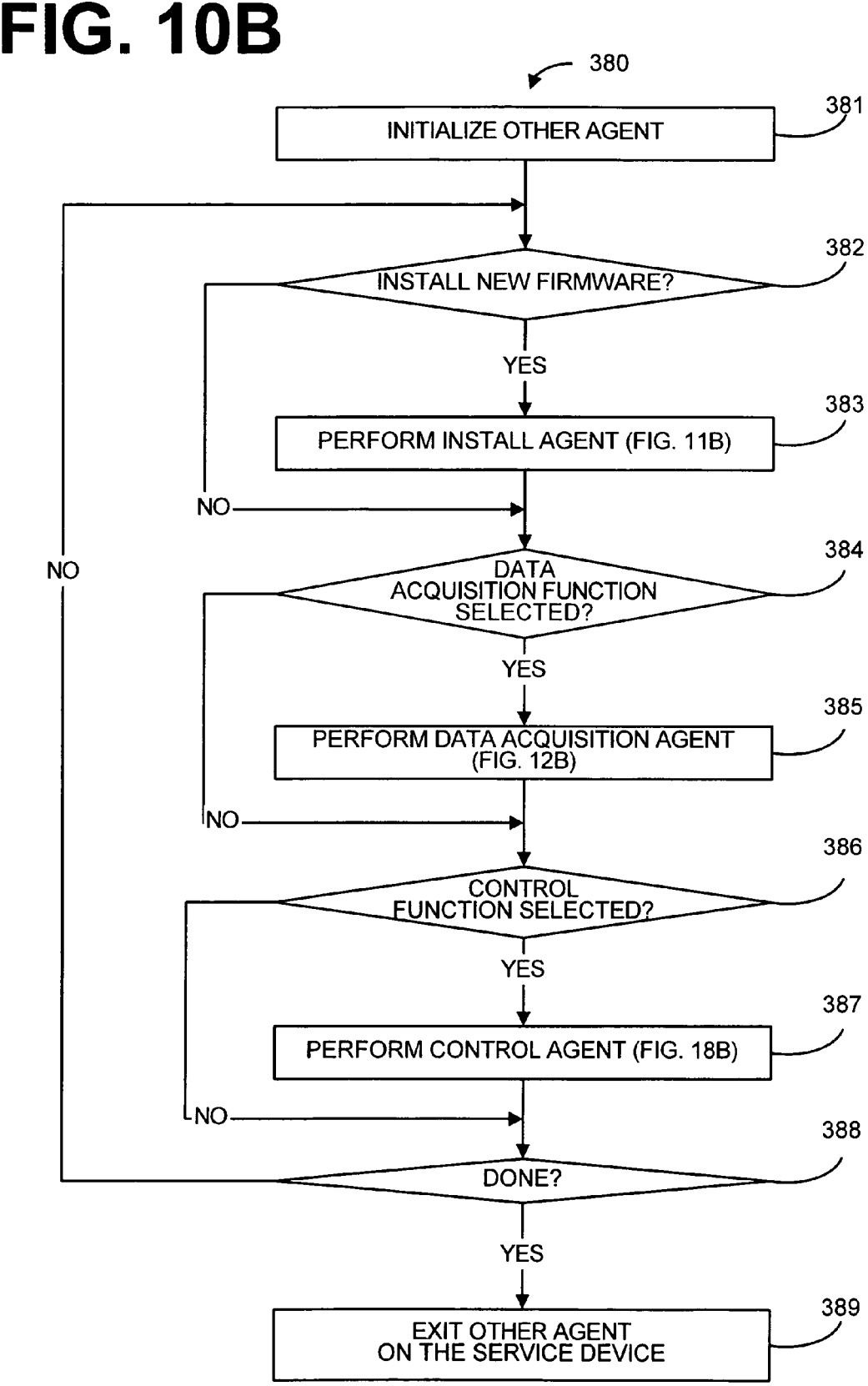

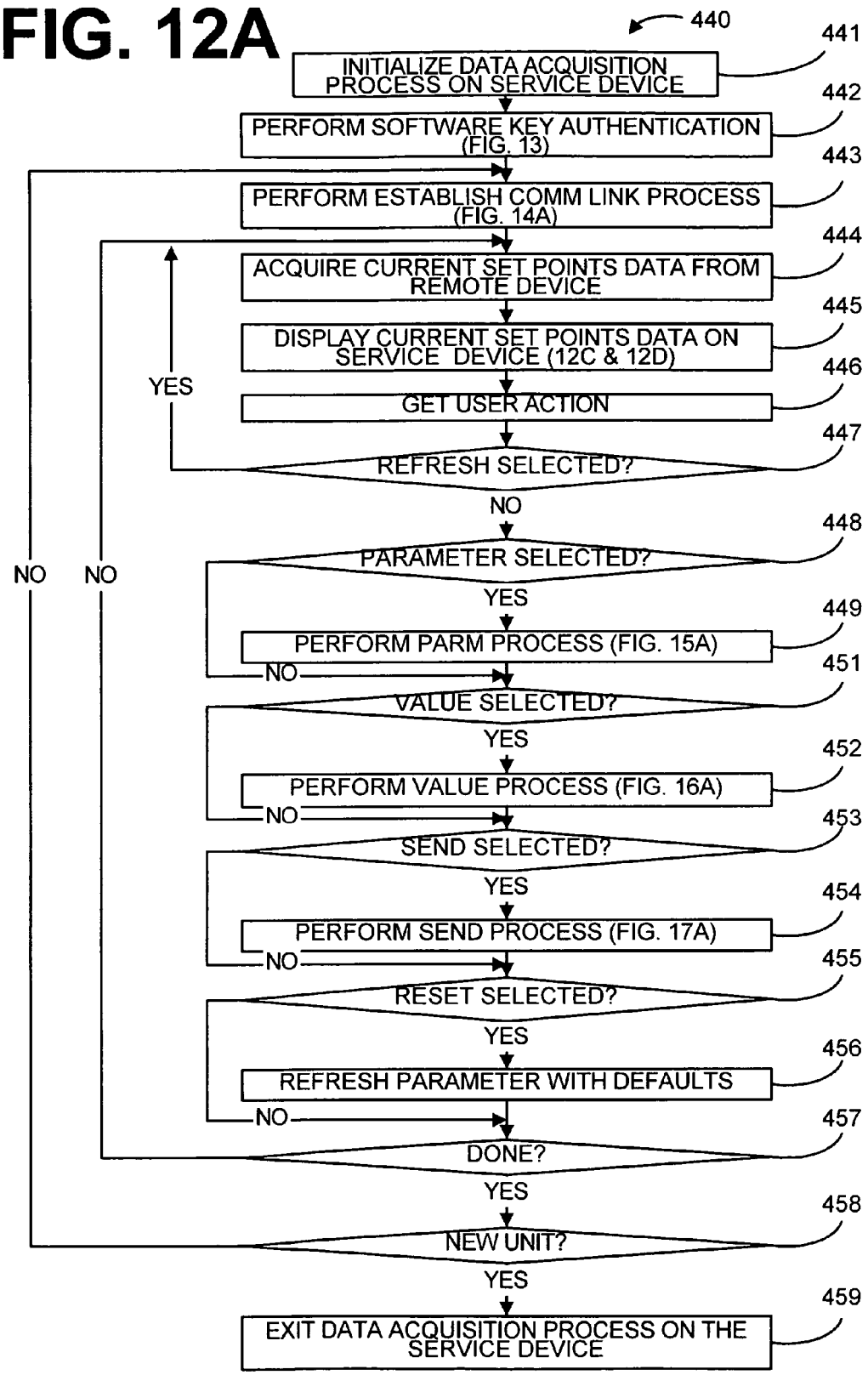

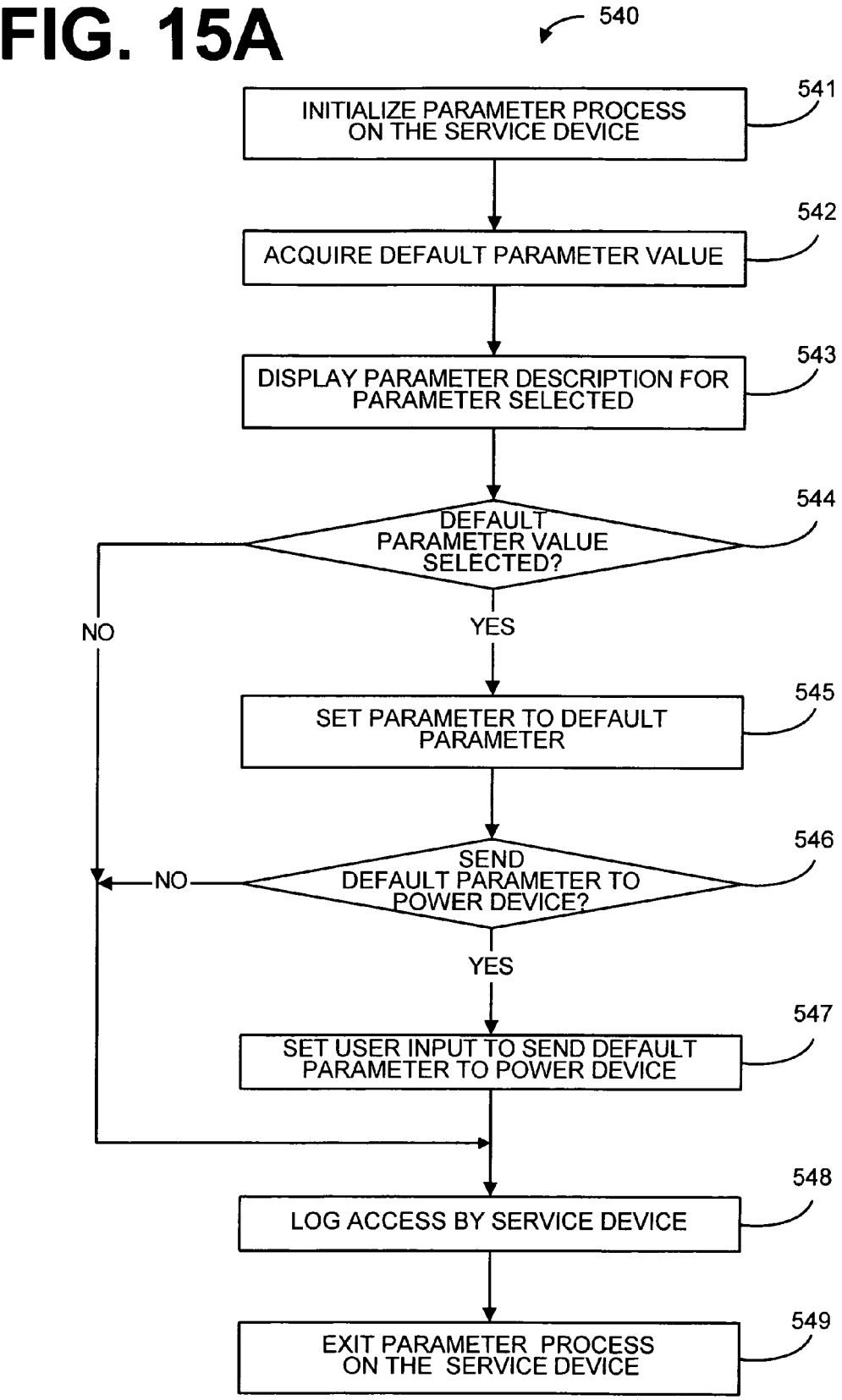

SYSTEM AND METHOD FOR PROVIDING FOR REMOTE MONITORING AND CONTROLLING OF VOLTAGE POWER TRANSMISSION AND DISTRIBUTION DEVICES

CROSS-REFERENCE TO RELATED APPLICATIONS

This application claims the benefit of U.S. patent application Ser. No. 10/920,460, still pending, filed on Aug. 18, 2004, entitled "A SYSTEM AND METHOD FOR PROVIDING REMOTE MONITORING OF VOLTAGE POWER TRANSMISSION AND DISTRIBUTION DEVICES", and U.S. Patent Application Ser. No. 60/508,379, filed on Oct. 6, 2003, entitled "A SYSTEM AND METHOD FOR PROVIDING REMOTE MONITORING AND CONTROLLING OF VOLTAGE POWER TRANSMISSION AND DISTRIBUTION DEVICES" both of which is incorporated by reference herein in its entirety.

COPYRIGHT NOTICE

A portion of the disclosure of this patent document may contain material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

TECHNICAL FIELD

The present invention relates to a method and system for maintaining operation of voltage power transmission devices, and more particularly, relates to a method and system for providing remote monitoring of a voltage power transmission and distribution devices.

BACKGROUND OF THE INVENTION

Conventional voltage, current and power analyzers have required many connections to a physically large recording box. Typically, access is required to an electrical panel or transformer case where the connections to the analyzer equipment can be made. In addition, physical access to the analyzer is required to view real-time measurements and status, as well as to extract recorded data.

For instance, often a communications cable and power cable are also required. This creates serious safety concerns for both the technician user, and for the manufacturer. The need to attach the communication and power cables to the analyzer generally have requires the technician to be in close proximity with the analyzer.

Safety issues include proximity to hazardous high voltages, technician exposure to confined locations (e.g. underground vaults), explosive atmospheres, etc. Frequently high voltage electrical power to the power system device being monitored must be removed before a technician is allowed to enter a confined area where a power analyzer may be located. Since this may disrupt electrical service to a large area, this is often impractical.

In addition, the large size of existing recorders, and the necessity for physical access to it later, can make it difficult to enclose and lock such conventional analyzing equipment in an electrical panel, network protector or transformer case. The result is that the panel, protector or transformer cover must be left off during an analyzing recording session. Obviously, this creates unsafe conditions by putting the technician and others at great risk of electrocution.

Moreover, the technician must have the panel or cover, off the power device when making corrections or verifying corrections (i.e. operating) the power device. There is an extra danger when there are multiple power devices located in close proximity to one another and hazardous environments. The extra power devices increase the margin of error for servicing a power device.

Thus, heretofore an unaddressed need exists in the industry to address the aforementioned deficiencies quickly and efficiently.

SUMMARY OF THE INVENTION

The present invention provides a system and method for providing remote controlling of a power device or power delivery system.

In architecture, the system includes a service device for performing the operation. The service device comprises a receiver circuitry that receives operating status data of the power device, and a data input circuitry that accepts control information from a user. In addition, the transmitter circuitry transmits the control information to the power device.

The present invention can also be viewed as a method for providing remote monitoring of a power device. The method operates by (1) acquiring an operating status data of the power device; and (2) transmitting control information to the power device.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

FIG. 2A is a block diagram illustrating an example of a service device utilizing the remote power monitoring system of the present invention, as shown in FIG. 1.

FIG. 3A is a flow chart illustrating an example of the operation of the remote power monitoring system of the present invention on the remote monitoring device, as shown in FIGS. 1, 2B and 2C.

FIG. 4A is a flow chart illustrating an example of the operation of the remote power monitoring system of the present invention on the service device, as shown in FIGS. 1 and 2A.

FIG. 4B is a flow chart illustrating an example of the operation of the activity agent on the remote monitoring device used in conjunction with the remote power monitoring system of the present invention, as shown in FIGS. 2B, 2C, 3A, 3B, and 4A.

FIG. 5A is a flow chart illustrating an example of the operation of the upload process utilized by the remote power monitoring system of the present invention, as shown in FIGS. 2A, 3A and 4A.

FIG. 6A is a flow chart illustrating an example of the operation of the display process utilized by the remote power monitoring system of the present invention, as shown in FIGS. 2A, 3A and 4A.

FIG. 6B is a flow chart illustrating an example of the operation of the display agent utilized in the remote monitoring device and utilized by the remote power monitoring system of the present invention, as shown in FIGS. 2B, 3B, 3C and 4B.

FIG. 7A is a flow chart illustrating an example of the operation of the download process utilized by the remote power monitoring system of the present invention, as shown in FIGS. 2A, 3A and 4A.

FIG. 8B is a flow chart illustrating an example of the operation of the set-up agent utilized in the remote monitoring device and utilized by the remote power monitoring system of the present invention, as shown in FIGS. 2B, 3B, 3C and 4B.

FIG. 10A is a flow chart illustrating an example of the operation of the other process utilized by the remote power monitoring system of the present invention, as shown in FIGS. 2A, 3A and 4A.

FIG. 10B is a flow chart illustrating an example of the operation of the other agent utilized in the remote monitoring device and utilized by the remote power monitoring system of the present invention, as shown in FIGS. 2B, 3B, 3C and 4B.

FIG. 12A is a flow chart illustrating an example of the operation of the data acquisition process utilized by the remote power monitoring system of the present invention, as shown in FIGS. 2A, 3A, 4A and 10A.

FIG. 15A is a flow chart illustrating an example of the operation of the parameter process utilized by the remote power monitoring system of the present invention, as shown in FIGS. 2A, 3A, 4A and 12A.

DETAILED DESCRIPTION OF THE PREFERRED EMBODIMENTS

Figure 1:
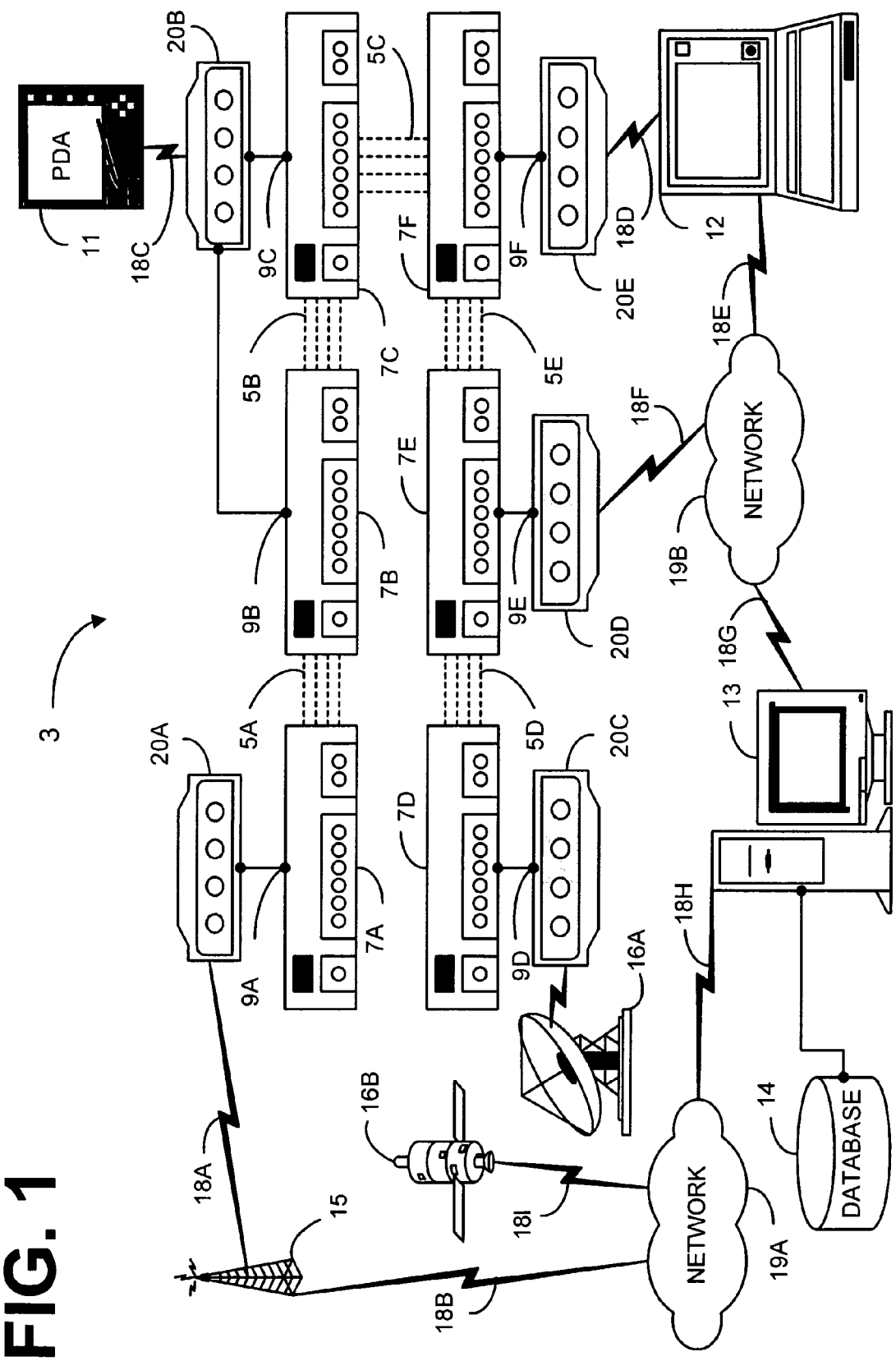
FIG. 1 is a block diagram illustrating an example of the network environment for a service system and the remote monitoring devices utilizing the remote power monitoring system of the present invention.

The invention to be described hereafter provides a cost-effective means for monitoring and controlling power quality, power flow, and system devices remotely. Advantageously, the present invention provides a system and method for remote support and monitoring of power system devices by providing communication of power system device information to a service computer system.

In particular, the present invention relates to a small, wireless, remote power monitoring system. The remote power monitoring system is capable of independently sensing and recording voltage and current conditions, including but not limited to performance conditions and external environmental conditions. The remote power monitoring system performing in a larger system collects, and records voltage and current conditions detected by one or more transducers in accordance with the invention. These larger systems, hereafter referred to as power devices, include, but are not limited to, network protectors, circuit breakers, electrical panels, transformers, reclosers, capacitor banks, fuses, transfer switches, voltage regulators, VAR compensators, and the like. In particular, the remote power monitoring system may be embedded into or attached or retrofitted to a power device (e.g. a circuit breaker or network protector), thus creating an integrated device. For the sake of brevity, switches referred hereafter shall include, but are not limited to network protectors, circuit breakers, reclosers, fuses, transfer switches and the like.

The remote power monitoring system of the present invention comprises circuitry and external leads. The external leads connect to the voltage to be recorded, and the transducers clamp around the conductor of the voltage or use other means to convert the current flow into a suitable input signal. The circuitry is generally contained within a unitary casing, however, an external clamp portion can be utilized to incorporate signal conditioning circuitry. The remote monitoring device contains all analog and digital circuitry necessary to digitize voltage and current waveform data collected from the conductor, transducer and the external leads. From such data, all power quality parameters such as RMS voltage, current, power, power factor, harmonics, and the like can be computed. The data is stored in digital memory located on a circuit board in the remote monitoring device. To provide this information to the analyzing device, the remote monitoring device of the present invention utilizes communication technology.

A remote power monitoring system in accordance with the invention includes a recording unit with a RF transceiver. The remote power monitoring system of the present invention preferably uses a low-power wireless transceiver, for example but not limited to, a transceiver equipped with a Bluetooth system. Other types of communication technologies may be utilized including, but not limited to, WiFi, cellular, optical, satellite, radio frequency (RF), conventional telephone system (POTS), Ethernet, LAN, WAN, magnetic induction, coax, RS-485, INCOM, SCADA or the like.

This transceiver allows the engineer or technician to use a separate display device, such as for example, a Bluetooth-enabled personal digital assistant (PDA), to view real-time waveforms and data, and to download recorded data from the transducer into the PDA for later analysis.

In addition, the remote power monitoring system in accordance with the invention can control other equipment both by initiating control signals through an optical, wired or wireless port, and relaying control signals received through the optical, wired or wireless interface, through a port attached to the equipment. This allows the user to use existing or new software to control their equipment, without modification, and without having to enter a confined space, voltage area, or other hazardous or inaccessible location.

Furthermore, the remote power monitoring system in accordance with the present invention includes the ability to provide real-time control of all power device parameters. This real-time control can be transmitted by a separate display device utilizing the low-power wireless transceiver described above. This real-time control includes, but it is not limited to the network parameters, transformer parameters and power device status controls.

The remote power monitoring system of the present can control other equipment both by initiating control signals through an optical, wired or wireless port, and relaying control signals received through the optical, wired or wireless interface, through a port to attached equipment. A handheld computer, laptop, PDA, Pocket PC or other like device may be used to communicate with the remote power monitoring system. The remote power monitoring system can record data for several years, depending on the user setup.

The measurement and recording aspect of the invention is based on conventional methods, such as Vip power analyzer, and the VP-2 available from Power Monitors, Inc. The data measured and recorded includes, but not limited to: for single and multiple phase power transmission and distribution equipment (RMS voltage and current, real power, apparent power, harmonics, phase angle, reactive power, power factors, displaced power factor, total harmonic distortion, total power quantities, total real power, total reactive power, total apparent power, total power factors, phase angles, cycle histograms, cycle event changes, flicker, stray voltages, abnormal voltages and power outages); remote power monitoring system (parameters, log, current status, set-up parameters, sensor data and the like), and environmental conditions (temperature, humidity, air pressure, smoke (i.e. smoke detector), security status, and the like).

The remote power monitoring system of the present invention preferably includes a wireless interface. The compact size of the remote power monitoring system of the present invention allows these conventional measurements and recordings to be acquired in situations that were unsafe or impossible with existing designs. The wireless aspect provides voltage isolation, protecting the user from hazardous voltages. Other safety issues such as high voltage, confined space and explosion hazards are also eliminated in underground vault locations, since the device can communicate information to locations outside the confined space or hazardous location. This also allows equipment users to interface with their equipment without breaching secure locations (such as underground vaults for network protectors in urban areas which have been secured for homeland defense). If the remote power monitoring system of the present invention is embedded in a circuit breaker or network protector, the wireless interface allows the communication of information from the device without opening an electrical panel cover or access door, thus greatly increasing user safety.

In addition, the control functionality of the remote power monitoring system of the present invention allows the control of power equipment from outside the hazardous location. A wired port (preferably an RS-232 or I2C) or wireless communication link from the remote power monitoring system of the present invention connects to other equipment (such as a circuit breaker, network protector, recloser, etc.) Other types of communication technologies may also be utilized including, but not limited to, Bluetooth, WiFi, cellular, optical, satellite, RF, POTS, Ethernet, LAN, WAN, magnetic induction, coax, RS-485, INCOM, SCADA or the like.

The remote power monitoring system of the present invention can initiate control signals based on its own measurements, or relay received commands from the wireless interface. This allows the user to use existing software to control their equipment, without modification, but without having to enter a confined space, voltage area, or other hazardous or inaccessible location. The compact size of the remote power monitoring system of the present invention allows for placement inside other pieces of equipment, such as a network protector, circuit breaker, electrical panel, switchgear, transformer, etc., where it was previously impossible to do so.

Voltage signals are routed through a voltage front-end in the remote power monitoring system of the present invention, which reduces the high input voltages to appropriate levels. The signals are fed through signal conditioning circuitry, which terminates into an A/D converter. Each voltage channel is galvanically isolated for safety. Current inputs use conventional techniques.

The remote power monitoring system of the present invention is preferably controlled by a DSP, which interfaces to the A/D converters, wireless module, RS-232 port, I2C port, static RAM, FLASH memory, real-time clock, and other digital circuitry. This DSP handles all computations, control functions, data storage, and communications. Firmware resides on a FLASH integrated circuit, which is also used for data storage.

A rechargeable battery provides power for operation during a power outage, and a primary battery provides long-term memory backup power. However, because of the compact size and power demand of the remote power monitoring system of the present invention, power may be drawn directly from the sources being measured without distorting measurements.

The remote power monitoring system of the present invention allows the recording of power quality data in novel applications due to its small size and power consumption, wireless interface, and safety designs (it is designed for IEC Category III environments, which is needed for electrical applications).

The remote power monitoring system of the present invention also includes the ability to provide real-time measurements of all power quality parameters. This real-time information can be transmitted to a separate display device utilizing the low-power wireless transceiver described above. This real-time information includes, but it is not limited to the network voltage measurements, transformer voltage measurements and network power measurements and digital and graphic forms.

The challenge of reducing the device size so that it could be used in previously impossible situations was addressed with novel circuit design, and firmware algorithms (which relaxed constraints on the hardware). Some of these include but are not limited to:

The use of a combination of protective impedance and double insulation safety techniques in a single device to meet IEC Cat III requirements. This includes the arrangement and selection of voltage front-end resistors, the physical placement of each circuit board, and the combination of the digital isolators and isolation transformer that comprises the voltage front-end and signal conditioning section.

The use of a signal digital line to combine the functions of an A/D clock and chip select signal. This multiplexing was achieved by a combination of timing circuitry and firmware control.

A multi-input, isolated power supply which allows the device to be powered from an input voltage channel, an external DC supply, or rechargeable internal battery.

An input circuit which allows the device to detect the presence of a distribution transformer. This lets the device distinguish the difference between a power outage and removal of the device from service.

Circuitry to allow digital isolators with a 4000 volt rating to meet 15,000 volt IEC Cat III tests.

Pre-regulator circuitry ensures that the power supply output is self-limiting or regulating.

Relay circuitry that uses the optical, wired or wireless link to monitor and control other equipment both by initiating control signals through the link and relaying control signals received through the optical, wired or wireless interface, through a port to attached equipment.

In an alternative embodiment, the remote power monitoring system of the present invention will initiate a connection to communication link to transmit information to a central service computer. The central service computer receives the data stream from the remote power monitoring system. The data stream includes, but not limited to: for single and multiple phases (RMS voltage and current, real power, apparent power, harmonics, phase angle, reactive power, power factor, displaced power factor, total harmonic distortion, total power quantities, total real and reactive and apparent power, total power factors, phase angles, the cycle histograms, cycle event changes, flicker, abnormal voltages, amount of power consumed and power outages), remote power monitoring system (parameters, log, current device status, set up parameters, sensor data and the like.), environmental conditions (temperature, humidity, pressure, the smoke content, security status, and the like), and analog and digital parameters from attached equipment (transformer temperature, oil level, recloser and circuit breaker operation, network protector status, etc.)

With the data in the data stream a service representative will be able to analyze and perform online troubleshooting of the power system device. Currently, a service representative actually has to visit the location of the power system device to acquire all the data items that are available in the data stream. This saves time and money in the effort to monitor the power system device.

If the service representative determines that adjustments can be made remotely, then the remote power monitoring system of the present invention facilitates the service representative in adjusting any system parameter in the power system device. In the past, adjustments of any system parameter required a service representative to actually physically go to the location of the power system device and enter the protective environment of the power device to perform the adjustment. With the remote adjustment feature, time and money is saved.

The remote power monitoring system of the present invention also enables the collection of power system device performance data for reporting purposes. This feature enables the producer of the power system device to monitor the power system device to track the performance of the power system device.

The remote power monitoring system of the present invention also enables the capability to download software patches, upgrades and new versions of software from the service computer to any supportable remote power system device.

The remote power monitoring system of the present invention is applicable to all computer processing systems connected to a power system device. The system and method for remote monitoring of a power system device is typically implemented in a networked computing arrangement in which any number of power system devices communicate with at least one service computer device. Examples of communication methods applicable include but not limited to: Internet, Bluetooth, WiFi, cellular, optical, satellite, RF, POTS, Ethernet, LAN, WAN, magnetic induction, coax, RS-485, INCOM, SCADA or the like.

Referring now to the drawings, in which like numerals illustrate like elements throughout the several views, FIG. 1 illustrates an example of the network environment 3 for a service devices (11, 12 or 13) and the remote monitoring devices 20 utilizing the remote power monitoring system of the present invention.

The network environment 3 includes power system devices 7(a-f), service computers 11-13 contain applications, and service computer 13 further contains a database 14. The power system devices 7(a-f) include, but are not limited to, network protectors, circuit breakers, electrical panels, transformers, reclosers, capacitor banks, fuses, transfer switches, voltage regulators, VAR compensators, and the like. Hereinafter, the power system devices 7(a-f) will be referred to as to power device 7 for the sake of brevity. It is understood that the network protector includes a protector and relay.

Service computer 11-13 can access the remote monitoring devices 20(a-f) via intermittent connections 18(a-i), respectively, over network 18. Service computer 11-13 include, but are not limited to: PCs, workstations, laptops, PDAs, palm devices, tablets and the like. The computer 13 may also be connected to the local area network (LAN) within an organization.

The structure and operation of the remote power monitoring system enables the service computers 11-13 to monitor power system devices 7(a-f) more efficiently than previously known systems. Particularly, the remote power monitoring system of the present invention enables the power system devices 7(a-f) to operate more efficiently by increasing uptime through the closer monitoring. When the remote monitoring devices 20(a-f) connect to the service computer 11-13, the user may have access to power system devices 7(a-f) power measurements. In an alternative embodiment, service computer 13 may provide online or remote support. The power measurements from power system devices 7(a-f) may be stored on the database 14 for later comparisons and statistical analysis.

As depicted in FIG. 1, power system devices 7(a-f) are connected together via example transmission or distribution lines 5(a-e). Attached to each of power system devices 7 is a remote monitoring device 20. The remote monitoring devices 20 measures and records of the remote monitoring devices 20 and then provides for efficient communication of the measurements of power system 7 to service computers 11-13. Hereinafter, the service device 11-13 will be referred to as to service device 11 for the sake of brevity.

As stated previously, there are a number of communication methods that can be utilized to perform the communication of the measurements. These methods include, but are not limited to, Bluetooth, WiFi, cellular, optical, satellite, RF, POTS, Ethernet, LAN, WAN, magnetic induction, coax, RS-485, INCOM, SCADA or the like. The service device may implement two or more communication methods, and may also act as a bridge between two or more methods, which would enable it to relay commands and data to other devices.

Figure 2B:
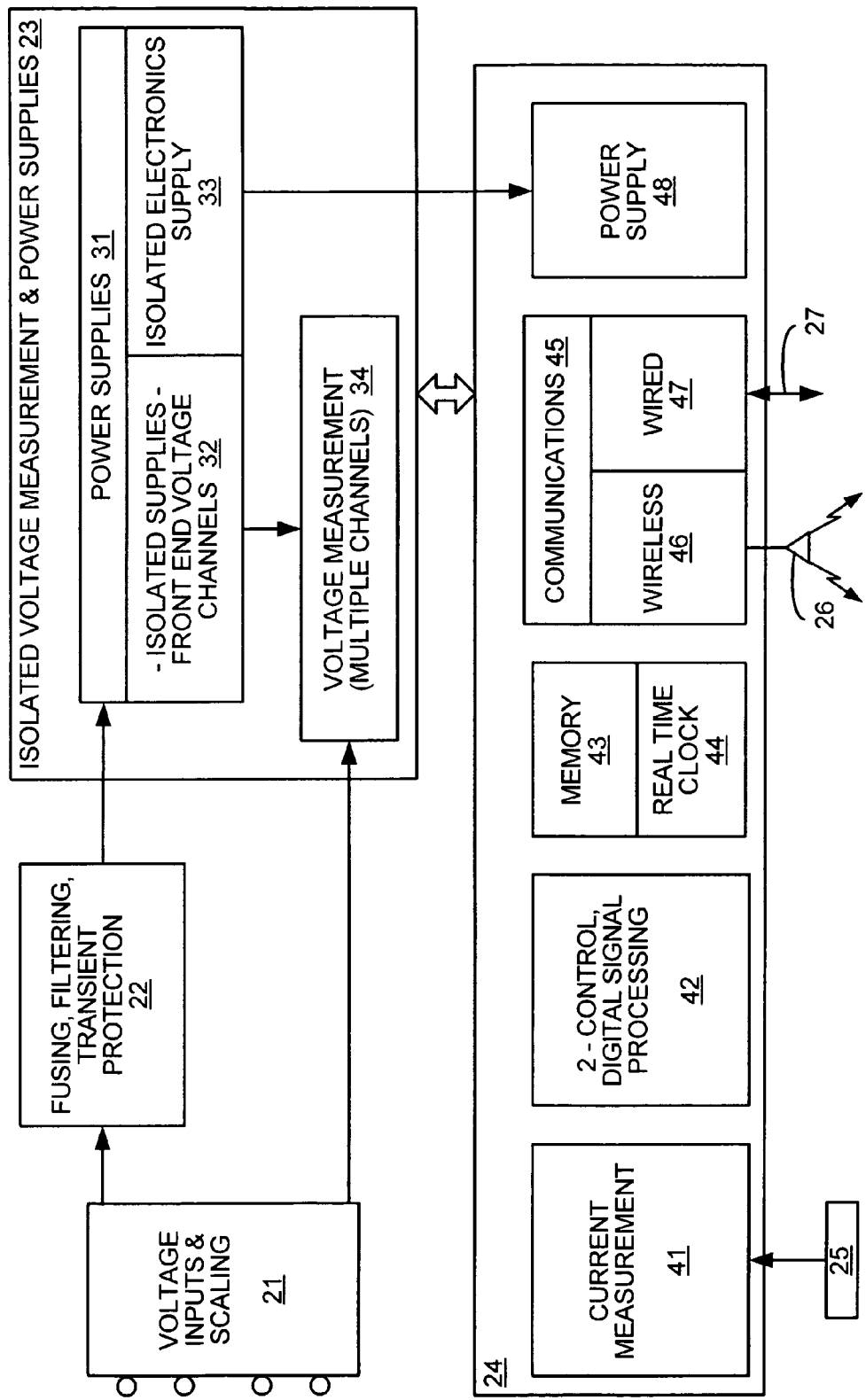
FIG. 2B is a block diagram illustrating an example of functional elements in the remote monitoring device to provide for the remote power monitoring system of the present invention, as shown in FIG. 1.
Figure 2C:
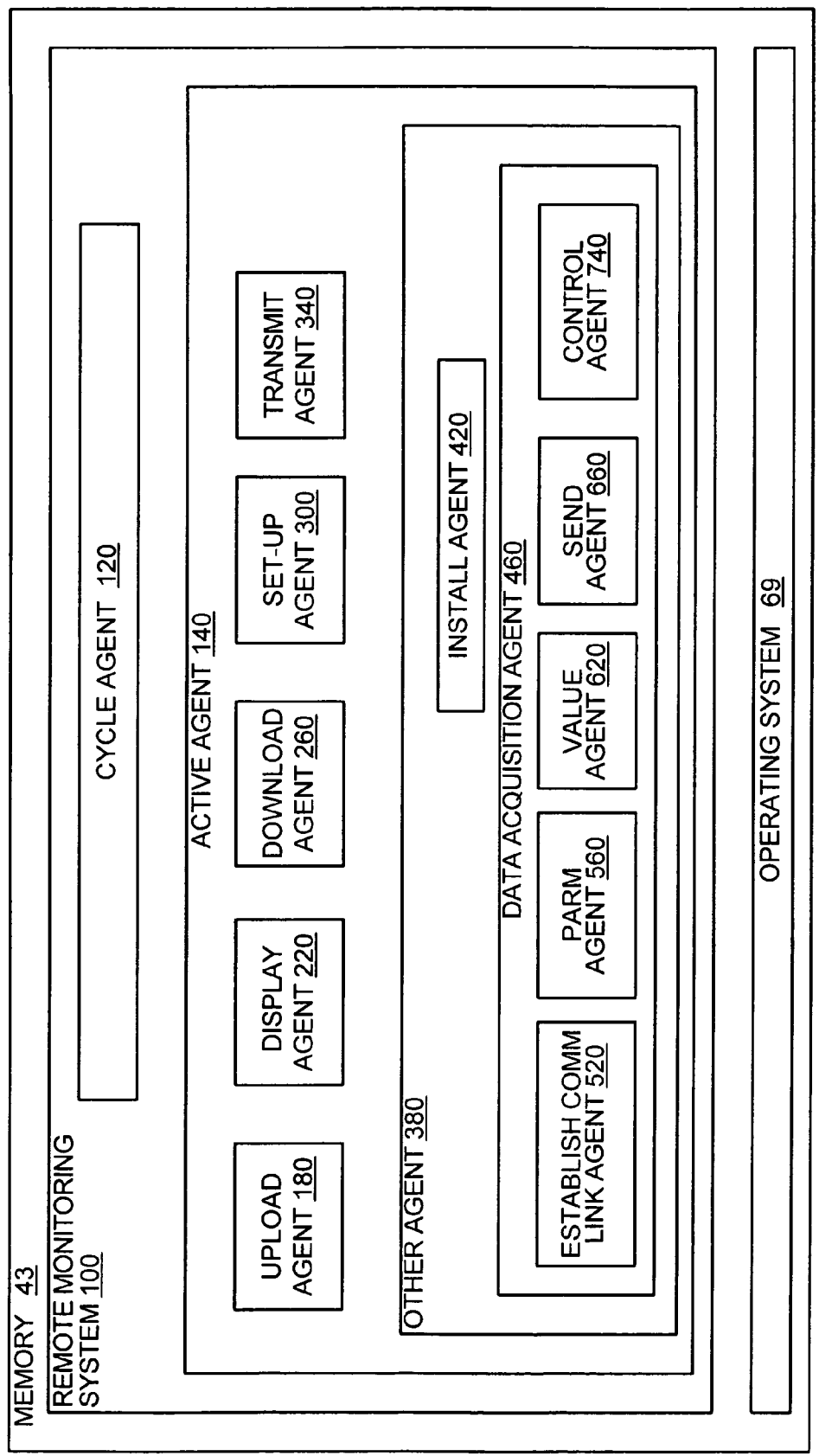
FIG. 2C is a block diagram illustrating an example of the memory for the remote monitoring device using the remote power monitoring system of the present invention, as shown in FIG. 2B.

Illustrated in FIG. 2A is a block diagram demonstrating an example of service device 11-13, as shown in FIG. 1, utilizing the remote power monitoring system 80 of the present invention. Service devices 11 include, but are not limited to, PCs, workstations, laptops, PDAs, palm devices and the like. Illustrated in FIGS. 2B and 2C, is an example demonstrating a remote power monitoring device 20 utilizing remote monitoring system of the present invention. The processing components of the remote power monitoring device 20 are similar to that of the description for the service computer 11-13 (FIG. 2A).

Generally, in terms of hardware architecture, as shown in FIG. 2A, the service computers 11-13 include a processor 61, memory 62, and one or more input and/or output (I/O) devices (or peripherals) that are communicatively coupled via a local interface 63. The local interface 63 can be, for example but not limited to, one or more buses or other wired or wireless connections, as is known in the art. The local interface 63 may have additional elements, which are omitted for simplicity, such as controllers, buffers (caches), drivers, repeaters, and receivers, to enable communications. Further, the local interface 63 may include address, control, and/or data connections to enable appropriate communications among the aforementioned components.

The processor 61 is a hardware device for executing software that can be stored in memory 62. The processor 61 can be virtually any custom made or commercially available processor, a central processing unit (CPU), data signal processor (DSP) or an auxiliary processor among several processors associated with the service computer 16, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 62 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 62 may incorporate electronic, magnetic, optical, and/or other types of storage media. Note that the memory 62 can have a distributed architecture, where various components are situated remote from one another, but can be accessed by the processor 61.

The software in memory 62 may include one or more separate programs, each of which comprises an ordered listing of executable instructions for implementing logical functions. In the example illustrated in FIG. 2A, the software in the memory 62 includes a suitable operating system (O/S) 69 and the remote power monitoring system 80 of the present invention. As illustrated, the remote monitoring system 80 of the present invention comprises numerous of functional components including but not limited to that upload process 160, display process 200, download process 240, setup process 280, transmit process 320, other process 360, install process 400, data acquisition process 440. The data acquisition process 440 includes, but is not limited to: software key authentication process 480, established communication link process 500, with parameter process with 540, value process 600, send process 640 and control process 700.

A non-exhaustive list of examples of suitable commercially available operating systems 69 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 69 essentially controls the execution of other computer programs, such as the remote power monitoring system 80, and provides scheduling, input-output control, file and data management, memory management, and communication control and related services. However, it is contemplated by the inventors that the remote power monitoring system 80 of the present invention is applicable on all other commercially available operating systems.

The remote power monitoring system 80 may be a source program, executable program (object code), script, or any other entity comprising a set of instructions to be performed. When a source program, then the program is usually translated via a compiler, assembler, interpreter, or the like, which may or may not be included within the memory 62, so as to operate properly in connection with the O/S 69. Furthermore, the remote power monitoring system 80 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, ADA and the like.

The I/O devices may include input devices, for example but not limited to, a keyboard 65, mouse 64, scanner (not shown), microphone (not shown), etc. Furthermore, the I/O devices may also include output devices, for example but not limited to, a printer (not shown), display 66, etc. Finally, the I/O devices may further include devices that communicate both inputs and outputs, for instance but not limited to, a NIC or modulator/demodulator 67 (for accessing power system devices, other files, devices, systems, or a network), a radio frequency (RF) or other transceiver (not shown), a telephonic interface (not shown), a bridge (not shown), a router (not shown), etc.

If the service computer 11-13 is a PC, workstation, intelligent device or the like, the software in the memory 62 may further include a basic input output system (BIOS) (omitted for simplicity). The BIOS is a set of essential software routines that initialize and test hardware at startup, start the O/S 69, and support the transfer of data among the hardware devices. The BIOS is stored in some type of read-only-memory, such as ROM, PROM, EPROM EEPROM or the like, so that the BIOS can be executed when the service computer 11-13 is activated.

When the computers 11-13 are in operation, the processor 61 is configured to execute software stored within the memory 62, to communicate data to and from the memory 62, and to generally control operations of the service computer 11-13 are pursuant to the software. The remote power monitoring system 80 and the O/S 69 are read, in whole or in part, by the processor 61, perhaps buffered within the processor 61, and then executed.

When the remote power monitoring system 80 is implemented in software, as is shown in FIG. 2A, it should be noted that the remote power monitoring system 80 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The remote power monitoring system 80 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium, upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the remote power monitoring system 80 is implemented in hardware, the remote power monitoring system 80 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Illustrated in FIG. 2B is a block diagram demonstrating an example of functional elements in the remote monitoring device 20 that enables the remote power monitoring system of the present invention, as shown in FIG. 1. The remote monitoring device 20 measures numerous power characteristics of power system device 7 and computes a number of recordable measurements. The characteristics and recordable measurements are then stored in memory for later access by service device 11-13.

The functional elements of the remote monitoring device 20 include the voltage input and scaling circuitry 21, filtering and transient protection circuitry 22. Voltage input and scaling circuitry 21 samples voltages from a conductor (not shown) as input to filtering and transient protection circuitry 22 and voltage measurement circuitry 34.

In the preferred embodiment, the voltage input and scaling circuitry 21 includes an isolator circuit to eliminate the need for a third optical insulator per channel and pre-regulator circuitry. The isolator circuit and pre-regulator circuitry are illustrated in further detail with regard to FIGS. 10 and 11 respectively.

The remote monitoring device 20 further includes the isolated voltage measurement and power supply circuitry 23. The isolated voltage measurement and power supply circuitry and 23 further includes power supply circuitry 31, front end voltage channels circuitry 32, isolated electronic supply circuitry and 33 and voltage measurement circuitry 34. As shown, there are multiple voltage inputs to voltage input and scaling circuitry 21 and therefore, multiple inputs into voltage measurement circuitry 34. The voltage measurement circuitry 34 further includes isolator circuitry that is herein illustrated in further detail with regard to FIG. 10.

The power supply circuitry 31 includes circuitry to a multi-input and isolated power supply. This multi-input power supply circuitry 31 enables the remote monitoring device 20 to be powered from an input voltage channel, external PCs power supply or a rechargeable internal battery. An example of the multi-source power supply component is herein illustrated in further detail with regard to FIG. 12.

Digital components 20 of the remote monitoring device 20 include power supply circuitry 48, current measurement circuitry 41, digital signal processor (DSP) circuitry 42, memory 43, real-time clock circuitry 44 and communication circuitry 45 that is connected to both wireless circuitry 46 and wired circuitry 47. Power supply circuitry 48 is herein illustrated in greater detail with regard to FIG. 12.

The DSP 42 samples the digital voltage and current waveform data and controls storage of the waveform data in a digital memory 43. From voltage and current waveform data sampled by DSP 42 and stored in memory 43, all standard power quality parameters can be calculated. That is, for example, RMS voltage, current, power, power factor, and harmonics, all can be computed. The DSP 42 is herein illustrated in greater detail with regard to FIG. 15.

Figure 13:
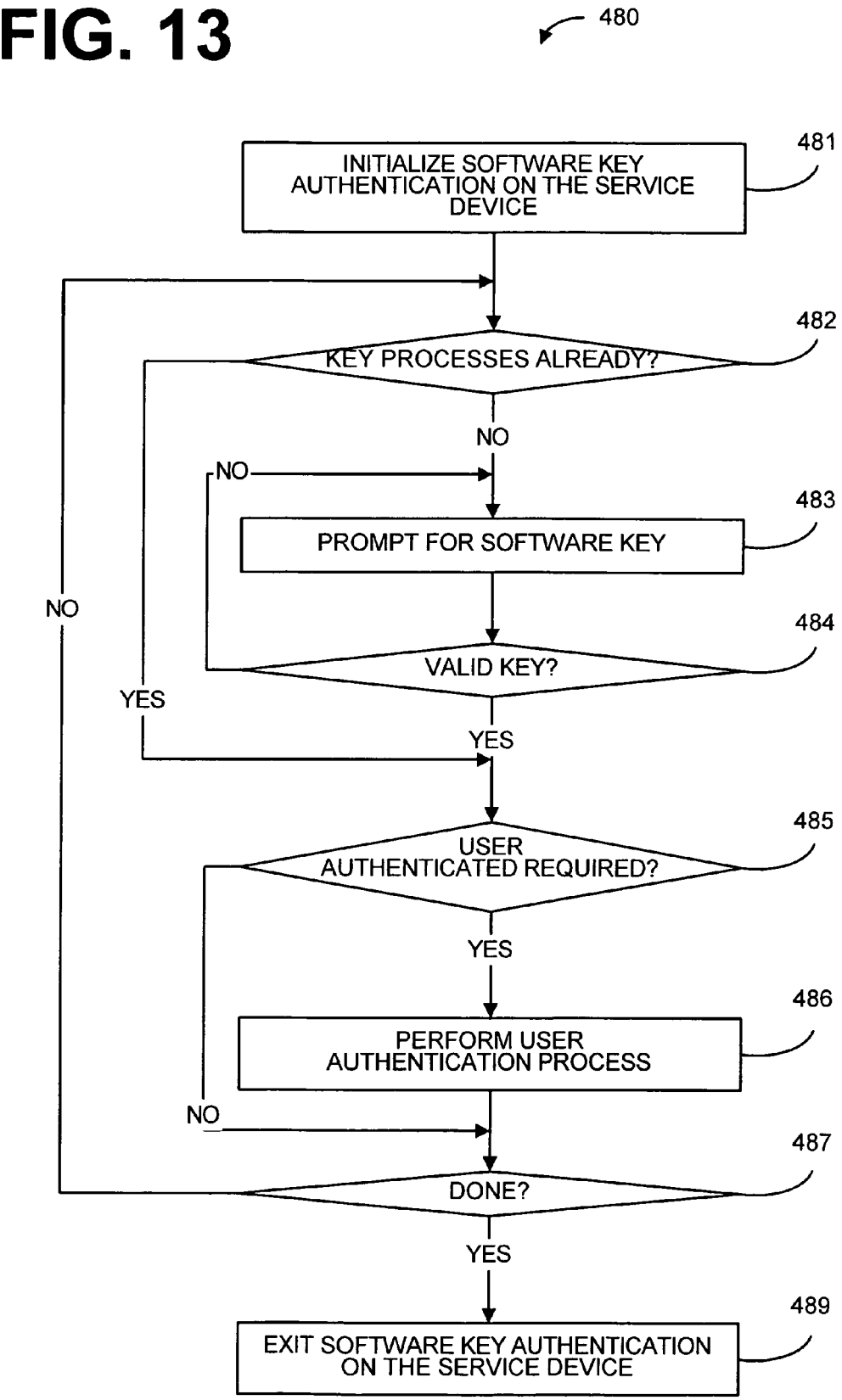
FIG. 13 is a flow chart illustrating an example of the operation of the software key authentication process utilized by the remote power monitoring system of the present invention, as shown in FIGS. 2A, 3A, 4A and 10A.

And the communication circuitry 45, wireless circuitry 46 and wired circuitry 47 are illustrated in greater detail with regard to FIG. 13. Wireless circuitry 46 provides for wireless transmission and therefore preferably has only small power consumption requirements itself. To this end, DSP 42 controls modulation of a RF signal generated by wireless circuitry 46 to transmit any desired digital waveform data from memory 43.

A personal data assistant (PDA) 11, laptop 12 or similar device communicates with wireless circuitry 46 to receive the waveform data transmittal by remote monitoring device 20. PDA 11 and laptop 12 are contemplated as having RF reception and demodulation capabilities in order to provide real-time waveforms and power quality data from the transmitted waveform data in user-readable form. The PDA 11 and laptop 12 generally have sufficient computational capacity to perform all necessary calculations to present the standard power quality parameters, and to display the voltage and current waveforms present in the monitored conduct, and then display this data by way of its display (not shown).

The illustrated examples of PDA 11 and laptop 12 can be any kind of device with wireless capability, as will be apparent to those of ordinary skill. Preferred PDA 11 and laptop 12 downloads recorded power quality parameter data and waveform data from the remote monitoring device 20 for later analysis. It is to be noted that a technician holding and operating PDA 11 and laptop 12 will remain isolated away from voltages on the monitored cable (not shown). As such, only initial connection of remote monitoring device 20 need be done in proximity to voltage and current conditions. Thereafter, analysis and review of voltage and current waveform data detected and recorded by the remote monitoring device 20 can be done remotely from the monitored voltage and current cables at the PDA 11 or laptop 12

FIG. 2C is a block diagram illustrating an example of the memory 43 for the remote monitoring device 20 using the remote power monitoring system 100 of the present invention, as shown in FIG. 2B. Located in memory 43 is the remote power monitoring system 100 which includes, but is not limited to, cycle agent 120, active agent 140 and other agent 380. The active agent 140 further includes upload agent 180, display agent 220, downloading agent 260, set-up agent 280 and transmit agent 320. The other agent 380 includes the install agent 420 and data acquisition agent 460, where the data acquisition agent 460 includes but is not limited to current status agent 1360, history agent 1420, waveform agent 1460, software authentication agent 1520, established communication link agent 1540, and NP graph agent 1580.

The agents are herein defined in further detail with regard to FIGS. 3A, 3B, 4B, 5B, 6B, 7B, 8B, 9B, 17B-21B, 23A, 23B, 25B and 26B respectively. When the remote power monitoring system 100 is implemented in software, as is shown in FIG. 2C, it can be stored on virtually any computer readable medium for use by or in connection with any computer related system or method.

In an alternative embodiment, where the remote power monitoring device 20 is implemented in hardware, the remote power monitoring system 100 can be implemented in the same way as described above with regard to the remote power monitoring system 80 (FIG. 2A).

In the example illustrated, the cycle agent 120 computes characteristics of the converted digital data. The active agent 140 controls all non-power monitoring management. The upload agent 180 enables the remote monitoring device 20 to upload data to service device 11-13. The display agent 220 enables the service device 11 to acquire a real-time data for display. The download agent 260 enables the remote monitoring device 20 to download additional software or software changes. The setup agent 300 enables modification of the system parameters for remote monitoring device 20 by a service representative. The transmit agent 340 provides for the transmission of data capture from power system device 7 and computed by remote monitoring device 20 to service device 11-13. The other agent 380 provides for execution of the install agent 420 and the data acquisition agent 460. The data acquisition agent 460 provides for the operation of the establish communication link agent 520, with parameter agent 560, value agent 620, send agent 660 and control agent 730.

FIG. 3A is a flow chart illustrating an example of the operation of the remote power monitoring system 100 of the present invention on the remote monitoring device 20, as shown in FIGS. 1, 2B and 2C. The remote power monitoring system 100 controls the remote powering device 20. The remote power of monitoring system 100 enables a service technician to acquire data measurements and computational values for a power system device 7.

First at step 101, the remote power monitoring system 100 is initialized. This initialization includes the startup routines and processes embedded in the BIOS of the remote monitoring device 20. The initialization also includes the establishment of data values for particular data structures utilized in the remote monitoring device 20 and remote power monitoring system 100.

At step 102, the remote power monitoring system 100 takes the sample data measurements from the power system device 7. At step 301, these data measurements are converted to digital data. At step 104, it is determined if the signal being measured is at the end of the cycle. If it is determined at step 104 that the signal being measured is not at the end of the cycle, then the remote monitoring system 100 waits a predetermined amount of time at step 105. After waiting a predetermined amount of time at step 105, the remote monitoring system 100 returns to repeat steps 102 through 104. However, if it is determined to step 104 that the signal being measured is at the end of the cycle, then the cycle data agent is performed at step 106. The cycle data agent is herein in defined in further detail with regard to FIG. 3

At step 107, memory area for storing of the digital data signals acquired at step 103 is reset. This allows the next cycle of data to be captured. At step 111, it is determined if the service device activity is detected. If it is determined at step 111 that a service device activity is not detected, then the remote monitoring system 100 proceeds to step 113 to determined if there are more data samples are to be captured. However, if it is determined at step 111 that a service device activity is detected, then the remote monitoring system 100 performs the activity agent at step 112. The activity agent is herein defined in further detail with regard to FIG. 4B.

At step 113 the remote monitoring system 100 determines if more data samples are to be captured. If it is determined at step 113 that there are more data samples to be captured, then the remote monitoring system 100 returns to repeat steps 102 through 113. However, if it is determined to step 113 that there are no more data samples to be captured, then the remote monitoring system 100 exits at step 119.

Figure 3B:
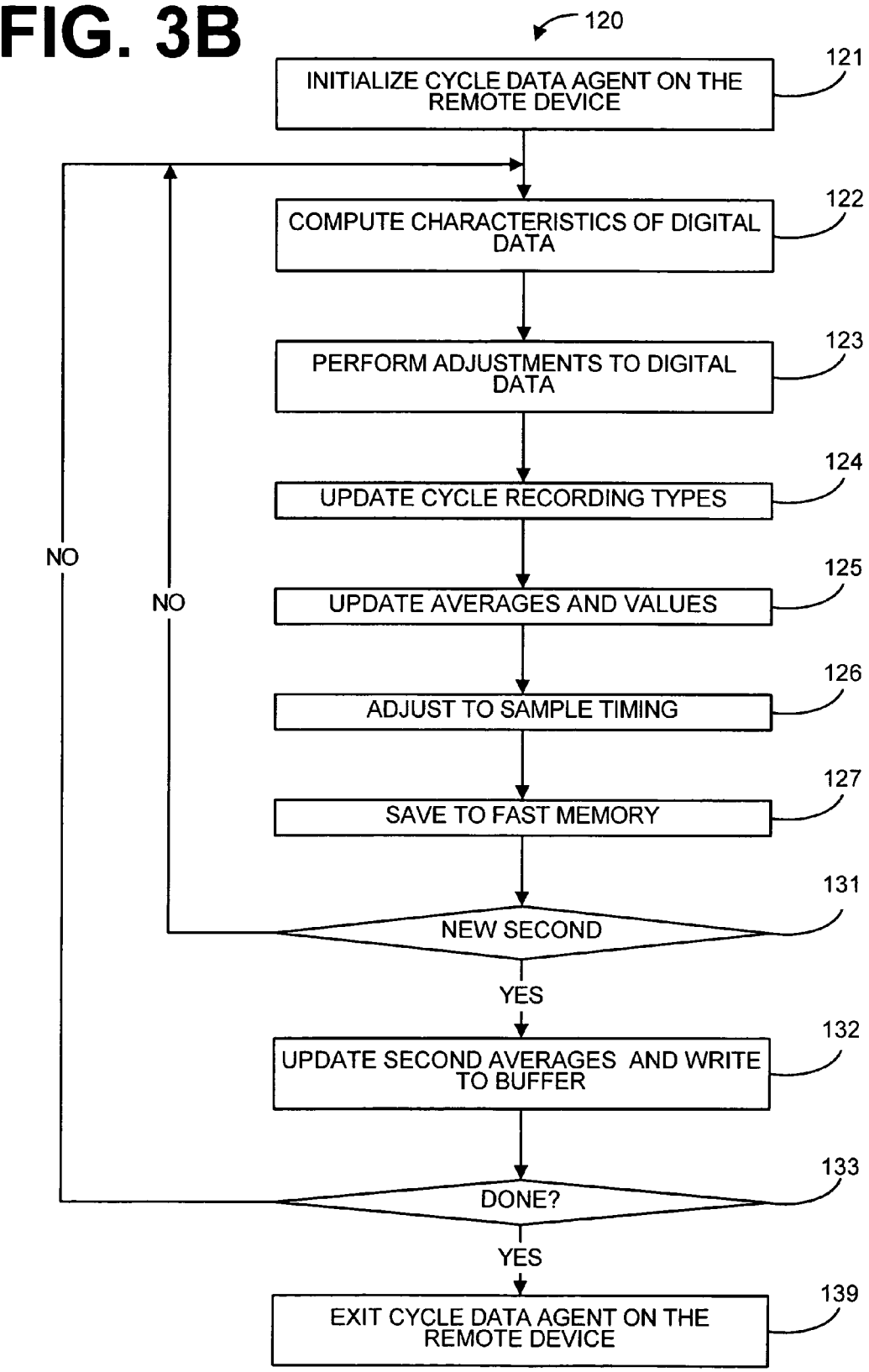
FIG. 3B is a flow chart illustrating an example of the operation of the cycle data agent on the remote monitoring device used in conjunction with the remote power monitoring system of the present invention, as shown in FIGS. 1, 2B, 2C and 3A.

FIG. 3B is a flow chart illustrating an example of the operation of the cycle data agent 120 on the remote monitoring device 20 used in conjunction with the remote power monitoring system 100 of the present invention, as shown in FIGS. 1, 2B, 2C and 3A. The cycle data agent 120 acquires the data measurements from power system device 7 and computes characteristics of that measured data.

First at step 121, the cycle data agent 120 is initialized. This initialization includes the startup routines and processes embedded in the BIOS of the remote monitoring device 20. The initialization also includes the establishment of data values for particular data structures utilized in the cycle data agent 120. At step 122, characteristics of the digital data are then computed. These characteristics include, but are not limited to, for single and multiple phases (RMS voltage and current, real power, apparent power, harmonics, phase angle, reactive power, power factor, displaced power factor, total harmonic distortion, total power quantities, total real and reactive and apparent power, total power factors, phase angles, the cycle histograms, cycle event changes, flicker, stray voltages, abnormal voltages and power outages).

At step 123, any adjustments necessary to the digital data is performed. Adjustments include gain and offset corrections, as well as frequency-dependent harmonic correction factors. At step 124, the cycle recording types are updated, including RMS voltage and current, real, reactive and apparent power, power factor, displacement power factor, phase angle, harmonic magnitudes and phases, and total harmonic distortion.

At step 125, the averages and values for the signal being measured are updated. At step 126 the adjustments necessary to the sample timing are made. At step 127, all the computed cycle data is saved to fast memory. At step 131, it is determined if the cycle is on a new second. If it is determined to step 131 that a cycle for a new second has not occurred, then the cycle data agent 120 returns to repeat steps 122 through 131.

However, if it is determined that a new second is started, then the cycle data agent 120 then updates the second averages and write these values to a buffer at step 132. At step 133, the cycle data agent 120 determines if there are more cycles to be processed. If it is determined at step 133 that there are more cycles to be processed, then the cycle data agent 120 returns to repeat steps 122 through 133. However, if it is determined that there are no more cycles to be processed the cycle data agent 120 then exits at step 139.

FIG. 4A is a flow chart illustrating an example of the operation of the remote power monitoring system 80 of the present invention on the service device 11, as shown in FIGS. 1 and 2A. The remote power monitoring system 80 running on service device 11 enables a user access to measured and computed data power from system device 7.

First at step 81, the remote power monitoring system 80 is initialized. This initialization includes the startup routines and processes embedded in the BIOS of the service device 11. The initialization also includes the establishment of data values for particular data structures utilized in the remote power monitoring system 80. At step 82, the service device 11 connects to the remote monitoring device 20. The activity function is then enabled for input by a user at step 83.

At step 84, it is determined if an upload activity is detected. If it is determined at step 84 that an upload activity is not detected, then the remote monitoring system 80 proceeds to step 86. However, if it is determined at step 84 that an upload activity is detected, then the remote monitoring system 80 on the service device 11 performs the upload process at step 85. The upload process is herein defined in further detail with regard to FIG. 5A.

At step 86, it is determined if a display activity is detected. If it is determined at step 86 that a display activity is not detected, then the remote monitoring system 80 proceeds to step 88. However, if it is determined at step 86 that a display activity is detected, then the remote monitoring system 80 performs the display process at step 87. The display process is herein defined in further detail with regard to FIG. 6A.

At step 88, it is determined if a download activity is detected. If it is determined at step 88 that a download activity is not detected, then the remote monitoring system 80 proceeds to step 92. However, if it is determined at step 88 that a download activity is detected, then the remote monitoring system 80 performs the download process at step 91. The download process is herein defined in further detail with regard to FIG. 7A.

At step 92, it is determined if a setup activity is detected. If it is determined at step 92 that a setup activity is not detected, then the remote monitoring system 80 proceeds to step 94. However, if it is determined at step 92 that a setup activity is detected, then the remote monitoring system 80 performs the setup process at step 93. The setup process is herein defined in further detail with regard to FIG. 8A.

At step 94, it is determined if a transmit activity is detected. If it is determined at step 94 that a transmit activity is not detected, then the remote monitoring system 80 proceeds to step 96. However, if it is determined at step 94 that a transmit activity is detected, then the remote monitoring system 80 performs the transmit process at step 95. The transmit process is herein defined in further detail with regard to FIG. 9A.

At step 96, it is determined if another activity is detected. If it is determined at step 96 that another activity is not detected, then the remote monitoring system 80 proceeds to step 98. However, if it is determined at step 96 that another activity is detected, then the remote monitoring system 80 performs the other process at step 97. The other process is herein defined in further detail with regard to FIG. 10A.

At step 98, it is determined if there are more activities to be processed. If it is determined that there are more activities to be processed, the remote monitoring system 80 returns to repeat steps 82 through 98. However, if it is determined at step 98 that there are no more activities to be processed, then the remote monitoring system 80 exits at step 99.

FIG. 4B is a flow chart illustrating an example of the operation of the activity agent 140 on the remote monitoring device 20 used in conjunction with the remote power monitoring system 100 of the present invention, as shown in FIGS. 2B, 2C, 3A, 3B, and 4A. The activity agent 140 processes all interaction with the service device 11.

First at step 141, the activity agent 140 is initialized. This initialization includes the startup routines and processes embedded in the BIOS of the remote monitoring device 20. The initialization also includes the establishment of data values for particular data structures utilized in the activity agent 140. At step 142, the activity agent 140 waits for requests to connect to service device 11. After receiving a request to connect to service device 11, the activity agent 140 then accepts the activity function input from the user on service device 11.

At step 144, the activity agent 140 determines if an upload request is detected. If it is determined at step 144 that an upload request is not detected, then the activity agent 140 proceeds to step 146. However, if it is determined at step 144 that an upload request is detected, then the activity agent 140 on the service device 11 performs the upload agent at step 85. The upload agent herein defined in further detail with regard to FIG. 5B.

At step 146, it is determined if a display request is detected. If it is determined at step 146 that a display request is not detected, then the activity agent 140 proceeds to step 148. However, if it is determined at step 146 that a display request is detected, then the activity agent 140 performs the display agent at step 147. The display agent herein defined in further detail with regard to FIG. 6B.

At step 148, it is determined if a download request is detected. If it is determined at step 148 that a download request is not detected, then the activity agent 140 proceeds to step 152. However, if it is determined at step 148 that a download request is detected, then the activity agent 140 performs the download agent at step 151. The download agent herein defined in further detail with regard to FIG. 7B.

At step 152, it is determined if a setup request is detected. If it is determined at step 152 that a setup request is not detected, then the activity agent 140 proceeds to step 154. However, if it is determined at step 152 that a setup request is detected, then the activity agent 140 performs the setup splay agent at step 153. The setup agent herein defined in further detail with regard to FIG. 8A.

At step 154, it is determined if a transmit request is detected. If it is determined at step 154 that a transmit request is not detected, then the activity agent 140 proceeds to step 156. However, if it is determined at step 154 that a transmit request is detected, then the activity agent 140 performs the transmit agent at step 155. The transmit agent herein defined in further detail with regard to FIG. 9B.

At step 156, it is determined if another function request is detected. If it is determined at step 156 that another function request is not detected, then the activity agent 140 proceeds to step 158. However, if it is determined at step 156 that another function request is detected, then the activity agent 140 performs the other agent at step 157. The transmit agent herein defined in further detail with regard to FIG. 10A.

At step 158, it is determined if there are more activities to be processes. If it is determined that there are more activities to be processed, the activity agent 140 returns to repeat steps 82 through 157. However, if it is determined at step 157 that there are no more activities to be processed, then the activity agent 140 exits at step 159.

FIG. 5A is a flow chart illustrating an example of the operation of the upload process 160 utilized by the remote power monitoring system 80 of the present invention, as shown in FIGS. 2A, 3A and 4A. The upload process 160 enables the remote monitoring device 20 to upload data to the service device 11-13.

First at step 161, the upload process 160 is initialized. This initialization includes the startup routines and processes embedded in the BIOS of the service device 11. The initialization also includes the establishment of data values for particular data structures utilized in the upload process 160.

At step 162, the upload process 160 attempts to connect to the remote monitoring device 20. At step 163, it is determined if the upload process 160 has successfully connected to the remote monitoring device 20. If it is determined in step 63 that a connection to the remote monitoring device 20 has not been successfully completed, then the service device 11 returns to repeat steps 162 and 163 provided that the maximum number of attempt has not been exceeded. However, if the maximum number of attempt has been exceeded, then the upload process 160 exits at step 169.

However, if it is determined at step 163 that a connection to the remote monitoring device 20 has completed, then the upload process 160 then enables a service representative to indicate the data items to be uploaded from the remote device at step 164. At step 165, the data items indicated are uploaded from the remote monitoring device 20. At step 166, it is determined if there are more data items to be uploaded. If it is determined that there are more data items to be uploaded, then the upload process 160 returns to repeat steps 164 through 166. However, it is determined at step 166 it there are no more data items to be uploaded, the upload process 160 then proceeds to step 167.

At step 167, it is determined if there is a remote device connected to the currently connected remote monitoring device 20, and if the user wants to upload data through the currently connected remote monitoring device 20 to another remote monitoring device 20. If it is determined at step 167 that there is another remote monitoring device 20 connected to the currently connected remote monitoring device 20, and that the user wants to upload data through the currently connected remote monitoring device 20, the other remote monitoring device 20 is then identified at step 168. The upload process 160 returns to repeat steps 160 through 168 for the other remote monitoring device 20. These actions will cause the currently connected remote monitoring device 20 to be utilized as a conduit to another remote monitoring device 20.

However, if it is determined that step 167 that either another remote monitoring device 20 is not available through the currently connected to remote monitoring device 20 or that the user does not wish to access and another remote monitoring device 20, then the upload process 160 exits at step 169.

Figure 5B:
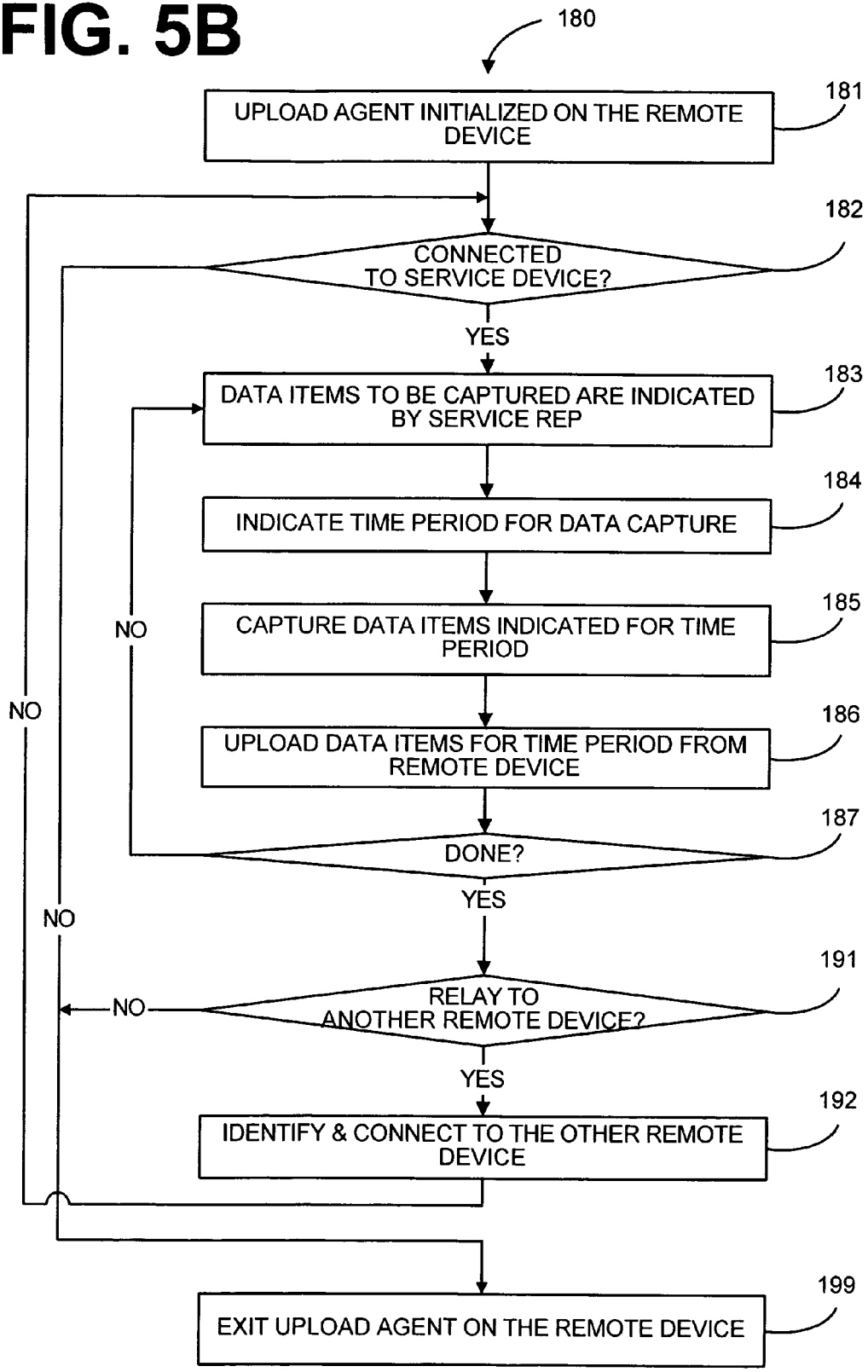
FIG. 5B is a flow chart illustrating an example of the operation of the upload agent utilized in the remote monitoring device and utilized by the remote power monitoring system of the present invention, as shown in FIGS. 2B, 3B, 3C and 4B.

FIG. 5B is a flow chart illustrating an example of the operation of the upload agent 180 utilized in the remote monitoring device 20 and utilized by the remote power monitoring system 100 of the present invention, as shown in FIGS. 2B, 3B, 3C and 4B. The upload agent 180 enables the remote monitoring device 20 to upload data to service device 11-13.

First at step 181, the upload agent 180 is initialized. This initialization includes the startup routines and processes embedded in the BIOS of the remote monitoring device 20. The initialization also includes the establishment of data values for particular data structures utilized in the upload agent 180. At step 182, the upload age of 180 determines if the remote monitoring device 20 is connected to a service device 11. If it is determined in step 182 that the remote monitoring device 20 is not connected to service device 11, then the upload agent 180 exits at step 199.

However, if it is determined at step 182 that the remote monitoring device 20 is connected to the service device 11, then the upload agent 180 allows the service representative to indicate the data items to be captured. At step 184, the time period for data capture is indicated by the service representative. At step 185, the upload agent 180 then captures the data items indicated for the indicated time period. The data items captured for the indicated time period are then uploaded from the remote monitoring device 20 to the service device 11 at step 186.

At step 187, the upload agent 180 determines if there are more data items to be captured. If it is determined to step 187 that there are more data items to be captured, the upload agent 180 then returns to repeat steps 183 through 187. However, if it is determined at step 187 that there are no additional data items to be captured, then the upload agent 180 proceeds to step 191.

At step 191, it is determined if there is a remote monitoring device 20 connected to the currently connected remote monitoring device 20. The upload agent 180 indicates the remote monitoring devices 20 that are connected to the currently connected remote monitoring device 20. The upload agent 180 then determines if the user wants to upload data through the currently connected remote monitoring device 20 to another remote monitoring device 20 by the user input identifying the other remote device to be connected to.

If it is determined in step 191 that the user wants to upload data through the currently connected remote monitoring device 20, the other remote monitoring device 20 is then identified at step 192. The upload process 160 returns to repeat steps 182 through 191 for the other remote monitoring device 20. These actions will cause the currently connected remote monitoring device 20 to be utilized as a conduit to another remote monitoring device 20.

However, if it is determined in step 191 that either another remote monitoring device 20 is not a available through the currently connected to remote monitoring device 20 or that the user does not wish to access another remote monitoring device 20, then the upload process 160 exits at step 199.

FIG. 6A is a flow chart illustrating an example of the operation of the display process 200 on service device 11 and utilized by the remote power monitoring system 80 of the present invention, as shown in FIGS. 2A, 3A and 4A. The display process 200 enables the service device 11 to acquire a real-time data from the remote monitoring device 20 for display.

First at step 201, the display process 200 is initialized. This initialization includes the startup routines and processes embedded in the BIOS of the service device 11. The initialization also includes the establishment of data values for particular data structures utilized in the display process 200.

At step 202, the display process 200 attempts to connect to the remote monitoring device 20. At step 203, it is determined if the display process 200 has successfully connected to the remote monitoring device 20. If it is determined in step 203 that a connection to the remote monitoring device 20 has not been successfully completed, then the service device 11 returns to repeat steps 202 and 203 provided that the maximum number of attempts has not been exceeded. However, if the maximum number of attempts has been exceeded, then the display process 200 exits at step 209.

However, if it is determined at step 203 that a connection to the remote monitoring device 20 has completed, then the display process 200 enables a service representative to indicate the data items to be captured on the remote device for display at step 204. At step 205, the data items indicated are displayed from the remote monitoring device 20. At step 206, it is determined if there are more data items to be displayed. If it is determined that there are more data items to be displayed, then the display process 200 returns to repeat steps 204 through 206. However, if it is determined at step 206 that there are no more data items to be displayed, the display process 200 then proceeds to step 207.

At step 207, it is determined if there are any remote monitoring devices 20 connected to the currently connected remote monitoring device 20, and if the user wants to display data through the currently connected remote monitoring device 20 from another remote monitoring device 20. If it is determined at step 207 that there is another remote monitoring device 20 connected to the currently connected remote monitoring device 20, and that the user wants to display data through the currently connected remote monitoring device 20, then the other remote monitoring device 20 is identified at step 208. The display process 200 returns to repeat steps 200 through 207 for the other remote monitoring device 20. These actions will cause the currently connected remote monitoring device 20 to be utilized as a conduit to another remote monitoring device 20.

However, if it is determined that step 207 that either another remote monitoring device 20 is not available through the currently connected to remote monitoring device 20 or that the user does not wish to access and another remote monitoring device 20, then the display process 200 exits at step 209.

FIG. 6B is a flow chart illustrating an example of the operation of display agent 220 utilized in the remote monitoring device 20 and utilized by the remote power monitoring system 100 of the present invention, as shown in FIGS. 2B, 3B, 3C and 4B. The display agent 220 enables the service device 11 to acquire a real-time data for display.

First at step 221, the display agent 220 is initialized. This initialization includes the startup routines and processes embedded in the BIOS of the remote monitoring device 20. The initialization also includes the establishment of data values for particular data structures utilized in the display agent 220. At step 222, the display age of 220 determines if the remote monitoring device 20 is connected to a service device 11. If it is determined to step 222 that the remote monitoring device 20 is not connected to service device 11, then the display agent 220 exits at step 239.

However, if it is determined at step 222 that the remote monitoring device 20 is connected to the service device 11, then the display agent 220 allows the service representative to indicate the data items to be captured. At step 224, the time period for data capture is indicated by the service representative. At step 225, the display agent 220 then captures the data items indicated for the indicated time period. The data items captured for the indicated time period are then uploaded from the remote monitoring device 20 to the service device 11 at step 226.

At step 227, the display agent 220 determines if there are more data items to be captured. If it is determined to step 227 that there are more data items to be captured, the display agent 220 then returns to repeat steps 223 through 227. However, if it is determined at step 227 that there are no additional data items to be captured, then the display agent 220 proceeds to step 231.

At step 231, it is determined if there is a remote monitoring device 20 connected to the currently connected remote monitoring device 20. The display agent 220 indicates the remote monitoring devices 20 that are connected to the currently connected remote monitoring device 20. The display agent 220 then determines if the user wants to display data through the currently connected remote monitoring device 20 to another remote monitoring device 20 by the user input identifying the other remote device to be connected to. If it is determined at step 231 that the user wants to display data through the currently connected remote monitoring device 20, the other remote monitoring device 20 is then identified at step 232. The display process 160 returns to repeat steps 222 through 231 for the other remote monitoring device 20. These actions will cause the currently connected remote monitoring device 20 to be utilized as a conduit to another remote monitoring device 20.

However, if it is determined at step 231 that either another remote monitoring device 20 is not available through the currently connected to remote monitoring device 20 or that the user does not wish to access another remote monitoring device 20, then the display process 160 exits at step 239.

FIG. 7A is a flow chart illustrating an example of the operation of the download process 240 on service device 11 and utilized by the remote power monitoring system 80 of the present invention, as shown in FIGS. 2A, 3A and 4A. The download agent 260 enables the service device 11 to download additional software or software changes to the remote monitoring device 20.

First at step 241, the download process 240 is initialized. This initialization includes the startup routines and processes embedded in the BIOS of the service device 11. The initialization also includes the establishment of data values for particular data structures utilized in the download process 240.

At step 242, the download process 240 attempts to connect to the remote monitoring device 20. At step 243, it is determined if the download process 240 has successfully connected to the remote monitoring device 20. If it is determined at step 243 that a connection to the remote monitoring device 20 has not been successfully completed, then the service device 11 returns to repeat steps 242 and 243 provided that the maximum number of attempts has not been exceeded. However, if the maximum number of attempts has been exceeded, then the download process 240 exits at step 259.

However, if it is determined at step 243 that a connection to the remote monitoring device 20 has completed, then the download process 240 then enables a service representative to indicate the data items to be downloaded to the remote device at step 244. At step 245, the data items indicated are downloaded to the remote monitoring device 20. At step 246, it is determined if there are more data items to be downloaded. If it is determined that there are more data items to be downloaded, then the download process 240 returns to repeat steps 244 through 246. However, if it is determined at step 246 it there are no more data items to be downloaded, the download process 240 then proceeds to step 247.

At step 247, it is determined if there is a remote device connected to the currently connected remote monitoring device 20, and if the user wants to download data through the currently connected remote monitoring device 20 to another remote monitoring device 20. If it is determined at step 251 that there is another remote monitoring device 20 connected to the currently connected remote monitoring device 20, and that the user wants to download data through the currently connected remote monitoring device 20, then the other remote monitoring device 20 is identified at step 252. The download process 240 returns to repeat steps 241 through 251 for the other remote monitoring device 20. These actions will cause the currently connected remote monitoring device 20 to be utilized as a conduit to another remote monitoring device 20.

However, if it is determined at step 251 that either another remote monitoring device 20 is not available through the currently connected to remote monitoring device 20 or that the user does not wish to access another remote monitoring device 20, then the download process 240 exits at step 259.

Figure 7B:
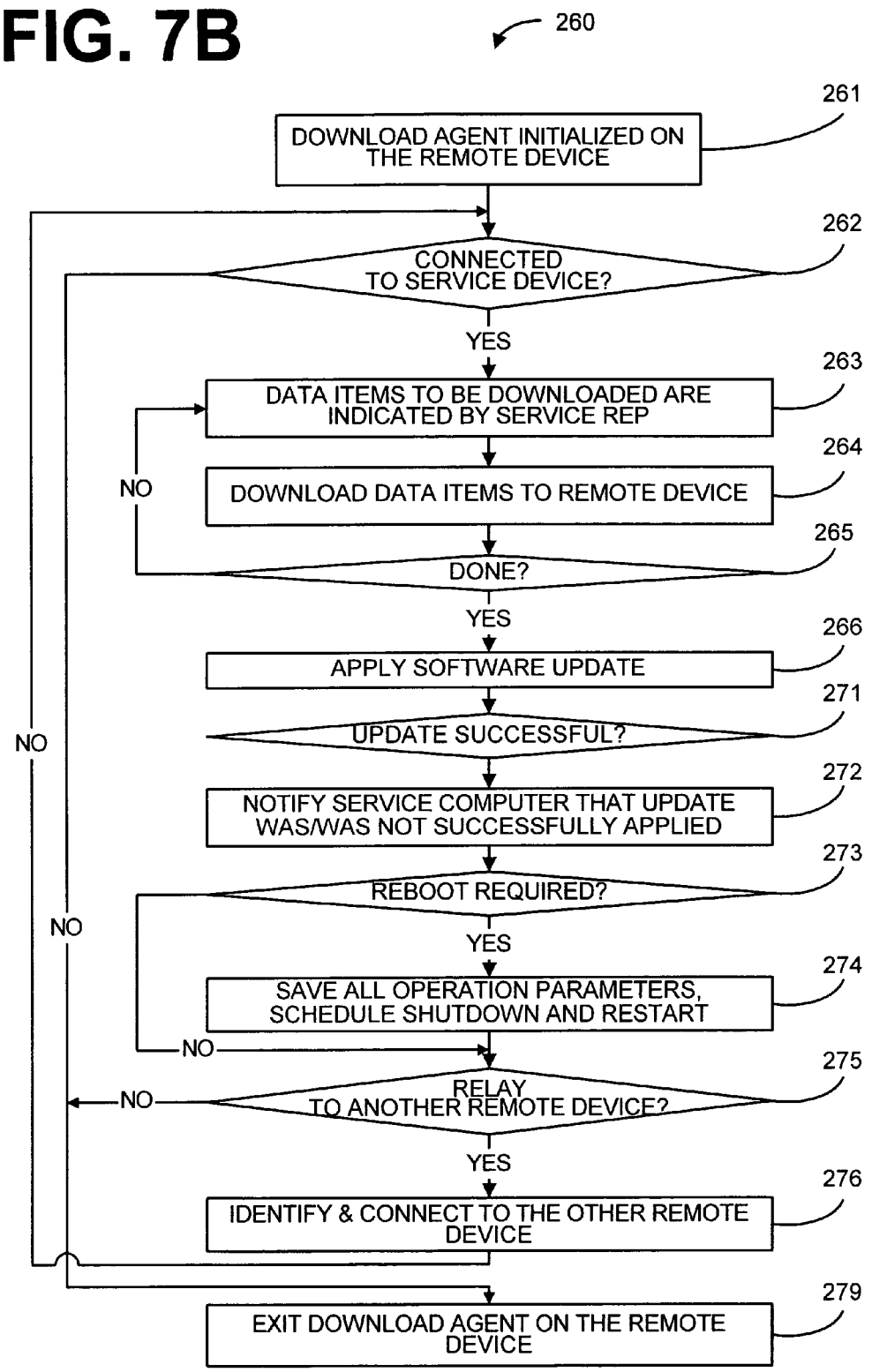
FIG. 7B is a flow chart illustrating an example of the operation of the download agent utilized in the remote monitoring device and utilized by the remote power monitoring system of the present invention, as shown in FIGS. 2B, 3B, 3C and 4B.

FIG. 7B is a flow chart illustrating an example of the operation of the download agent 260 utilized in the remote monitoring device 20 and utilized by the remote power monitoring system 100 of the present invention, as shown in FIGS. 2B, 3B, 3C and 4B. The download agent 260 enables the remote monitoring device 20 to download additional software or software changes.

First at step 261, the download agent 260 is initialized. This initialization includes the startup routines and processes embedded in the BIOS of the remote monitoring device 20. The initialization also includes the establishment of data values for particular data structures utilized in the download agent 260. At step 262, the download agent 260 determines if the remote monitoring device 20 is connected to a service device 11. If it is determined in step 262 that the remote monitoring device 20 is not connected to service device 11, then the download agent 260 exits at step 279.

However, if it is determined at step 262 that the remote monitoring device 20 is connected to the service device 11, then the download agent 260 allows the service representative to indicate the data items to be downloaded. At step 264, the download agent 260 then downloads the data from the service device 11.

At step 265, the download agent 260 determines if there are more data items to be downloaded. If it is determined to step 265 that there are more data to be downloaded, the download agent 260 then returns to repeat steps 263 through 265. However, if it is determined at step 265 that there is no additional data to be downloaded, then the download agent 260 applies the software update downloaded at step 266. At step 271, download agent 260 then determines if the software update was successfully applied. At step 272, the download agent 260 sends a notification to the service device 11 indicating whether or not the software update received was successfully applied. At step 273, the download agent 260 determines if a reboot is required because of the software update. If it is determined at step 273 that a reboot is not required, then the download agent 260 proceeds to step 275. However, if it is determined at step 273 that a reboot is required, then the download agent 260 saves all operation parameters, schedules the shutdown and restart of the remote monitoring device 20.

At step 271, it is determined if there is a remote monitoring device 20 connected to the currently connected remote monitoring device 20. The download agent 260 indicates the remote monitoring devices 20 that are connected to the currently connected remote monitoring device 20. The download agent 260 then determines if the user wants to download data through the currently connected remote monitoring device 20 to another remote monitoring device 20 by the user input identifying the other remote device to be connected to. If it is determined at step 275 that the user wants to download data through the currently connected remote monitoring device 20, the other remote monitoring device 20 is then identified at step 276. The download process 260 returns to repeat steps 262 through 275 for the other remote monitoring device 20. These actions will cause the currently connected remote monitoring device 20 to be utilized as a conduit to another remote monitoring device 20.

However, if it is determined at step 275 that either another remote monitoring device 20 is not a available through the currently connected to remote monitoring device 20 or that the user does not wish to access another remote monitoring device 20, then the download process 260 exits at step 279.

Figure 8A:
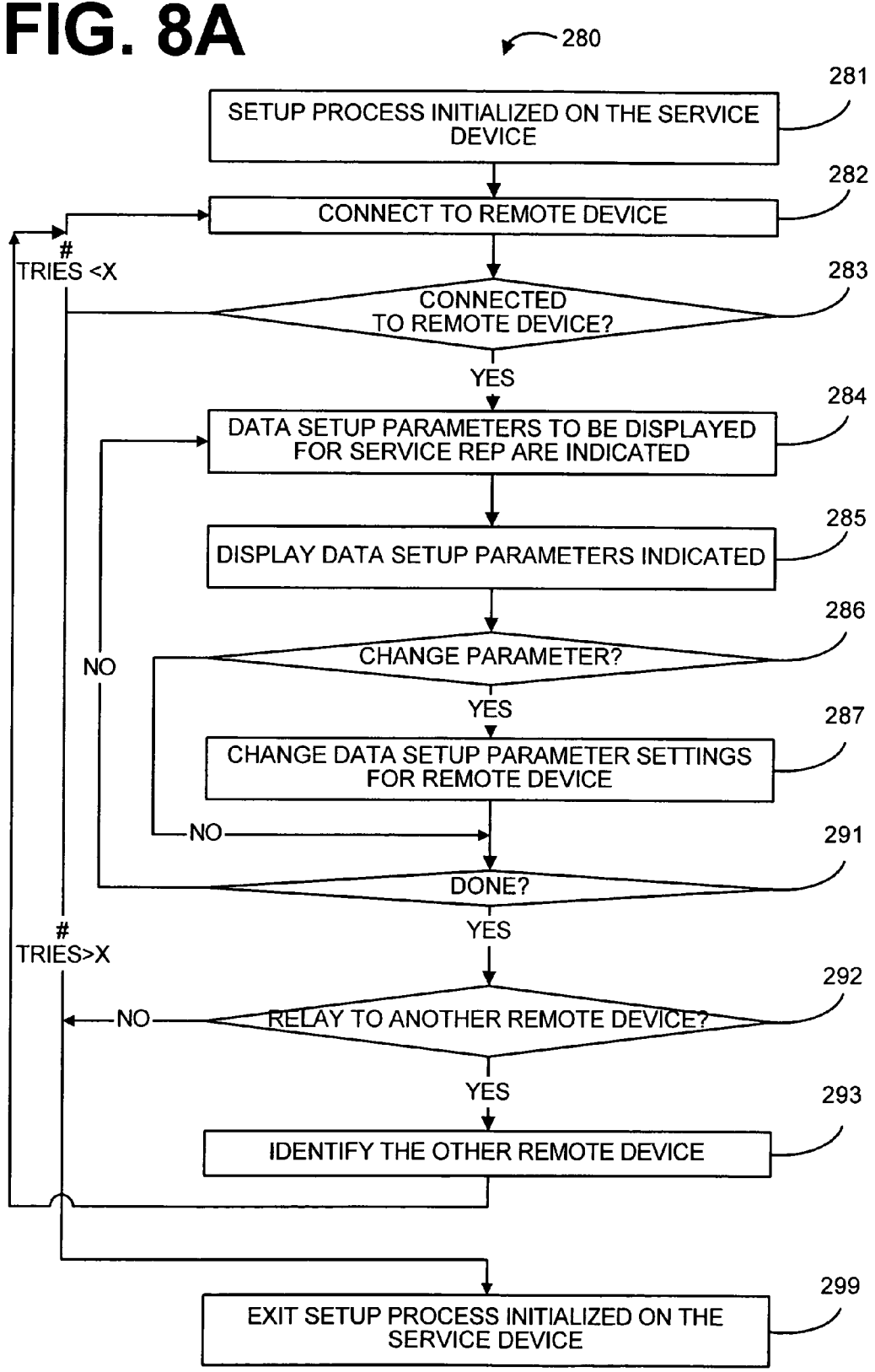
FIG. 8A is a flow chart illustrating an example of the operation of the set-up process utilized by the remote power monitoring system of the present invention, as shown in FIGS. 2A, 3A and 4A.

FIG. 8A is a flow chart illustrating an example of the operation of the setup process 280 on service device 11 and utilized by the remote power monitoring system 80 of the present invention, as shown in FIGS. 2A, 3A and 4A. The setup process 280 enables modification of the system parameters for remote monitoring device 20 by a service representative.

First at step 281, the setup process 280 is initialized. This initialization includes the startup routines and processes embedded in the BIOS of the service device 11. The initialization also includes the establishment of data values for particular data structures utilized in the setup process 280.

At step 282, the setup process 280 attempts to connect to the remote monitoring device 20. At step 283, it is determined if the setup process 280 has successfully connected to the remote monitoring device 20. If it is determined at step 283 that a connection to the remote monitoring device 20 has not been successfully completed, then the service device 11 returns to repeat steps 282 and 283 provided that the maximum number of attempts has not been exceeded. However, if the maximum number of attempt has been exceeded, then the setup process 280 exits at step 299.

However, if it is determined at step 283 that a connection to the remote monitoring device 20 has completed, then the setup process 280 then enables a service representative to indicate the data items to be displayed from the remote monitoring device 20 at step 284. At step 285, the data items indicated are displayed from the remote monitoring device 20. At step 286, it is determined if parameters are to be changed. If it is determined at step 286 that parameters are not to be changed, the setup process 280 proceeds to step 291. However, if it is determined at step 286 that a change in parameters is to occur, then the setup process 280 changes the data setup parameter settings in the remote monitoring device 20 at step 287. At step 291, the setup process 280 determines if there are more setup parameters to be changed. If it is determined that there are more parameters to be changed, then the setup process 280 returns to repeat steps 284 through 291. However, if it is determined at step 291 that there are no more data items to be changed, the setup process 280 then proceeds to step 292.

At step 292, it is determined if there is a remote device connected to the currently connected remote monitoring device 20, and if the user wants to setup data through the currently connected remote monitoring device 20 to another remote monitoring device 20. If it is determined at step 292 that there is another remote monitoring device 20 connected to the currently connected remote monitoring device 20, and that the user wants to setup data through the currently connected remote monitoring device 20, then the other remote monitoring device 20 is identified at step 293. The setup process 280 returns to repeat steps 280 through 292 for the other remote monitoring device 20. These actions will cause the currently connected remote monitoring device 20 to be utilized as a conduit to another remote monitoring device 20.

However, if it is determined at step 292 that either another remote monitoring device 20 is not available through the currently connected to remote monitoring device 20 or that the user does not wish to access another remote monitoring device 20, then the setup process 280 exits at step 299.

FIG. 8B is a flow chart illustrating an example of the operation of the setup agent 300 utilized in the remote monitoring device 20 and utilized by the remote power monitoring system 100 of the present invention, as shown in FIGS. 2B, 3B, 3C and 4B. The setup agent 300 enables modification of the system parameters in the remote monitoring device 20 by a service representative.

First at step 301, the setup agent 300 is initialized. This initialization includes the startup routines and processes embedded in the BIOS of the remote monitoring device 20. The initialization also includes the establishment of data values for particular data structures utilized in the setup agent 300. At step 302, the setup agent 300 determines if the remote monitoring device 20 is connected to a service device 11. If it is determined at step 302 that the remote monitoring device 20 is not connected to service device 11, then the setup agent 300 exits at step 199.

However, if it is determined at step 302 that the remote monitoring device 20 is connected to the service device 11, then the setup agent 300 allows the service representative to indicate the system parameters to be displayed. At step 304, the setup agent 300 sends the system parameter indicated to the service device 11 at step 304.

At step 305, the setup agent 300 determines if it has received a data parameter change from the service representative on service device 11. If it is determined at step 305 that no data parameter change request is received, then the setup agent 300 proceeds to step 307. However, if it is determined at step 305 that a data parameter change request was received, then the setup agent 300 changes the data setup parameter setting for the remote monitoring device 20 as indicated in the request received.

At step 307, the setup agent 300 determines if there are more parameter change requests. If it is determined at step 307 that there are no parameter change requests, then the setup agent 300 proceeds to step 311. However, if it is determined at step 307 that there are more parameter change requests, the setup agent 300 then returns to repeat steps 303 through 307.

At step 311, the setup agent 300 determines if a system reboot is required due to a data parameter change. If it is determined at step 311 that no system reboot is required, then the setup agent 300 proceeds to step 313. However, if it is determined at step 311 that a system reboot is required, then the setup agent 300 saves all operational parameters, and schedules a system shut down and restart at step 312.

At step 313, it is determined if there is a remote monitoring device 20 connected to the currently connected remote monitoring device 20. The setup agent 300 indicates the remote monitoring devices 20 that are connected to the currently connected remote monitoring device 20. The setup agent 300 then determines if the user wants to setup data through the currently connected remote monitoring device 20 to another remote monitoring device 20 by the user input identifying the other remote device to be connected to.

If it is determined at step 313 that the user wants to setup data through the currently connected remote monitoring device 20, the other remote monitoring device 20 is then identified at step 314. The setup process 160 returns to repeat steps 302 through 313 for the other remote monitoring device 20. These actions will cause the currently connected remote monitoring device 20 to be utilized as a conduit to another remote monitoring device 20.

However, if it is determined at step 313 that another remote monitoring device 20 is not available through the currently connected to remote monitoring device 20 or that the user does not wish to access another remote monitoring device 20, then the setup process 160 exits at step 319.

Figure 9A:
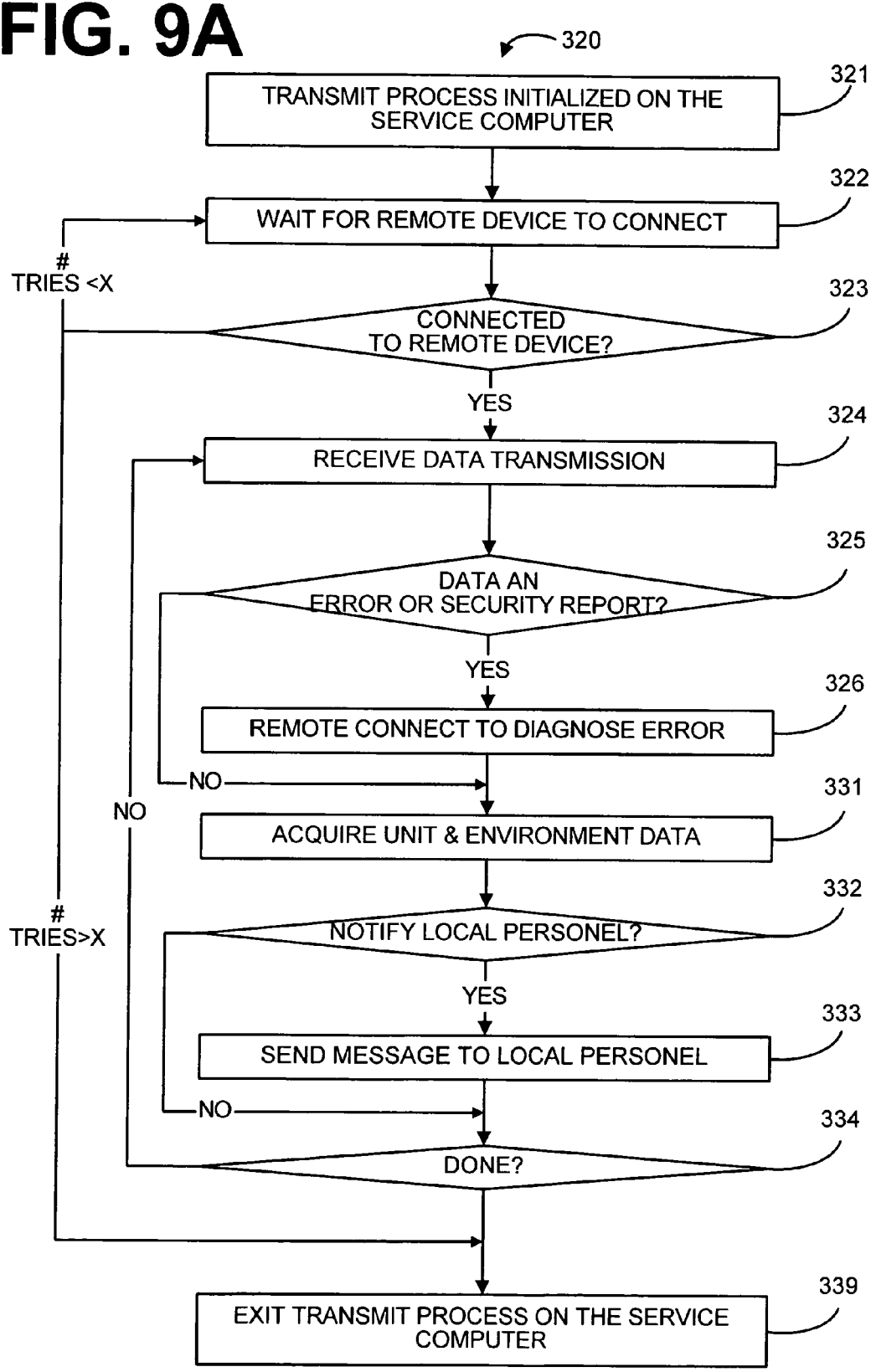
FIG. 9A is a flow chart illustrating an example of the operation of the network transmit process utilized by the remote power monitoring system of the present invention, as shown in FIGS. 2A, 3A and 4A.

FIG. 9A is a flow chart illustrating an example of the operation of the transmit process 320 on service device 11 and utilized by the remote power monitoring system 80 of the present invention, as shown in FIGS. 2A, 3A and 4A. The transmit agent 340 provides for the transmission of data captured from power system device 7 and computed by remote monitoring device 20 to service device 11.

First at step 321, the transmit process 320 is initialized. This initialization includes the startup routines and processes embedded in the BIOS of the service device 11. The initialization also includes the establishment of data values for particular data structures utilized in the transmit process 320.

At step 322, the transmit process 320 attempts to connect to the remote monitoring device 20. At step 323, it is determined if the transmit process 320 has successfully connected to the remote monitoring device 20. If it is determined at step 323 that a connection to the remote monitoring device 20 has not been successfully completed, then the service device 11 returns to repeat steps 322 and 323 provided that the maximum number of attempts has not been exceeded. However, if the maximum number of attempts has been exceeded, then the transmit process 320 exits at step 339. However, if it is determined at step 323 that a connection to the remote monitoring device 20 has completed, then the transmit process 320 receives a data transmission from the remote device at step 324.

At step 325, it is determined if the data transmission is due to an error or security report. If it is determined that the data transmission is not due to an error or security report, then the transmit process 320 proceeds to step 331. However, if it is determined at step 325 that the data transmission is due to an error or security report, then the transmit process 320 provides a remote connection to the remote monitoring device 20 in an attempt to diagnose the error at step 326.

At step 331, the transmit process 320 acquires the remote monitoring device 20 unit and environmental data. At step 332, the transmit process determines if a notification of local personnel is required.

If it is determined at step 332 that notification of local personnel is not required, then the transmit process 320 proceeds to step 334. However, if it is determined at step 332 that notification of local personnel is required, then the transmit process 327 sends a message to local personnel notifying them of the problem. The recipients of this message can be but are not limited to, local technician, police, fire, power linemen, security, upper management and the like. The message may utilize any number of current techniques, including but not limited to e-mail, voice mail, SMS messaging, pre-recorded messages, and the like.

At step 334, the transmit process 320 determines if there more messages to be received. If it is determined at step 334 that there are more messages to be received, then the transmit process 320 returns to repeat steps 322 through 334. However, if it is determined that step 334 that no additional messages are to be received from remote monitoring device 20, then the transmit process 320 exits at step 339.

Figure 9B:
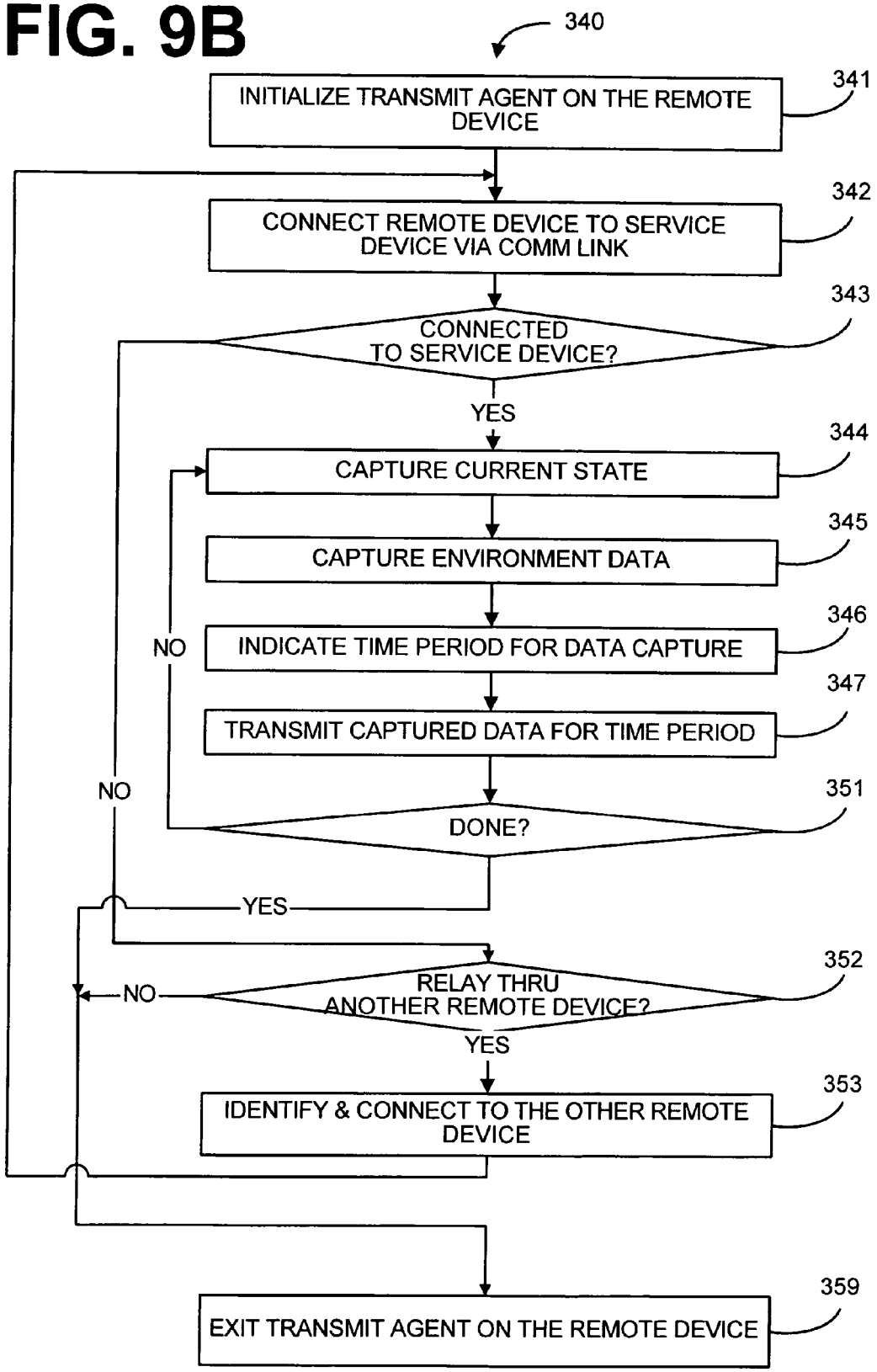
FIG. 9B is a flow chart illustrating an example of the operation of the network transmit agent utilized in the remote monitoring device and utilized by the remote power monitoring system of the present invention, as shown in FIGS. 2B, 3B, 3C and 4B.

FIG. 9B is a flow chart illustrating an example of the operation of the transmit agent 340 utilized in the remote monitoring device 20 and utilized by the remote power monitoring system 100 of the present invention, as shown in FIGS. 2B, 3B, 3C and 4B. The transmit agent 340 provides for the transmission of data captured from power system device 7 to service device 11.

First at step 341, the transmit agent 340 is initialized. This initialization includes the startup routines and processes embedded in the BIOS of the remote monitoring device 20. The initialization also includes the establishment of data values for particular data structures utilized in the transmit agent 340. At step 342, the transmit agent 340 attempts to connect to a service device 11 through a communication link. As stated previously, there are a number of communication links that can be utilized to perform this task. These links include, but are not limited to, Bluetooth, WiFi, cellular, optical, satellite, RF, POTS, Ethernet, LAN, WAN, magnetic induction, coax, RS-485, INCOM, SCADA or the like.

At step 343, the transmit agent 340 determines if the remote monitoring device 20 is connected to a service device 11. If it is determined at step 343 that the remote monitoring device 20 is not connected to service device 11, then the transmit agent 340 proceeds to step 352. However, if it is determined at step 343 that the remote monitoring device 20 is connected to the service device 11, then the transmit agent 340 captures the current state at step 344. At step 345, the environmental data for the remote monitoring device 20 is captured. This environmental data includes but is not limited to temperature, humidity, security factors, and the like. At step 344, the time period for data captured is indicated for the service representative. At step 345, the transmit agent 340 then transmits the data captured from the remote monitoring device 20 to the service device 11 at step 347.

At step 351, the transmit agent 340 determines if there are more data transmissions to be sent. If it is determined at step 351 that there are more data transmissions to be sent, the transmit agent 340 then returns to repeat steps 344 through 351. However, if it is determined at step 351 that there are no additional data transmissions to be sent, then the transmit agent 340 exits at step 359.

At step 352, it is determined if there is a remote monitoring device 20 connected to the currently connected remote monitoring device 20. The transmit agent 340 then determines if it is possible to transmit data through another remote monitoring device 20 to a service device 11. If it is determined at step 352 that it is possible to transmit data through another remote monitoring device 20, then the other remote monitoring device 20 is identified and connected, at step 353. The transmit process 340 returns to repeat steps 342 through 351 using the connection through the other remote monitoring device 20. These actions will cause the other remote monitoring device 20 to be utilized as a conduit for this remote monitoring device 20. However, if it is determined that step 352 that another remote monitoring device 20 is not available, then the transmit process 160 exits at step 359.

FIG. 10A is a flow chart illustrating an example of the operation of the other process 360 utilized by the remote power monitoring system 80 of the present invention, as shown in FIGS. 2A, 3A and 4A. The other process 360 enables the service device 11 to perform functions installed later, including but not limited to the remote control feature. The functions described in other process 360 may be incorporated into remote monitoring system 80 (FIG. 4A) on the service device 11, instead of installed later.

First at step 361, the other process 360 is initialized. This initialization includes the startup routines and processes embedded in the BIOS of the service device 11. The initialization also includes the establishment of data values for particular data structures utilized in the other process 360.

At step 362, it is determined if new firmware or software is to be added. If it is determined at step 362 that new firmware or software is not to be added, then the other process 360 skips to step 364. However, if it is determined at step 362 that new firmware or software is to be added, the install process is performed at step 363. The install process is herein defined in further detail with regard to FIG. 11A.

At step 364, it is determined if the data acquisition function is selected. If it is determined at step 364 that the data acquisition function is not selected, then the other process 360 then proceeds to step 366. However, if it is determined at step 364 that the data acquisition function is selected, then the other process 360 performs the data acquisition function at step 365. The data acquisition function is herein defined in further detail with regard to FIG. 12A.

At step 366, it is determined if the control function is selected. If it is determined at step 366 that the control function is not selected, then the other process 360 then proceeds to step 368. However, if it is determined at step 366 that the control function is selected, then the other process 360 performs the control function at step 367. The control function is herein defined in further detail with regard to FIG. 25A.

At step 368, the other process 360 determines if there is more processing to be done. If it is determined that more processing is to be done, then the other process 360 then returns to repeat steps 362 through 368. However, if it is determined at step 368 that there is no more processing to be performed, then the other process 360 exits at step 369.

FIG. 10B is a flow chart illustrating an example of the operation of the other agent 380 utilized in the remote monitoring device 20 and utilized by the remote power monitoring system 100 of the present invention, as shown in FIGS. 2B, 3B, 3C and 4B. The other agent 380 enables the remote device 20 to perform functions installed after installation. The functions described in other agent 380 may be incorporated into remote monitoring 100 (FIG. 4B) on the remote device 20, instead of installed later.

First at step 381, the other agent 380 is initialized. This initialization includes the startup routines and processes embedded in the BIOS of the remote monitoring device 20. The initialization also includes the establishment of data values for particular data structures utilized in the other agent 380.

At step 382, it is determined if new firmware or software is to be added. If it is determined at step 382 that new firmware or software is not to be added, then the other agent 380 skips to step 384. However, if it is determined at step 382 that new firmware or software is to be added, then the install agent is performed at step 383. The install agent is herein defined in further detail with regard to FIG. 11B.

At step 384, it is determined if the data acquisition function is selected. If it is determined at step 384 that the data acquisition function is not selected, then the other agent 380 then proceeds to step 386. However, if it is determined at step 384 that the data acquisition function is selected, then the other agent 380 performs the data acquisition agent function at step 385. The data acquisition agent function is herein defined in further detail with regard to FIG. 12B.

At step 386, it is determined if the control function is selected. If it is determined at step 386 that the control function is not selected, then the other agent 380 then proceeds to step 388. However, if it is determined at step 386 that the control function is selected, then the other agent 380 performs the control agent function at step 387. The control agent function is herein defined in further detail with regard to FIG. 18B.

At step 388, the other agent 380 determines if there is more processing to be done. If it is determined that more processing is to be done, then the other agent 380 then returns to repeat steps 382 through 388. However, if it is determined at step 388 that there is no more processing to be performed, then the other agent 380 exits at step 389.

Figure 11A:
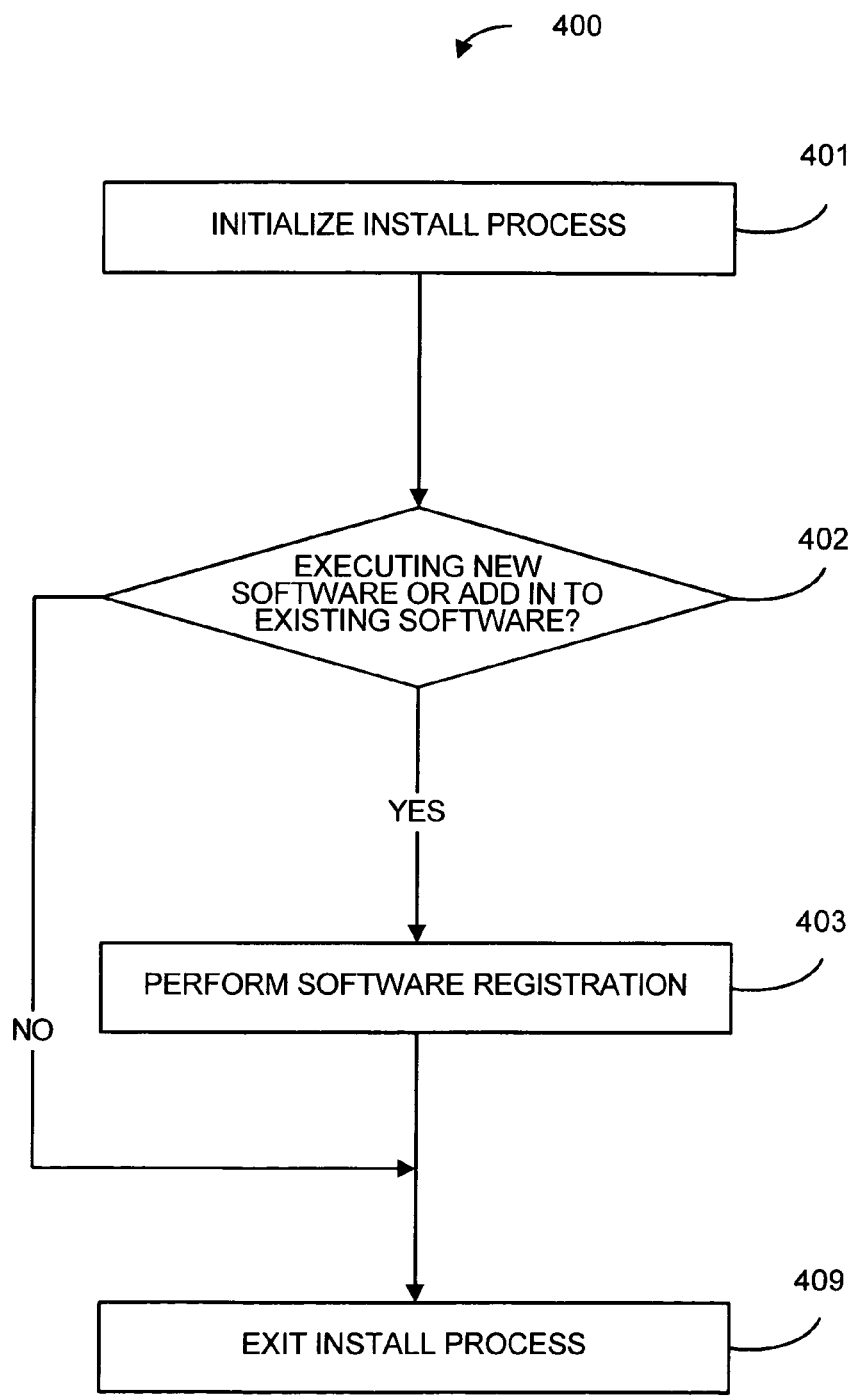
FIG. 11A is a flow chart illustrating an example of the operation of the install process utilized by the remote power monitoring system of the present invention, as shown in FIGS. 2A, 3A and 4A.

FIG. 11A is a flow chart illustrating an example of the operation of the install process 400 utilized by the remote power monitoring system 80 of the present invention, as shown in FIGS. 2A, 3A, 4A and 10A. The install process 400 enables that installation of new software to the service device 11.

First at step 401, the install process 400 is then initialized. This initialization includes the startup routines and processes embedded in the BIOS of the service device 11. The initialization also includes the establishment of data values for particular data structures utilized in the install process 400.

At step 402, the install process 400 determines if it is executing new or add-in software. If it is determined at step 402 that the service device 11 is not executing new software, then the install process 400 proceeds to step 409 and exits. However, if it is determined that the service device 11 is executing new software, the install process 400 performs software registration at step 403. After performing the software registration at step 403, the install process 400 then exits at step 409.

Figure 11B:
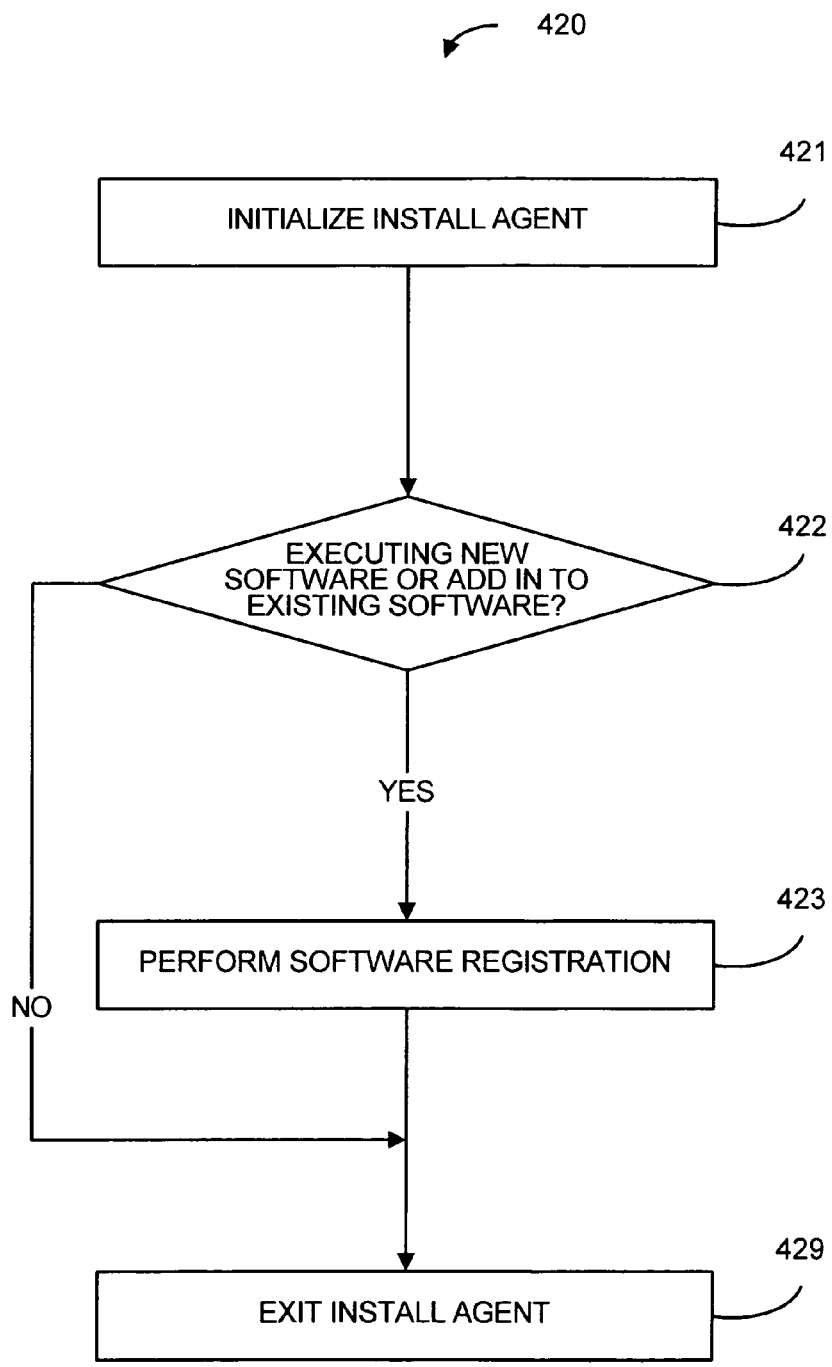
FIG. 11B is a flow chart illustrating an example of the operation of the install agent utilized in the remote monitoring device and utilized by the remote power monitoring system of the present invention, as shown in FIGS. 2B, 3B, 3C, 4B and 10B.

FIG. 11B is a flow chart illustrating an example of the operation of the install agent 420 utilized in the remote monitoring device 20 and utilized by the remote power monitoring system 100 of the present invention, as shown in FIGS. 2B, 3B, 3C, 4B and 10B. The install agent 420 enables the installation of new software to the remote monitoring device 20.

First at step 421, the install agent 420 is initialized. This initialization includes the startup routines and processes embedded in the BIOS of the remote monitoring device 20. The initialization also includes the establishment of data values for particular data structures utilized in the install agent 420.

At step 422, the install agent 420 determines if it is executing new or add-in software. If it is determined at step 42 that the service device is not executing new software, then the install agent 420 proceeds to step 429 and exits. However, if it is determined that the remote monitoring device 20 is executing new software, the install agent 420 performs a software registration at step 423. After performing the software registration at step 423, the install agent 420 then exits at step 429.

FIG. 12A is a flow chart illustrating an example of the operation of the data acquisition process 440 utilized by the remote power monitoring system 80 of the present invention, as shown in FIGS. 2A, 3A, 4A and 10A. The data acquisition process 440 enables the performance of the parameter display, the parameter update and power device status changes on the service device 11.

First at step 441, the data acquisition process 440 is then initialized. This initialization includes the startup routines and processes embedded in the BIOS of the service device 11. The initialization also includes the establishment of data values for particular data structures utilized in the data acquisition process 440.

At step 442, the software key authentication is performed. The software key authentication is herein defined in further detail with regard to FIG. 13. The software key authentication is a security means to prevent unauthorized access to the remote monitoring device 20 by unauthorized personnel.

At step 443, the establish communication link process is performed. The establish communication link process is herein defined in further detail with regard to FIG. 14A. The establish communication link process enables a user to poll for operational remote monitoring devices 20.

After the establishing a communication link with a particular power device, the data acquisition process 440 enables a user to acquire current set point data from the power device 7 connected to the selected remote monitoring device 20, at step 444.

At step 445, the current set point data is displayed on the service device 11. Examples of screen display formats is illustrated and FIGS. 12C through 12E. In the illustrated examples, the power device 7 is a network protector and therefore the parameter information illustrated is for a network protector. It should be understood that other types of power devices 7 would display other unique types of parameter data.

At step 446, the data acquisition process 440 acquires the user input. At step 447, it is determined if refresh of the current status screen is selected. If it is determined to step 447 that refresh of the current status screen is selected, then the data acquisition process 440 returns to repeat steps 443 through 447. However, if it is determined at step 447 that refresh of the current status screen for the currently connected power device 7 is not requested, the data acquisition process 440 then determines if the user has elected to display parameters of the power device.

If it is determined at step 448 that the user has not elected to display parameters of the power device, then the data acquisition process 440 proceeds to step 451. However, if it is determined that the user has elected to display the parameters of the power device, the data acquisition process 440 performs the parameter process at step 449. The parameter process is herein defined in further detail with regard to FIG. 15A.

At step 451, it is determined if the user has elected to display the value of the parameters. If it is determined at step 451 that the user has not selected to display the value of the parameters, then the data acquisition process 440 proceeds to step 453. However, if it is determined that the user has elected to display the value of the parameters, the data acquisition process 440 performs the value process at step 452. The value process is herein defined in further detail with regard to FIG. 16A.

At step 453, it is determined if the user has elected to send parameter updates to the power device 7 through the remote monitoring device 20. If is determined at step 453 that the user has not elected to send parameter updates to the power device, then the data acquisition process 440 proceeds to step 455. However, if it is determined that the user has elected to send parameter updates to the power device, then the data acquisition process 440 performs the send process at step 454. The send process is herein defined in further detail with regard to FIG. 17A.

At step 455, it is determined if the user has elected to refresh the parameter values with default values. If it is determined at step 455 that the user has not elected to refresh the parameter with default values, then the data acquisition process 440 proceeds to step 457. However, if it is determined that the user has elected to refresh the parameter with default values, then the data acquisition process 440 refreshes the parameters of the power device 7 with default values at step 454.

At step 457, the data acquisition process 440 determines if there is more processing to be performed. If it is determined at step 457 that there is more processing to be performed for the power device 7 connected to the remote monitoring device 20, then the data acquisition process 440 returns to repeat steps 444 through 457. However, if it is determined at step 457 that there are no more steps to be performed for the currently connected the remote monitoring device 20, then the data acquisition process 440 determines if there are other units to be processed at step 458. If it is determined that there are other units to be processed, the data acquisition process 440 returns to repeat steps 443 through 458. However, if there are no other units to be processed, then the data acquisition process 440 exits at step 459.

Figure 12B:
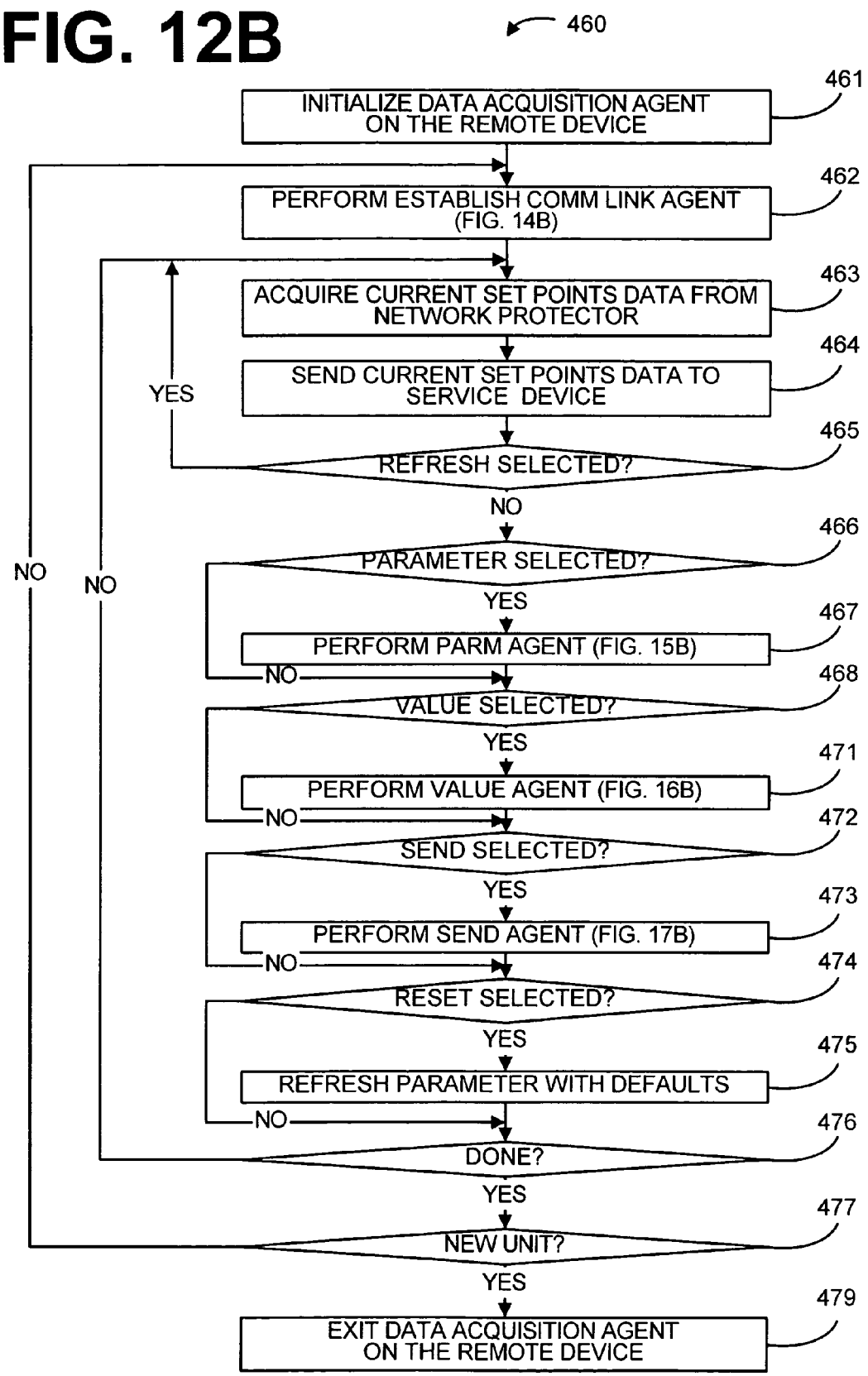
FIG. 12B is a flow chart illustrating an example of the operation of the data acquisition agent utilized in the remote monitoring device and utilized by the remote power monitoring system of the present invention, as shown in FIGS. 2B, 3B, 3C, 4B and 10B.
Figure 12C:
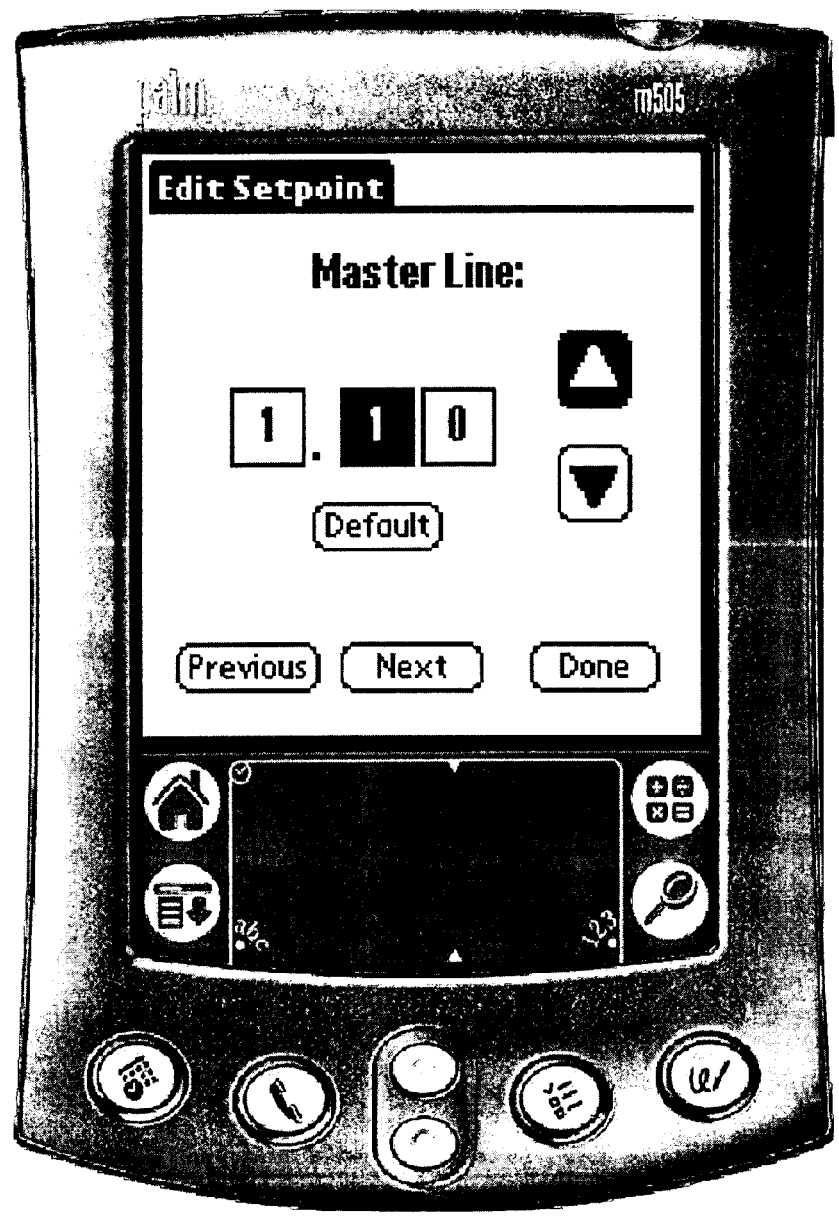
FIG. 12C is a diagram of a screen display in accordance with one embodiment.
Figure 12D:
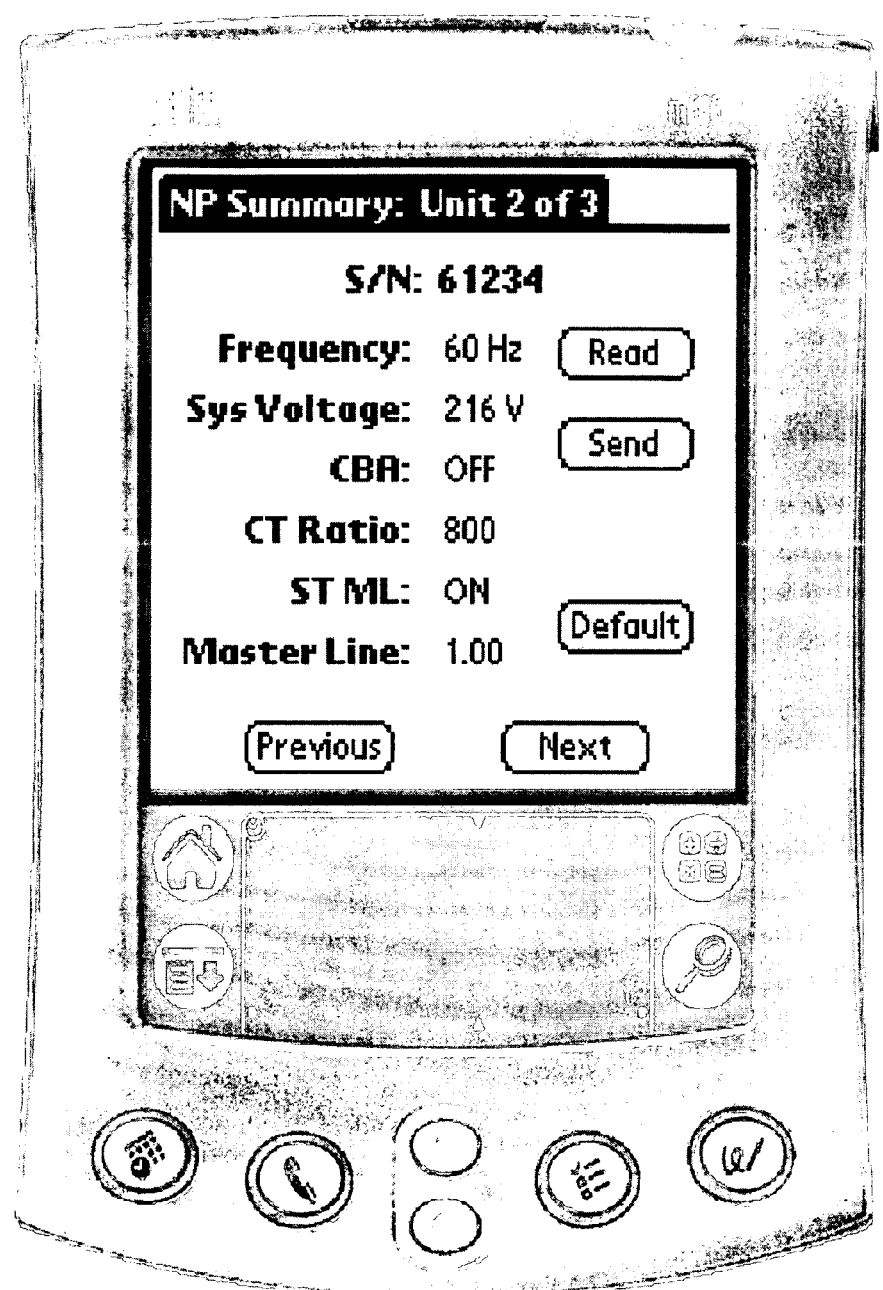
FIG. 12D is a diagram of another screen display in accordance with one embodiment.

FIG. 12B is a flow chart illustrating an example of the operation of the data acquisition agent 460 utilized in the remote monitoring device 20 and utilized by the remote power monitoring system 100 of the present invention, as shown in FIGS. 2B, 3B, 3C, 4B and 10B. The data acquisition agent 460 enables the performance of the parameter display, the parameter update and power device status changes on the remote device 20.

First at step 461, the data acquisition agent 460 is initialized. This initialization includes the startup routines and processes embedded in the BIOS of the remote monitoring device 20. The initialization also includes the establishment of data values for particular data structures utilized in the data acquisition agent 460.

At step 462, the establish communication link process is performed. The establish communication link agent is herein defined in further detail with regard to FIG. 14B. The establish communication link agent enables a user to poll for operational remote monitoring devices 20.

After the establishing a communication link with a particular power device, the data acquisition agent 460 enables a user to acquire current set point data from the power device 7 connected to the selected remote monitoring device 20, at step 463. The current set point data is acquired in order to inform the user of the current set points of the power device 7. This information is provided so that if changes or analysis is to be performed that the user then knows the current set up of power device 7.

At step 464, the current set point data is acquired from the power device 7 by the remote monitoring device 20. At step 464, the data acquisition agent 460 sends the current set point data to the service device 11. At step 465, the data acquisition agent 460 determines if refresh of the current set point data is selected. If it is determined to step 465 that refresh of the current set point data is selected, then the data acquisition agent 460 returns to repeat steps 463 through 465. However, if it is determined at step 465 that refresh of the current set point data for the currently connected power device 7 is not requested, the data acquisition agent 460 then determines if the user has elected to display parameters of the power device 7 at step 466. The current set point data is displayed in order to inform the user of the current set points of the power device 7. This information is provided so that if changes or analysis is to be performed that the user then knows the current set up of power device 7.

If it is determined at step 466 that the user has not elected to display parameters of the power device, then the data acquisition agent 460 proceeds to step 468. However, if it is determined that the user has elected to display the parameters of the power device, then the data acquisition agent 460 performed the parameter agent at step 467. The parameter agent is herein defined in further detail with regard to FIG. 22B.

At step 468, it is determined if the user has elected to display the value of the parameters. If it is determined at step 468 that the user has not elected to display the value of the parameters, then the data acquisition agent 460 proceeds to step 472. However, if it is determined that the user has elected to display the value of the parameters, the data acquisition agent 460 performs the value agent at step 471. The value agent is herein defined in further detail with regard to FIG. 23B.

At step 472, it is determined if the user has elected to send parameter updates to the power device 7 through the remote monitoring device 20. If it is determined at step 472 that the user has not elected to send parameter updates to the power device, then the data acquisition agent 460 proceeds to step 474. However, if is determined that the user has elected to send parameter updates to the power device, then the data acquisition agent 460 performs the send process at step 473. The send process is herein defined in further detail with regard to FIG. 24B.

At step 474, it is determined if the user has elected to refresh the parameter values with default values. If it is determined at step 474 that the user has not elected to refresh the parameter with default values, then the data acquisition agent 460 proceeds to step 476. However, if it is determined that the user has elected to refresh the parameter with default values, then the data acquisition agent 460 refreshes the parameters of the power device 7 with default values at step 475.

At step 476, the data acquisition agent 460 determines if there is more processing to be performed. If it is determined at step 476 that there is more processing to be performed for the power device 7 connected to the remote monitoring device 20, then the data acquisition agent 460 returns to repeat steps 463 through 476. However, if it is determined in step 476 that there are no more steps to be performed for the currently connected the remote monitoring device 20, then the data acquisition agent 460 determines if there are other units to be processed at step 477. If it is determined that there are other units to be processed, the data acquisition agent 460 returns to repeat steps 462 through 477. However, if there are no other units to be processed, then the data acquisition agent 460 exits at step 479.

FIG. 13 is a flow chart illustrating an example of the operation of the software key authentication process 1500 utilized by the remote power monitoring system of the present invention, as shown in FIGS. 2A, 3A, 4A and 12A. The software key authentication process 480 enables the service device 11 to determine if an authentication key has already been processed for access to the software. The software key authentication process 480 also allows user authentication as well.

First at step 481, the software key authentication process 480 is initialized. This initialization includes the startup routines and processes embedded in the BIOS of the service device 11. The initialization also includes the establishment of data values for particular data structures utilized in the software key authentication process 480.

At step 482, it is determined at the software key has already been processed. If it is determined at step 482 that the software key has already been processed, then the software key authentication process 480 proceeds to step 485. However, if it is determined at step 482 that the software key has not been processed, then the software key authentication process 480 prompts the user for a software key at step 483. The software key requested can be in any form including Alpha, numeric, alphanumeric or combining keystrokes.

At step 484, the software key authentication process 480 determines if the user input a valid software key. If it is determined at step 484 that the user did not input a valid software key, then the software key authentication process 480 returns to repeat step 483. However if it is determined at step 484 that a valid key was processed then the software key authentication process 480 determines if user authentication is required at step 485. User authentication can be utilized where different groups of users have different access capabilities.

If it is determined at step 485 that user authentication is not required, then the software key authentication process 480 proceeds to step 487. However, if it is determined that user authentication is required, then the user authentication process is performed to step 486. This authentication process may include, but is not limited to, password authentication, thumbprint of authentication, ID card, other biological authentication means, and other forms of inputting data into a computer system.

At step 487, the software key authentication process 480 determines if there are more authentications to be performed. If it is determined at step 487 that additional authentication is required, the software key authentication process 480 returns to repeat step 482 through 487. However, if it is determined at step 487 that no additional authentication is required, then the software key authentication process exits at step 489.

Figure 14A:
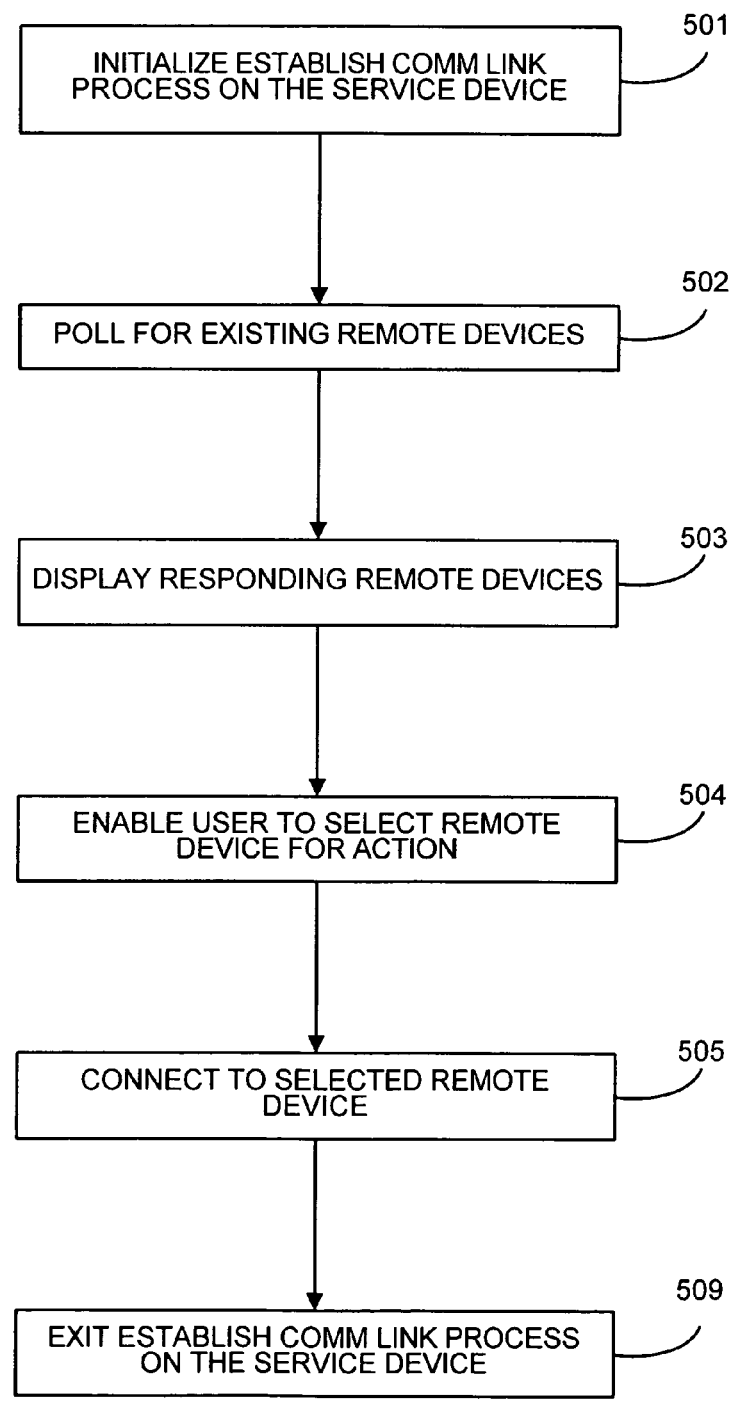
FIG. 14A is a flow chart illustrating an example of the operation of the establish communication link process utilized by the remote power monitoring system of the present invention, as shown in FIGS. 2A, 3A, 4A and 12A.

FIG. 14A is a flow chart illustrating an example of the operation of the establish communication link process 500 utilized by the remote power monitoring system 80 of the present invention, as shown in FIGS. 2A, 3A, 4A and 12A. The establish communication link process 500 enables a user to determine which remote devices 20 are within communication range and then enables the user to select a particular remote devices 20 with which to connect.

First at step 501, the establish communication link process 500 is initialized. This initialization includes the startup routines and processes embedded in the BIOS of the service device 11. The initialization also includes the establishment of data values for particular data structures utilized in the establish communication link process 500.

At step 502 the establish communication link process 500 polls for existing remote devices 20. This polling will enable the operating remote devices 20 to respond if they are within communication range. This polling enables a user to determine which remote monitoring devices 20 are currently available. In the preferred embodiment, the polling indicates each operational remote monitoring device 20 in its group. For example, in a group of three the first remote monitoring device 20 would indicate that it is one of three. If remote monitoring devices 20 for two of three and three of three do not respond, then this indicates to a user that two power devices 7 may not be operational.

The remote devices 20 responding are then displayed on the service device 11 at step 503. At step 504, the user is prompted to select a particular remote devices 20 with which to connect. At step 505, the service device connects to the selected remote device 20. The establish communication link process 500 then exits at step 509.

Figure 14B:
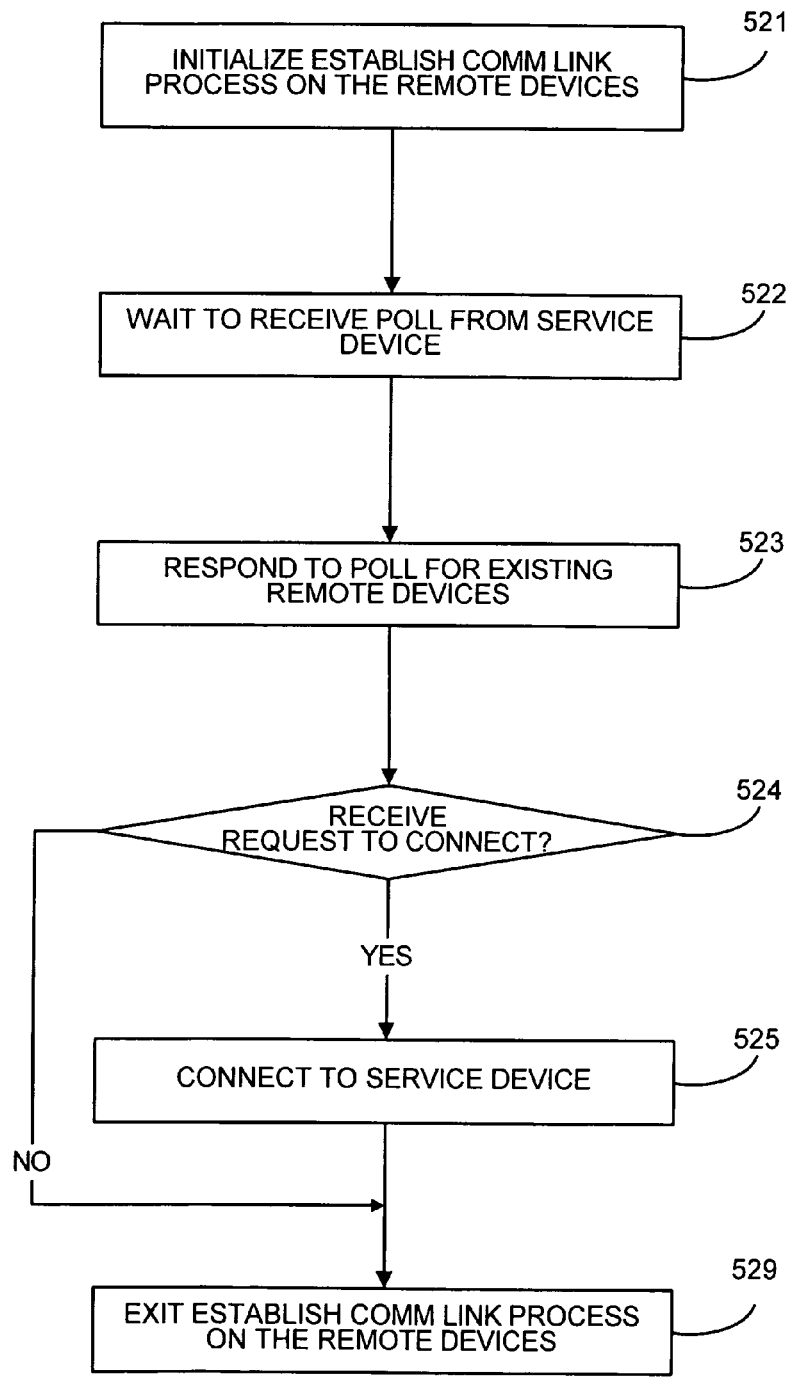
FIG. 14B is a flow chart illustrating an example of the operation of the establish communication link agent utilized in the remote monitoring device and utilized by the remote power monitoring system of the present invention, as shown in FIGS. 2B, 3B, 3C, 4B and 12B.

FIG. 14B is a flow chart illustrating an example of the operation of the establish communication link agent 520 utilized in the remote monitoring device 20 and utilized by the remote power monitoring system 100 of the present invention, as shown in FIGS. 2B, 3B, 3C and 4B. The establish communication link agent 520 resides on the remote device 20 and waits to be activated by receiving a polling message from a service device 11.

First at step 521, the establish communication link agent 520 is initialized. This initialization includes the startup routines and processes embedded in the BIOS of the remote monitoring device 20. The initialization also includes the establishment of data values for particular data structures utilized in the establish communication link agent 520.

At step 522, the establish communication link agent 520 waits to receive a poll communication. The poll communication will prompt the remote device 20 to send an identification message to the service device 11. At step 523, the establish communication link agent 520 responds to a poll for existing remote devices 20.

At step 524, it is determined if the particular remote monitoring device 20 received a request to connect. If it is determined at step 524 that a request to connect has not been received within a reasonable time period, then the establish communication link agent 520 exits at step 529. However, if it is determined within a reasonable time that a request to connect was received, then the establish communication link agent 520 connects to the service device 11 at step 525 and then exits at step 529.

FIG. 15A is a flow chart illustrating an example of the operation of the parameter process 540 utilized by the remote power monitoring system 80 of the present invention, as shown in FIGS. 2A, 3A, 4A and 19A. The parameter process 540 enables a user to obtain parameters from the power device 7 that the remote monitoring device 20 is connected with. For example, this function actually enables a user to observe the current operating parameters of a power device 7 without opening a cabinet to the power device 7. In addition, the user may instruct the remote monitoring device 20 to command the power device 7 to reload the default parameters.

First at step 541, the parameter process 540 is initialized. This initialization includes the startup routines and processes embedded in the BIOS of the service device 11. The initialization also includes the establishment of data values for particular data structures utilized in the parameter process 540.

After the establishing a communication link with a particular power device, the parameter process 540 enables a user at step 542 to acquire parameter data from the power device 7 connected to the selected remote monitoring device 20, at step 542. The parameter data is displayed on the service device 11 at step 543.

At step 544, the parameter process 540 determines if the user has elected the default parameter values to be loaded onto the power device 7 connected to the remote monitoring device 20 of the present invention. If it is determined at step 544 that the default parameter values are not selected, then the parameter process 540 proceeds to step 548.

However, if it is determined at step 544 that the user has elected to load the default parameter values, the parameter process 540 sets the power device 7 parameters to the default parameter values at step 545. At step 546, the parameter process determines if the default parameters are to be sent to the power device. If it is determined at step 546 that the people parameters are not to be sent to the power device 7, then the parameter process 540 then proceeds to step 548.

However, if it is determined at step 546 that the user has elected to send the default parameters to the power device 7, then the parameter process 540 then sets the user input to send the default parameters to the power device 7 at step 547. By setting the user input to send, the parameter process 540 will utilized to send process to send the default parameters. The default parameter is not actually loaded until they are sent the using the send process herein described further detail with regard to FIGS. 17A & B.

At step 548, the service device 11 logs the access by the user to the parameter data. This log is used in order to determine which user and time access was provided to the power device 7. In addition, the type of information accessed is also logged. The parameter process 540 exits at step 549.

Figure 15B:
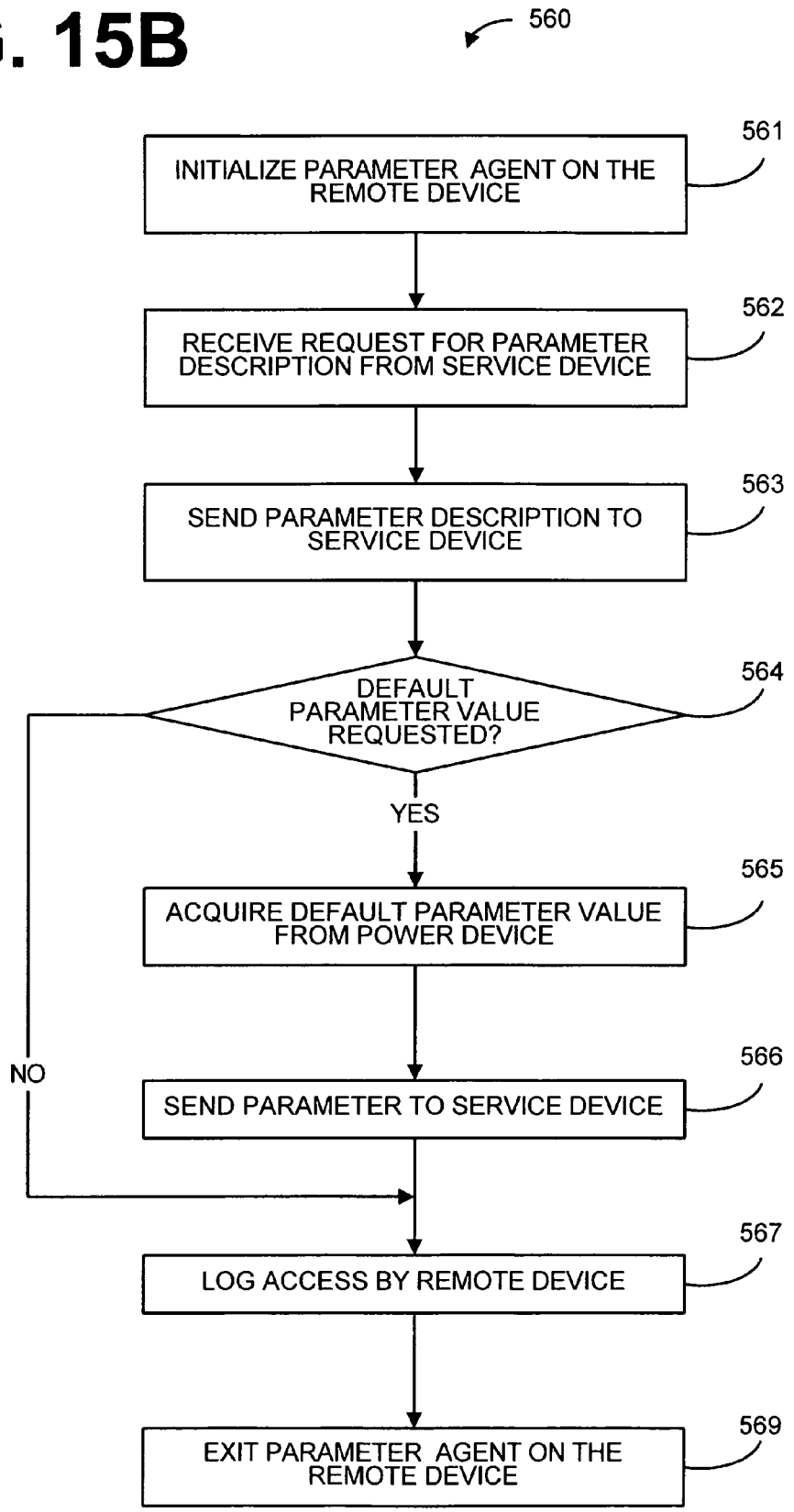
FIG. 15B is a flow chart illustrating an example of the operation of the parameter agent utilized in the remote monitoring device and utilized by the remote power monitoring system of the present invention, as shown in FIGS. 2B, 3B, 3C, 4B and 12B.

FIG. 15B is a flow chart illustrating an example of the operation of the parameter agent 560 utilized in the remote monitoring device 20 and utilized by the remote power monitoring system 100 of the present invention, as shown in FIGS. 2B, 3B, 3C, 4B and 12B. The parameter agent 560 enables a user to obtain parameters from the power device 7 that the remote monitoring device 20 is connected.

First at step 561, the parameter agent 560 is initialized. This initialization includes the startup routines and processes embedded in the BIOS of the remote monitoring device 20. The initialization also includes the establishment of data values for particular data structures utilized in the parameter agent 560.

After the establishing a communication link with a particular power device, the parameter agent 560 waits for a request for parameter description data from the service device 11 at that 562. At step 563, the parameter descriptions requested are sent to the service device 11. At step 564, the parameter agent 560 determines if the user has elected the default parameter values to be loaded onto the power device 7 connected to the remote monitoring device 20 of the present invention. If it is determined at step 563 that the default parameter values are not selected, the parameter agent 560 proceeds to step 567.

However, if it is determined at step 564 that the user has elected to load the default parameter values, the parameter agent 560 acquires the default parameter values at step 565. The parameters for the power device 7 are then sent to the service device 11 at step 566. The default parameters are not loaded until they are actually sent the using the send process herein described in further detail with regard to FIGS. 17A & B.

At step 566, the service device 11 logs the access by the user to the parameter data. This log is used in order to determine which user gained access to the power device 7 at which time. In addition, the type of information access is also logged. The parameter agent 560 exits at step 569.

Figure 16A:
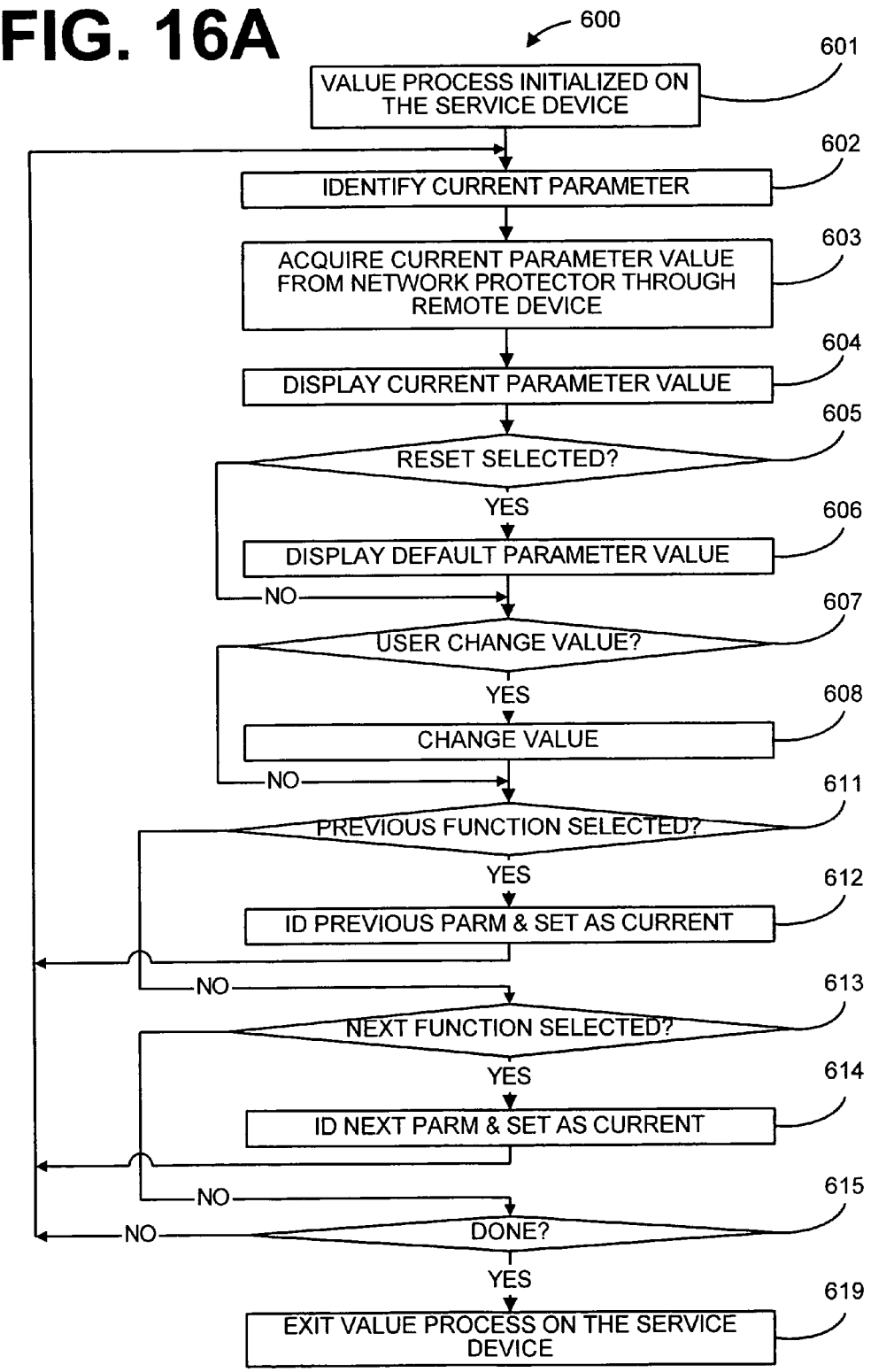
FIG. 16A is a flow chart illustrating an example of the operation of the value process utilized by the remote power monitoring system of the present invention, as shown in FIGS. 2A, 3A, 4A and 12A.

FIG. 16A is a flow chart illustrating an example of the operation of the value process 600 utilized by the remote power monitoring system 80 of the present invention, as shown in FIGS. 2A, 3A, 4A and 19A. The value process 600 enables a user to obtain and change the values for the power device 7 that the remote monitoring device 20 is connected. For example, this function actually enables a user to observe and change the current operating values of a power device 7 without opening a cabinet to the power device.

First at step 601, the value process 600 is then initialized. This initialization includes the startup routines and processes embedded in the BIOS of the service device 11. The initialization also includes the establishment of data values for particular data structures utilized in the value process 600.

After the establishing a communication link with a particular power device, the value process 600, waits for the user to identify a current parameter to be acquired at step 602. At step 603, the value process 600 then acquires the current parameter value from the network protector for the remote device 20. At step 604, the value process 600 displays the current parameter value.

At step 605, the value process 600 determines if reset of the parameter is selected. If it is determined at step 605 that the reset function was not selected, then the value process 600 then proceed to step 607. However, if it is determined at step 605 that reset was selected by the user, then the value process 600 displays the default parameter value at step 606.

At step 607, the value process 600 determines that the user changed a parameter value. If the value process 600 determines that a user did not change of parameter value, then the value process 600 proceeds to step 611. However, if it is determined at step 607 the user changed a parameter value, then the value process 600 then performs the change of the value at step 608.

At step 611, the value process 600 determines if the previous function was selected. It is determined at step 611 that the previous function was not selected, then the value process 600 proceeds to step 613 to see if the next function is selected. However, that is determined at step 611 that the previous function was selected, the value process 600 then identifies the previous parameter and sets that previous parameter as current. The value process 600 then returns to repeat step 602 through 612.

At step 613, the value process 600 determines that the next function was selected. If it is determined at step 613 that the next function was not selected, then the value process 600 proceeds to step 615. However, if it is determined at step 613 that the next function was selected, then the value process 600 identifies the next parameter and sets that next parameter as the current parameter at step 614. The value process 600 then returns to repeat step 602 through 614.

At step 615, the value process 600 determines if there are more requests for parameters to be changed. If it is determined at step 615 that there are more changes to be made, then the value process 600 returns to repeat step 602 through 615. Otherwise, the value process 600 exits at step 619.

Figure 16B:
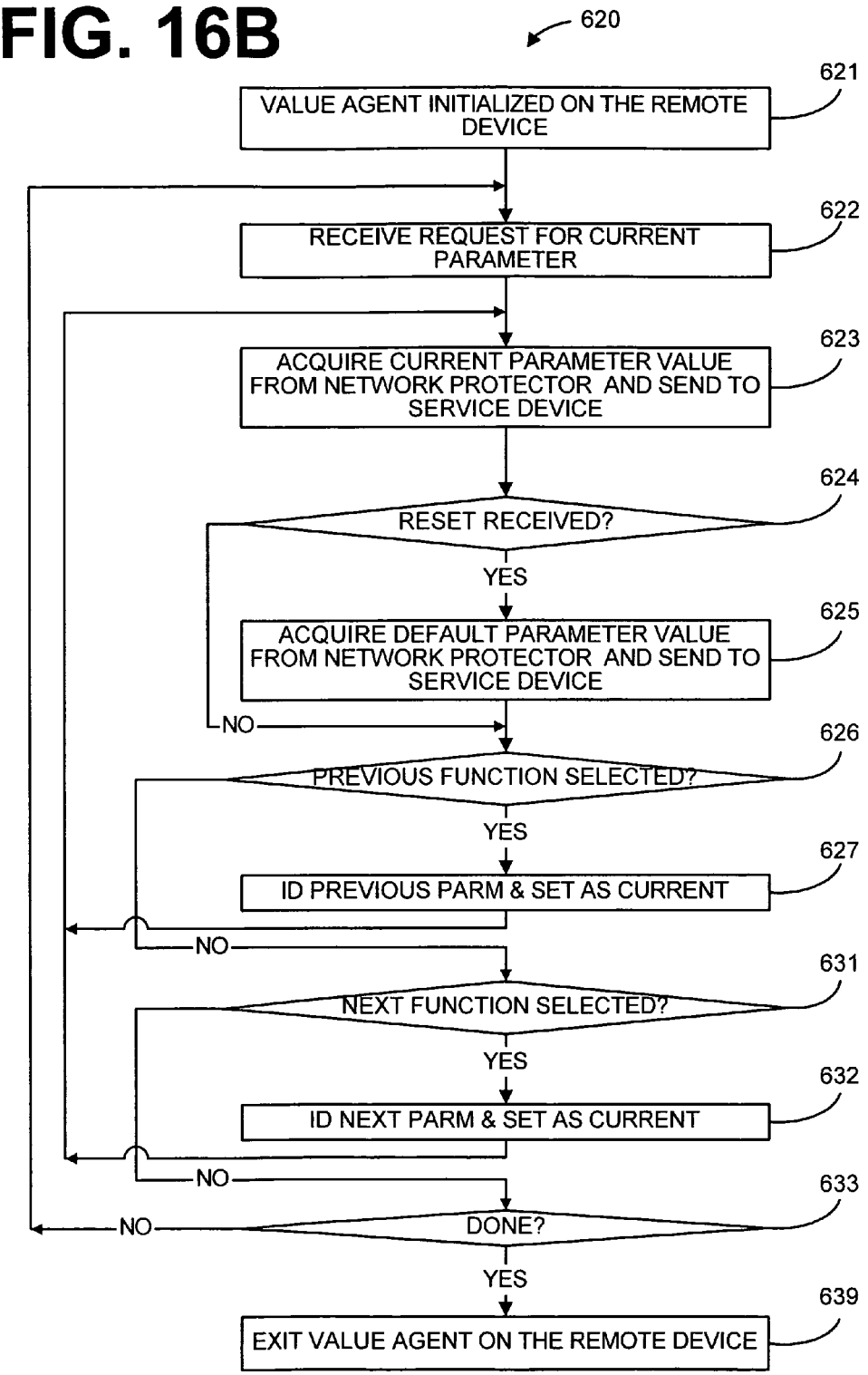
FIG. 16B is a flow chart illustrating an example of the operation of the value agent utilized in the remote monitoring device and utilized by the remote power monitoring system of the present invention, as shown in FIGS. 2B, 3B, 3C, 4B and 12B.

FIG. 16B is a flow chart illustrating an example of the operation of the value agent 620 utilized in the remote monitoring device 20 and utilized by the remote power monitoring system 100 of the present invention, as shown in FIGS. 2B, 3B, 3C, 4B and 12B. The value agent 620 enables a user to obtain value from the power device 7 that the remote monitoring device 20 is connected with.

First at step 621, the value agent 620 is initialized. This initialization includes the startup routines and processes embedded in the BIOS of the remote monitoring device 20. The initialization also includes the establishment of data values for particular data structures utilized in the value agent 620.

After the establishing a communication link with a particular power device, the value agent 620 waits for the user to request a current parameter to be acquired at step 622. At step 623, the value agent 620 then acquires the current parameter value from the power device 7 connected to the remote device 20. After acquiring the current parameter value from the power device 7, the value agent 620 then sends the current parameter value to the service device 11.

At step 624, the value agent 620 determines if the reset of the parameter function is selected by the user. If it is determined at step 625 that the reset function was not selected, then the value agent 620 proceeds to step 626. However, if it is determined at step 624 that reset was selected by the user; the value agent 620 acquires the default parameter value from the power device 7 at step 625. After receiving the default parameter values from the power device 7, the value agent 620 sets the parameter value to the service device 11.

At step 626, the value agent 620 determines if the previous function was selected by the user on the service device 11. If it is determined at step 626 that the previous function was not selected, then the value agent 620 proceeds to step 631 to see if the next function is selected. However, if it is determined at step 626 that the previous function was selected, the value agent 620 then identifies the previous parameter and sets that previous parameter as current. The value agent 620 then returns to repeat step 622 through 632.

At step 631, the value agent 620 determines if the next function was selected. If it is determined at step 631 that the next function was not selected, then the value agent 620 proceeds to step 633. However, if it is determined at step 631 that the next function was selected, then the value agent 620 identifies the next parameter and sets that next parameter as the current parameter at step 632. The value agent 620 then returns to repeat step 622 through 633.

At step 633, the value agent 620 determines if there are more requests for parameters to be changed. If it is determined at step 633 that there are more changes to be made, then the value agent 620 returns to repeat step 622 through 633. Otherwise, the value agent 620 exits at step 639.

Figure 17A:
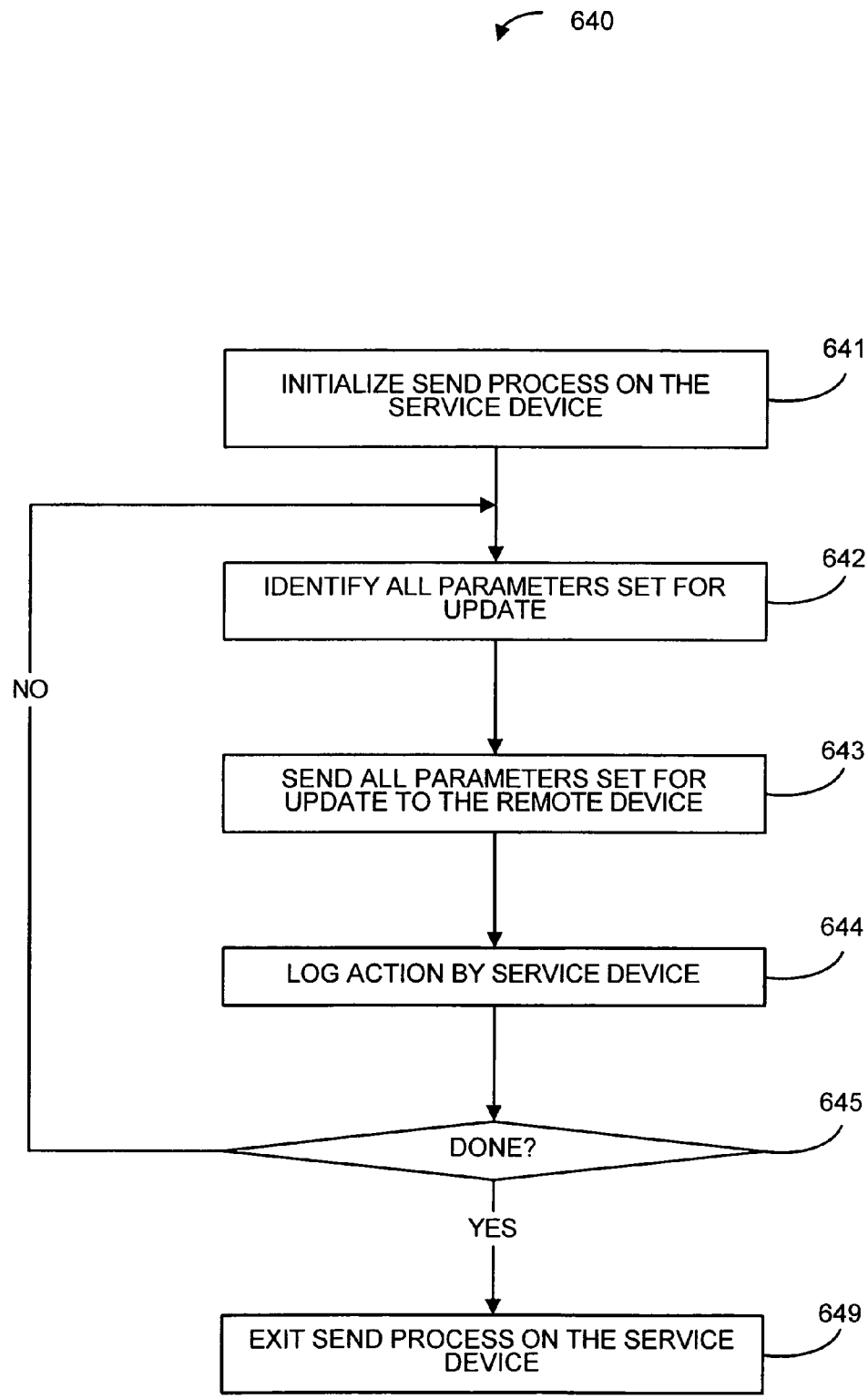
FIG. 17A is a flow chart illustrating an example of the operation of the send process utilized by the remote power monitoring system of the present invention, as shown in FIGS. 2A, 3A, 4A and 12A.

FIG. 17A is a flow chart illustrating an example of the operation of the send process 640 utilized by the remote power monitoring system 80 of the present invention, as shown in FIGS. 2A, 3A, 4A and 12A. The send process 640 enables a user to send changes of parameters and values to the power device 7 that the remote monitoring device 20 is connected with. For example, this function actually enables a user to send changes of control settings to a power device 7 without opening a cabinet to the power device.

First at step 640, the send process 640 is initialized. This initialization includes the startup routines and processes embedded in the BIOS of the service device 11. The initialization also includes the establishment of data parameters for particular data structures utilized in the send process 640.

After the establishing a communication link with a particular power device, the send process 640 waits for the user to identify all of the parameters to be updated on the power device 7 at step 642. At step 643, the send process 640 sends all the parameters to be updated to the power device 7 connected to the remote monitoring device 20.

At step 644, to send process 640 then logs the action by the user on the service device 11. This log is used in order to determine which user gained access to the power device 7 at which time. In addition, the type of information access is also logged.

At step 645, the send process 640 determines if there are more requests for parameters to be sent. If it is determined at step 645 that there are more changes to send, then the send process 640 returns to repeat step 642 through 645. Otherwise, the send process 640 exits at step 649.

Figure 17B:
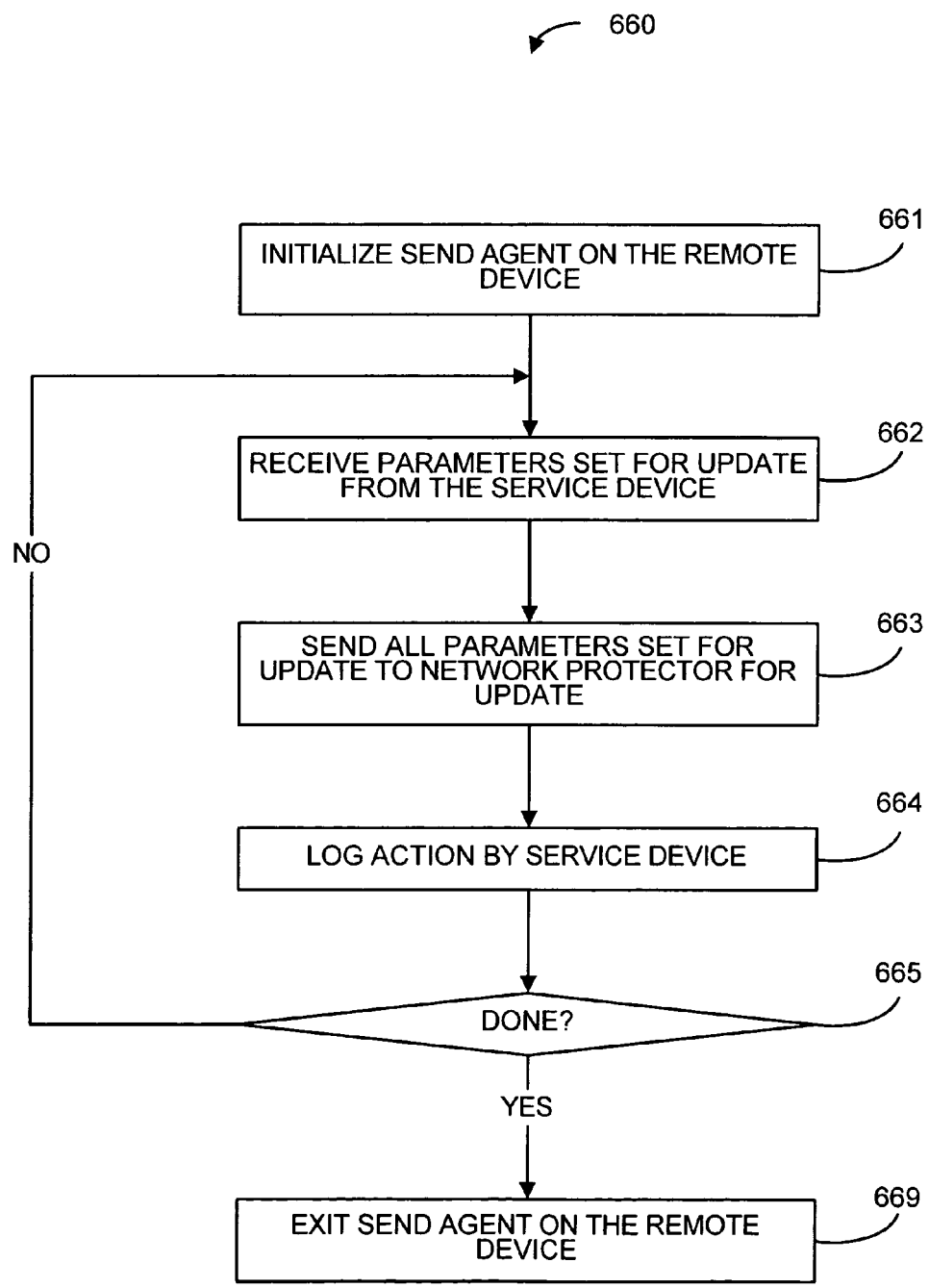
FIG. 17B is a flow chart illustrating an example of the operation of the send agent utilized in the remote monitoring device and utilized by the remote power monitoring system of the present invention, as shown in FIGS. 2B, 3B, 3C, 4B and 12B.

FIG. 17B is a flow chart illustrating an example of the operation of the send agent 660 utilized in the remote monitoring device 20 and utilized by the remote power monitoring system 100 of the present invention, as shown in FIGS. 2B, 3B, 3C, 4B and 12B. The send agent 660 enables a user to send parameter changes to the power device 7 through the remote monitoring device 20.

First at step 661, the send agent 660 is initialized. This initialization includes the startup routines and processes embedded in the BIOS of the remote monitoring device 20.

The initialization also includes the establishment of data parameters for particular data structures utilized in the send agent 660.

After the establishing a communication link with a particular power device, the send agent 660 waits to receive a parameters set for update on the power device 7 from the service to device 11. At step 663, the send agent 660 then sends the parameter set for update to the power device 7 (i.e. network protector) connected to the remote device 20.

At step 664, the send agent 660 logs the action taken by the user of the service device 11. This log is used in order to determine which user gained access to the power device 7 at which time. In addition, the type of information access is also logged.

At step 665, the send agent 660 determines if there are more requests for parameters to be changed. If it is determined at step 665 that there are more changes to be made, then the send agent 660 returns to repeat step 662 through 665. Otherwise, the send agent 660 exits at step 669.

Figure 18A:
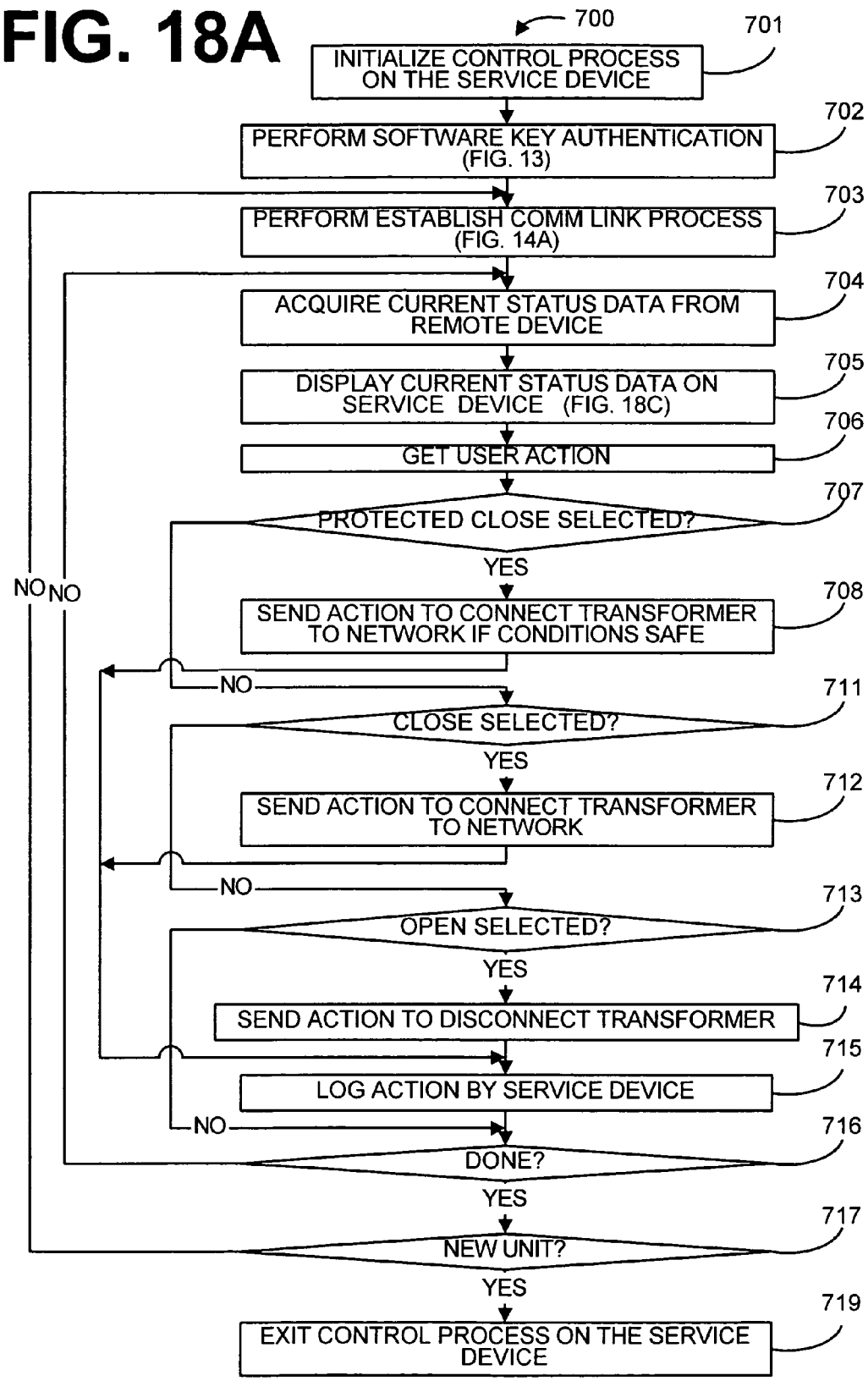
FIG. 18A is a flow chart illustrating an example of the operation of the control process utilized by the remote power monitoring system of the present invention, as shown in FIGS. 2A, 3A, 4A and 12A.

FIG. 18A is a flow chart illustrating an example of the operation of the control process 700 utilized by the remote power monitoring system 80 of the present invention, as shown in FIGS. 2A, 3A, 4A and 10A. The control process 700 enables a user to control a power device 7 remotely.

In this illustrated example, the power device 7 is a switch, and a network protector is illustrated to represent the switch. This procedure actually enables a user to change the operational status of a switch (i.e. a network protector for power device 7) without opening a cabinet to the power device. Therefore, a user can remotely shut off the network protector before entering a hazardous environment. It is understood that other types of power devices 7 (i.e. switches) may be applicable. The network protector example is for illustration purposes only.

First at step 701, the control process 700 is initialized. This initialization includes the startup routines and processes embedded in the BIOS of the service device 11. The initialization also includes the establishment of data parameters for particular data structures utilized in the control process 700.

At step 702, the software key authentication is performed. The software key authentication is herein defined in further detail with regard to FIG. 20. The software key authentication is a security means to prevent unauthorized access to the remote monitoring device 20 by unauthorized personnel.

At step 703, the establish communication link process is performed. The establish communication link process is herein described in further detail with regard to FIG. 14A. The establish communication link process enables a user to poll for operational remote monitoring devices 20.

After the establishing a communication link with a particular power device, the control process 700 enables a user to acquire current status data from the power device 7 connected to the selected remote monitoring device 20 at step 704. The current status data from power device 7 includes the switch position of open or closed. In the illustrated example where the power device 7 is a network protector, the current status data from power device 7 includes, but is not limited to, the switch position of the circuit breaker and/or relay embedded in the network protector. The relay embedded in the network protector monitors the switch position of the circuit breakers independently. The circuit breaker, relay or both may be accessed in order to determine the actual status of the network protector.

At step 705, the control process 700 displays the current status data on the service device 11. For the representative example, a network protector as power device 7 is shown in FIG. 18C. At step 706, the control process 700 gets the inputted user action.

At step 707, the control process 700 determines if the user action is a request to perform a protected close. A protected close action is an instruction to connect a transformer to the network only if conditions are favorable to proper action. If it is determined at step 707 that a protected close action is not selected, then the control process 700 proceeds to step 711 to see if a close action is requested. However, if it is determined at step 707 that a protected close action was requested, then the control process 700 sends a request to the remote monitoring device 20 to connect the transformer side of the network protector to the network side, only if conditions are safe to do so. After setting the action to connect transformer to the network at step 708, the control process 700 then proceeds to the logging step 715.

At step 711, the control process 700 determines if a close action was requested. If it is determined at step 711 that a close action is not requested, then the control process 700 proceeds to step 713 to determine if an open request was received. However, if it is determined at step 711 that a close action was requested, then the control process 700 sends an action to the remote monitoring device 20 instructing the transformer side of a network protector to connect to the network side irregardless of conditions. After setting the action to connect transformer to the network at step 712, the control process 700 then proceeds to the logging step 715.

At step 713, the control process 700 determines if an open action was received. If it is determined at steps 713 that an open action was not received, then the control process 700 proceeds to step 716 to determine if there are more actions to take place. However, it if it is determined at step 713 that an open action was received, then the control process 700 sends an action to the remote monitoring device 20 instructing the transformer side of a network protector to disconnect from the network side.

In the preferred embodiment, the open action is a block open. A block open instruction notifies the transformer side of the network protector (i.e. power device 7) to disconnect from the network side until manually overridden. This blocking of the switch to open is to prevent accidental or programmatic reconnection without the user's knowledge.

In an alternative embodiment, the open instruction may also include a non-block open that informs the transformer side of the illustrated network protector (i.e. power device 7) to disconnect from the network side, unless power demands require reconnection. The non-block open instruction can only be utilized when a user is not entering the vault or physically approaching the network protector (i.e. power device 7).

At step 715, the service device 11 logs the action taken by the user to the power device. This log is in order to determine which user gained access to particular types of power equipment and at what time the device was accessed. The log also can capture what information was accessed by the user.

At step 716, the control process 700 determines if there are more actions to take place for the currently connected network protector through the remote monitoring device 20. If it is determined that there are additional actions to transpire, the control process 700 then returns to repeat steps 704 through 716. However, if it is determined that there are no additional actions to transpire for the currently connected network protector, the control process 700 determines if there are other units to be connected at step 717. If it is determined at step 717 that there are additional units to be controlled, then the control process 700 returns to repeat step 703 through 717. Otherwise, the control process of 700 then exits at step 719.

Figure 18B:
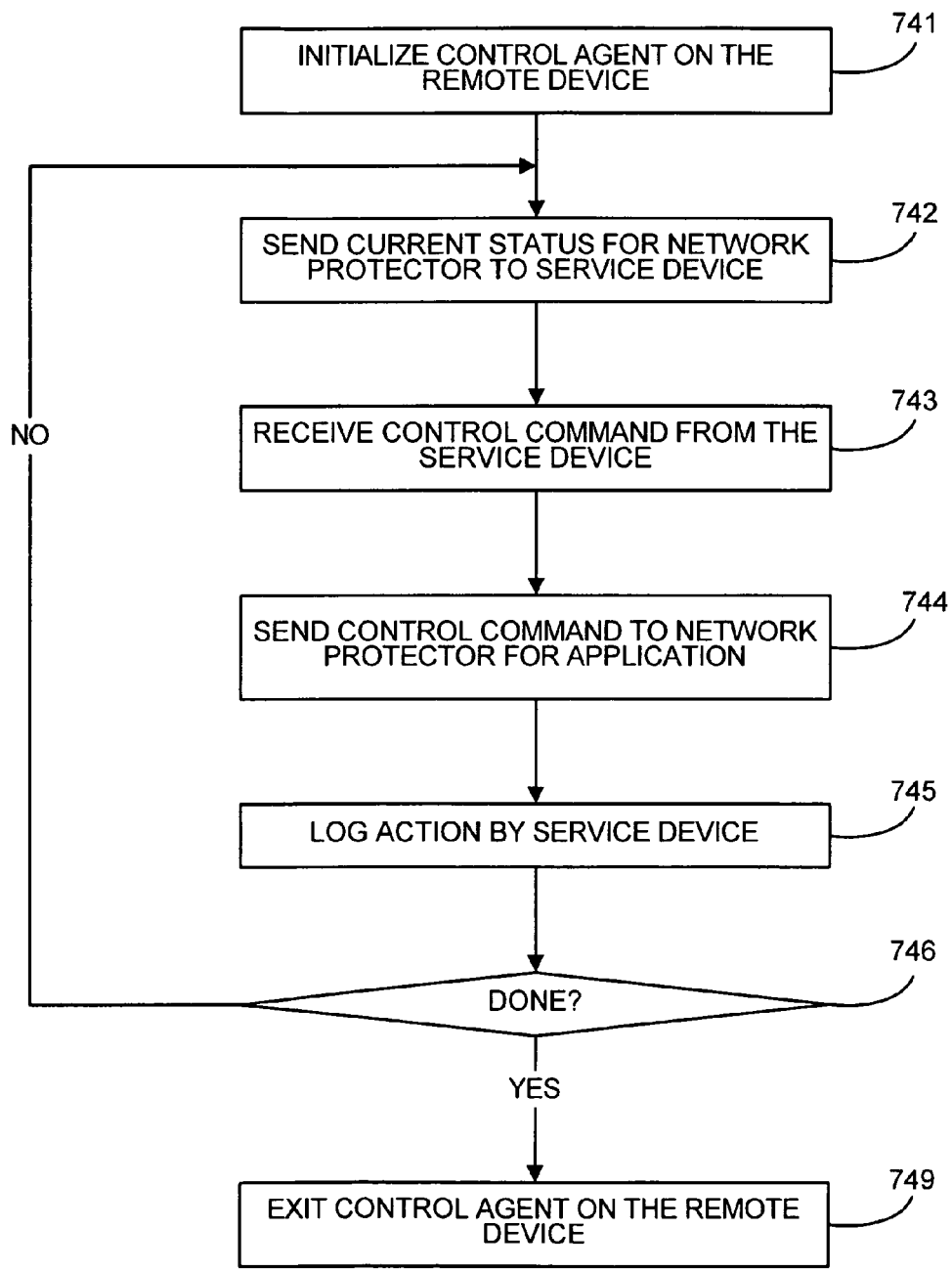
FIG. 18B is a flow chart illustrating an example of the operation of the control agent utilized in the remote monitoring device and utilized by the remote power monitoring system of the present invention, as shown in FIGS. 2B, 3B, 3C, 4B and 12B.
Figure 18C:
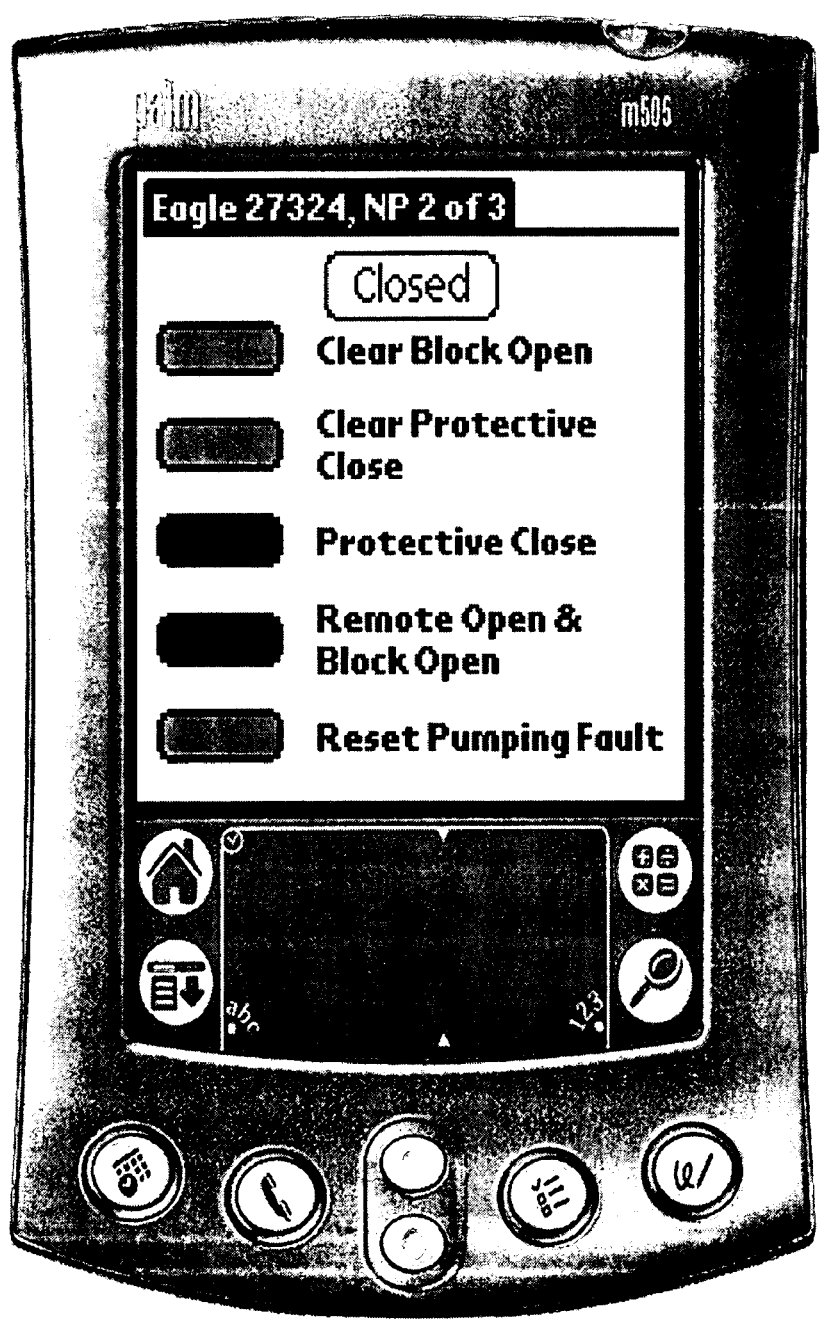
FIG. 18C is a diagram of a screen display in accordance with one embodiment.

FIG. 18B is a flow chart illustrating an example of the operation of the control agent 740 utilized in the remote monitoring device 20 and utilized by the remote power monitoring system 100 of the present invention, as shown in FIGS. 2B, 3B, 3C, 4B and 10B. The control agent 740 enables a user to control the operational status of a power device 7.

In this illustrated example, the power device 7 is a switch, and a network protector is illustrated to represent the switch. This procedure actually enables a user to change the operational status of a switch (i.e. a network protector for power device 7) without opening a cabinet to the power device. Therefore, a user can remotely shut off the network protector before entering a hazardous environment. It is understood that other types of power devices 7 (i.e. switches) may be applicable. The network protector example is for illustration purposes only.

First at step 741, the control agent 740 is initialized. This initialization includes the startup routines and processes embedded in the BIOS of the remote monitoring device 20. The initialization also includes the establishment of data parameters for particular data structures utilized in the control agent 740.

After the establishing a communication link with a particular power device, the control agent 740 waits to send operational status for the power device 7 from the remote monitoring device 20 to the service device 11, at step 742. At step 743, the control agent 740 then receives a control command from the service device 11 to control the operational status of the power device 7 (i.e. network protector) connected to the remote device 20.

At step 744, the control agent 740 sends the control command to the network protector for application. At step 745, the control agent 740 logs the action taken by the user of the service device 11. At step 745, the control agent 740 determines if there are more requests for operational status to be changed for the currently connected power device. If it is determined at step 745 that there are more changes to be made, then the control agent 740 returns to repeat step 742 through 745. Otherwise, the control agent 740 exits at step 749.

Figure 19:
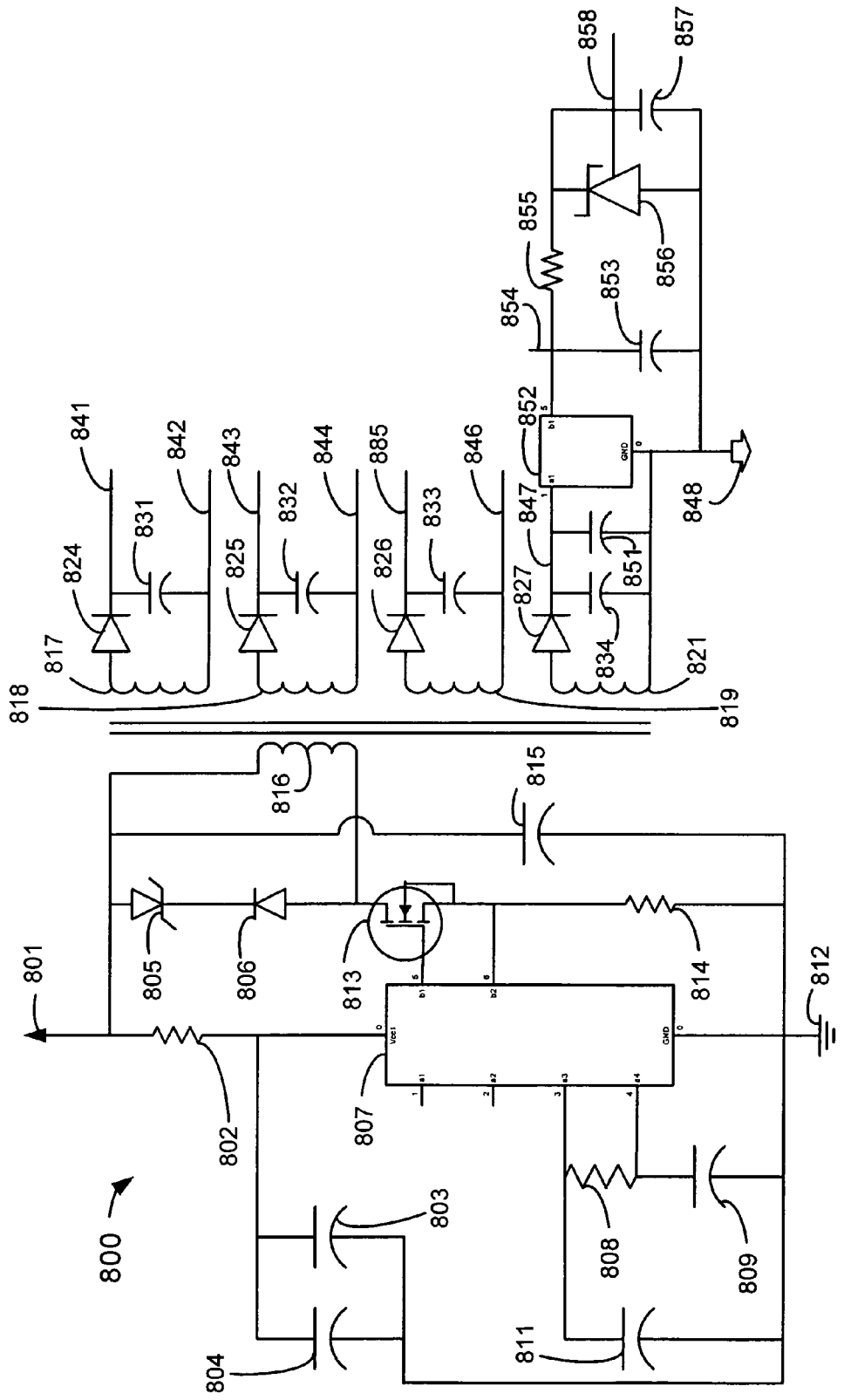
FIG. 19 is a schematic diagram illustrating an example of an isolator circuit for a voltage measurement component in the power quality monitoring the remote power monitoring system of the present invention, as shown in FIG. 2B.

FIG. 19 is a schematic diagram illustrating an example of an isolated power supply 800 for the power quality monitoring the remote monitoring system 100 of the present invention, as shown in FIG. 2C. The isolated power supply 800 converts the B+ input power supply voltage to four separate, isolated supply voltages V1-V4 B+, to power each of the four isolated voltage signal conditioning and A/D converter systems.

The illustrated example of a quad-isolated power supply 800 includes voltage outputs (841-848), and the regulated supply voltage and analog to digital (A/D) reference voltage circuitry for one channel (851-857). The isolators which isolate the signal and control lines to the A/Ds are herein described in further detail with regard to FIG. 24.

Switching power supply chip 807 uses transformer winding 816 to provide voltage to isolated transformer windings 817, 818, 819, and 821, whose outputs are rectified by diodes 824-827, and filtered by capacitors 831-834, to provide four isolated DC power outputs. An example of one set of isolated DC power output is leads 847 and 848. These outputs are regulated by circuitry in each voltage channel to provide clean DC power to each channel. Each set of isolated DC power outputs is isolated from other power outputs and well as the remaining circuitry of the remote monitoring device 100.

Components 851-857 are representative regulation circuits for a single channel, based on linear regulator 852, to create the regulated voltage signal 858. It is understood that the regulation circuitry would be duplicated for each channel being monitored, for example connections to lines for 841-846. It is understood that other configurations of circuitry may be utilized to obtain the same result.

Figure 20:
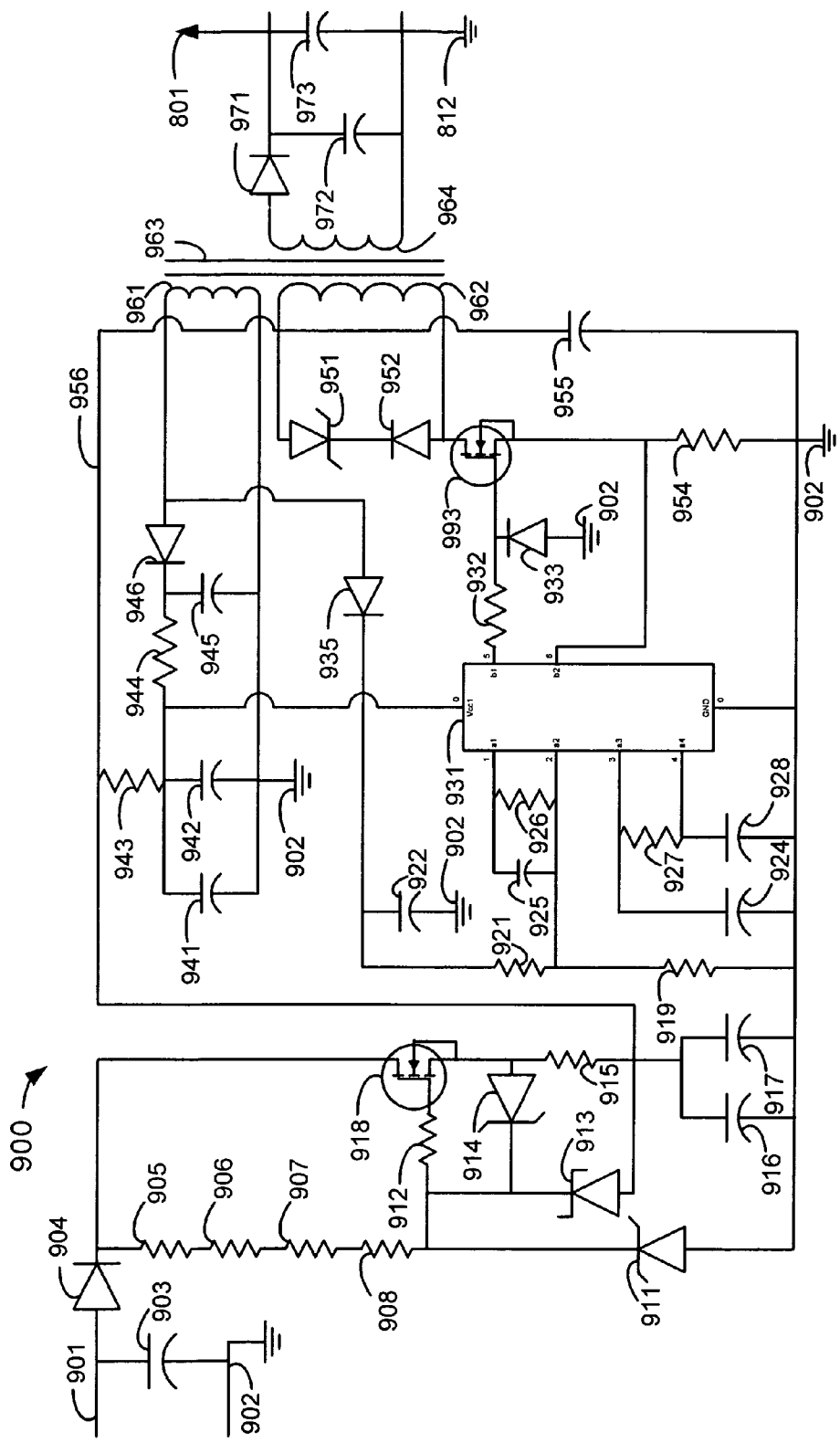
FIG. 20 is a schematic diagram illustrating an example of a pre-regulator component in the power quality monitoring the remote power monitoring system of the present invention, as shown in FIG. 2B.

FIG. 20 is a schematic diagram illustrating an example of a pre-regulator component 900 in the power quality monitoring the remote monitoring system 100 of the present invention, as shown in FIG. 2B. The pre-regulator components 900 converts AC input voltage to a rectified DC voltage.

Capacitor 903 provides across-the-line noise filtering. Rectifier diode 904 converts the bipolar AC input voltage on line 901 to half-wave rectified DC voltage, thereby producing a voltage magnitude at the cathode of rectifier diode 904 equal to the peak voltage of the input AC supply on line 901. This half-wave rectified DC voltage feeds gate bias circuitry for a series pass regulator implemented by FET 918. For each positive half cycle of the input AC waveform, the voltage rises on the input or drain of FET 918 and the gate of FET 918 as provided by bias resistors 905, 906, 907, and 908. As the voltage rises on the gate of FET 918, producing sufficient gate-to-source voltage for FET 918 conduction, FET 918 passes current to the pre-regulator output (i.e. power supply load) through current limiting resistor 915, thereby charging bulk storage capacitors 916 and 917. It is understood that other configurations of circuitry may be utilized to obtain the same result.

As the input AC voltage on line 901 continues to rise, Zener diode 911 will eventually conduct, limiting the rectifier diode 904 gate voltage to approximately 185V. As the rectifier diode 904 output (source lead) rises and approaches this gate-limited voltage, rectifier diode 904 begins to turn off due to the reducing gate-to-source voltage. This limits the pre-regulator output voltage across capacitors 916 and 917 to approximately 180 VDC. In this manner the power supply output is self-limiting or regulating, as determined by the voltage of Zener diode 911. It is understood that other configurations of circuitry may be utilized to obtain the same result.

Components 912-914 comprise a protection circuit for FET 918 by limiting the gate-to-source voltage and gate current of FET 918. Resistor 915 further protects FET 918 by limiting the inrush current through FET 918 on supply startup, especially at input AC line voltages approaching 600V. It is understood that other configurations of circuitry may be utilized to obtain the same result.

Components 941 through 946 interact with transformer winding 961. Diode 946, resistor 943, and capacitors 941, 942 and 945 form a bootstrap power supply to power switching regulator 931. It is understood that other configurations of circuitry may be utilized to obtain the same result.

Components 922-935 and 951-955 interact with transformer winding 962. These components are used by power switching regulator 931 and transformer 963 to step the DC voltage 956 to a low AC voltage across winding 964. This is rectified by diode 971 and filtered by capacitors 972 and 973 for creating B+ voltage 401 (FIG. 19) which feeds to all other circuits. It is understood that other configurations of circuitry may be utilized to obtain the same result.

Figure 21:
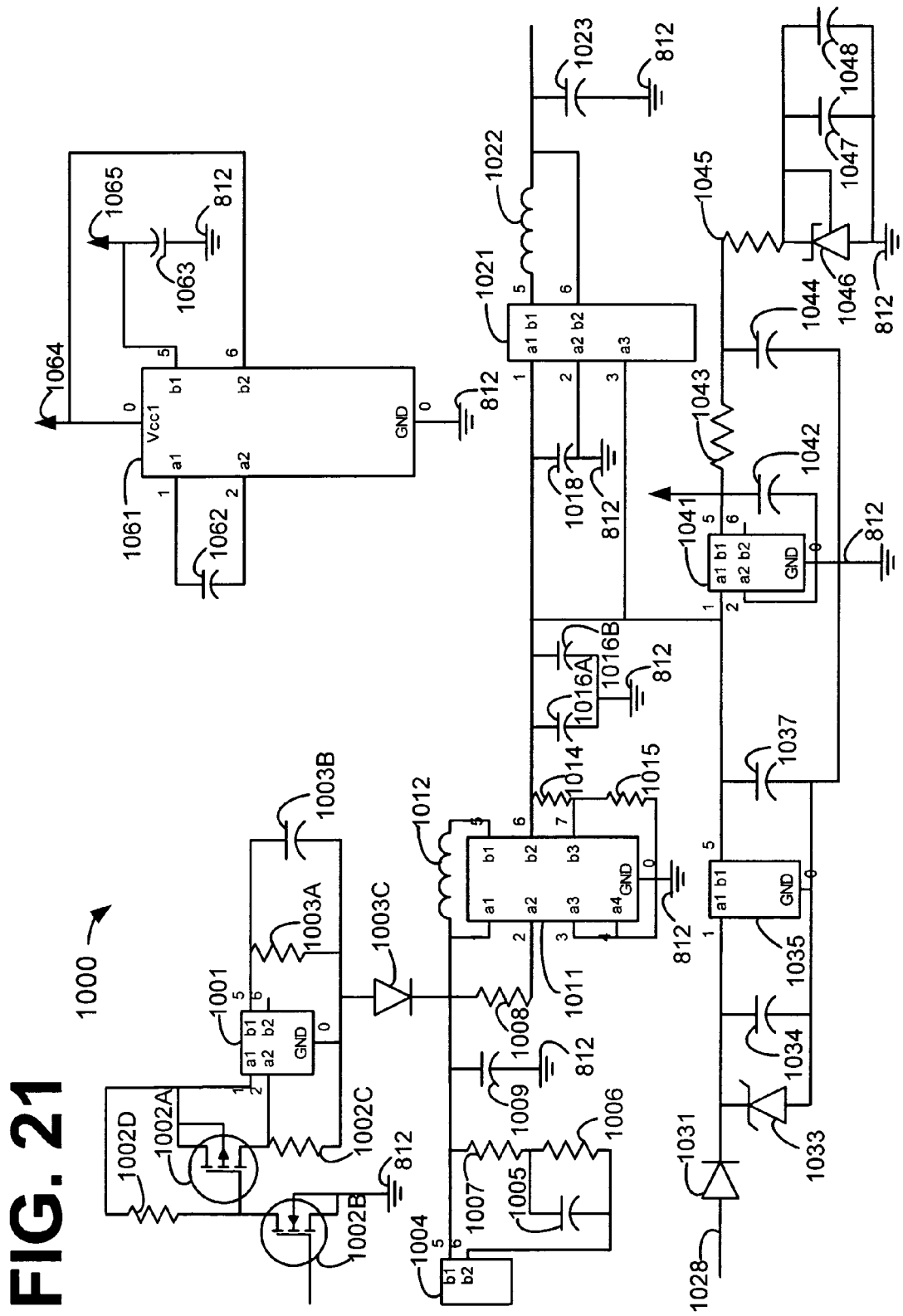
FIG. 21 is a schematic diagram illustrating an example of a multi-source power supply component in the power quality monitoring the remote power monitoring system of the present invention, as shown in FIG. 2B.

FIG. 21 is a schematic diagram illustrating an example of a multi-source power supply component 1000 in the power quality monitoring of the remote monitoring system 100 of the present invention, as shown in FIG. 2C. This multi-source power supply component 1000 can supply a regulated voltage to the main circuitry, and is fed from multiple sources, including an external wall adapter, an internal rechargeable battery, and the voltage being monitored on one channel. Each of these sources feeds into a separate power supply, which regulates the voltage to a level suitable for feeding the supply in FIG. 21. Electrical isolation is maintained in each power source and grounds (812, 842, 844, 846, 848 (FIG. 19) & 902 (FIG. 20)), as needed.

Power can be supplied from a battery 1004, such as for example but not limited to, one or more rechargeable or non-rechargeable batteries. Examples of rechargeable batteries include, but are not limited to, NiCad, Lithium-Ion or Nickel-Metal-Hydride batteries. Examples of non-rechargeable batteries include but are not limited to alkaline or lithium batteries. Voltage from battery 1004 enters through a connector and is doubled by voltage converter 1011 to provide a 5.5V DC voltage into the common DC bus B+ voltage 801 (FIG. 19) which is read by the DSP 1410 (FIG. 25A) to determine remaining battery life. Capacitor 1005 smoothes the value to allow lower noise A/D readings.

Regulator 1001 is used to provide a constant current charge into the battery; this chip is controlled by the DSP 910 so that charging does not occur when the remote monitoring device 20 is operating under battery power. The switching FETs 10021A and 1002B are used in conjunction with the resistors 1002C and 1002D to enable DSP 910 to control regulator 1001. The resistor 1003A is utilized to sets the charge current given regulator 1001 fixed output voltage. Capacitor 1003B is utilized to provide stability for the output of regulator 1001. Diode 1003C is utilized to prevent current from following from the battery 1004 into regulator 1001. It is understood that other configurations of circuitry may be utilized to obtain the same result.

A wall adapter or other DC input 1028, referred to hereafter as input 1028, may also power the remote monitoring device 20 through diode 1031. This input 1028 comes from an external connector on the device. A voltage of up to 15V may be applied here, and is regulated to 5V by linear regulator 1035 through capacitor 1034 and Zener diode 1033. Diode 1036 diode-OR's the output from linear regulator 1035 into B+ voltage 801. The B+ voltage 801 may also be fed from the output of FIG. 20. In any case, the B+ voltage 801 then feeds the isolated system in FIG. 19, and regulators 1021 and 1041 in FIG. 21.

Regulator 1021 is a switching regulator which provides 1.8V DC to the DSP core and Bluetooth module core, while regulator 1041 provides the preferred 3V DC to other circuitry including the SRAM 1121 and digital logic. This 3V power is filtered by resistor 1043 and capacitor 1044 to provide a quiet DC voltage to power the analog electronics used for current signal conditioning. It is understood that other configurations of circuitry may be utilized to obtain the same result.

In an alternative embodiment, it is considered a novel aspect that the B+ voltage 801 may be fed from either the wall transformer from FIG. 20, AC line voltage from FIG. 19, or the battery from FIG. 21, while maintaining isolation as needed for safety.

Another circuit is a power converter 1061-1065 for converting positive power components into negative power components. This circuit is utilized to power external accessories, and not utilized for the components within the preferred invention as illustrated in FIGS. 19 through 25B.

Figure 22:
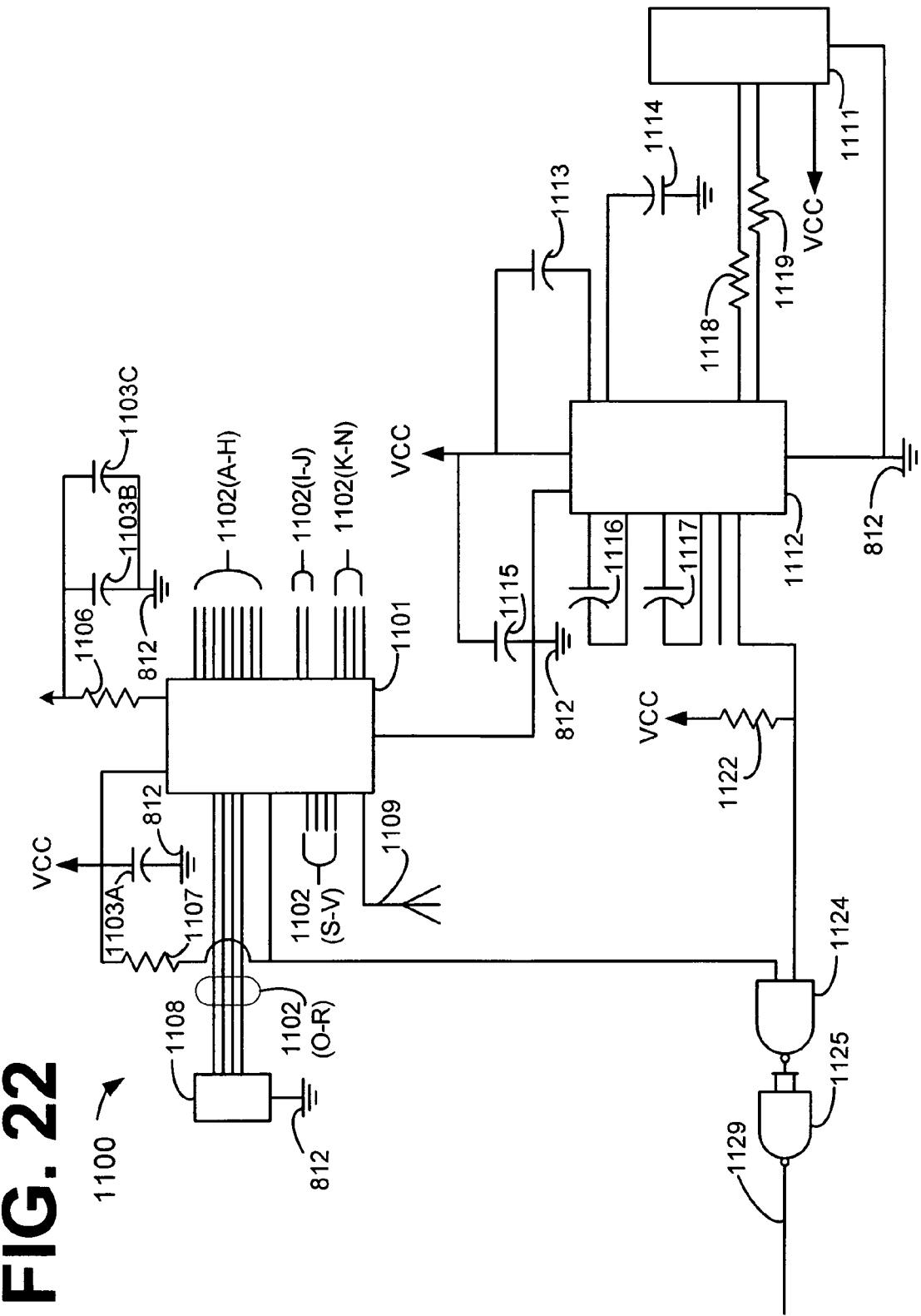
FIG. 22 is a schematic diagram illustrating an example of a transmitter component in the power quality monitoring the remote power monitoring system of the present invention, as shown in FIG. 2B.

FIG. 22 is a schematic diagram illustrating an example of a transmitter component 1100 in the power quality monitoring the remote monitoring system 100 of the present invention, as shown in FIG. 2B. Preferably, the transmitter component 1100 includes at least one mode of wireless communication. In the illustrated example shown below, the wireless communication described is the short-range Bluetooth communication system. However, other types of wireless communication can be utilized in conjunction with or instead of the Bluetooth communication system. The other types include, but are not limited to: WI-FI, cellular, RF and the like.

The transmitter component 1100 in this illustrated example has both a wireless Bluetooth interface comprising components 1101-1109, and wired RS-232 port comprising components 1111-1117. These interfaces are multiplexed with logic gates 1125 and 1124, and resistor 1122. Both interfaces are connected to the digital signal processor (DSP) 1410 (FIG. 25 A), allowing communication through either interface. DSP 1410 can also act as a bridge between the interfaces.

In addition, each interface (for example Bluetooth or RS-232) may be shut down at DSP 1410 control in order to save power in certain modes of operation. Module 1101 is preferably an embedded Bluetooth module which contains an on-board processor, FLASH memory, and RF interface and modulation circuitry (not shown). Module 1101 uses antenna 1109 to transmit and receive RF signals.

Capacitors 1103(A-C) filter the power supply lines so that RF transmission does not impose noise onto them. I/O lines 1102(A-H) are used to interface with the DSP 1410 so the DSP 1410 and Bluetooth module 701-109 can exchange setup and control parameters. The DSP 1410 can set Bluetooth parameters such as, but not limited to, a discovery name, idle time, baud rate, and other radio parameters via these I/O lines 1102(A-H). The Bluetooth module 701-709 can signal to the DSP 1410 that it is connected to a Bluetooth master, and is ready for data transmission. In the preferred embodiment, the DSP 1410 can thus sense whether inbound data is coming in through the Bluetooth module 1101 or the RS-232 port.

Other communication and control lines from module 1101 include a universal serial bus control lines 1102(I-J) and PC and pulse control modulation (PCM) signals 1102(K-N). In an alternative embodiment, the PCM signals 1102(K-N) can be used for voice or analog data communication. Module 1101 further includes communication and control lines for UART connections 1102(S-V), SPI control lines 1102(O-R). It is understood that other configurations of circuitry may be utilized to obtain the same result.

Transceiver 1112 is a voltage shifting chip which converts the RS-232 signal levels from connector 1111 to standard logical levels. Transceiver 1112 utilizes charge pump capacitors 1113-1117 to generate the RS-232 voltage levels. The logical-level signals are fed into logic gates 1124 and 1125. These logic gates combine the outputs from the Bluetooth module 1101 and transceiver 1112 so that only one may signal the DSP 910 at any one time. It is understood that other configurations of circuitry may be utilized to obtain the same result.

Figure 23:
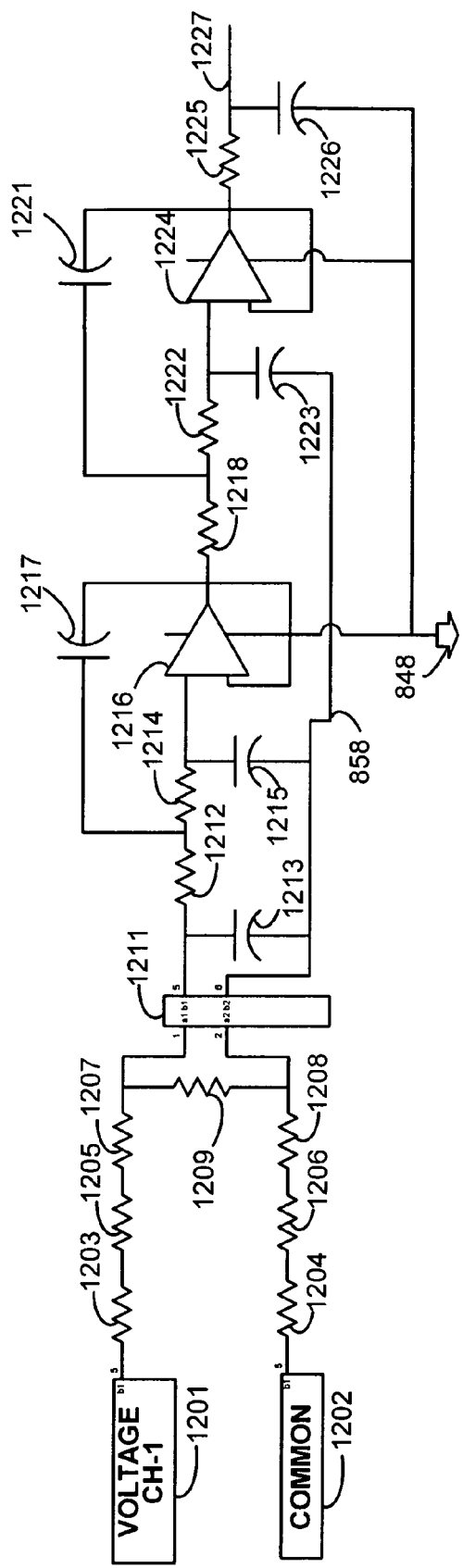
FIG. 23 is a schematic diagram illustrating an example of a voltage input and scaling component in the power quality monitoring the remote power monitoring system of the present invention, as shown in FIG. 2B.

FIG. 23 is a schematic diagram illustrating an example of a voltage input and scaling component 800 in the power quality monitoring of the remote monitoring system 100 of the present invention, as shown in FIG. 2C. This signal chain converts the 1000V max AC input into a low-voltage scaled, filtered signal suitable for digitizing by the voltage A/D converter for that channel.

Voltage is applied to terminals 801 and 802. The divider resistors 803-809 scale the voltage from up to 1000V down to around 1V that is suitable for further conditioning. It is understood that other configurations of circuitry may be utilized to obtain the same result. These divider resistors 803-809 also form an RC filter that protects isolators 931-932 and 933-934 (FIG. 24) from high voltage transients, in combination with transformer winding 421 (FIG. 19). Requirements for IEC Cat III demand protection from 15,000 volt transients; whereas the isolators used are only rated to 4000 volts, since higher voltage isolators suitable for this application do not exist.

The resistance of these divider resistors 803-809 combined with the winding capacitance of transformer winding 821 forms an RC circuit which filters the transient such that the peak voltage seen by the isolators is within their specifications. It is understood that multiple voltage input and scaling components are needed to monitor additional signals. For instances, at least three voltage input and scaling components are needed to monitor 3 phase circuits.

Figure 24:
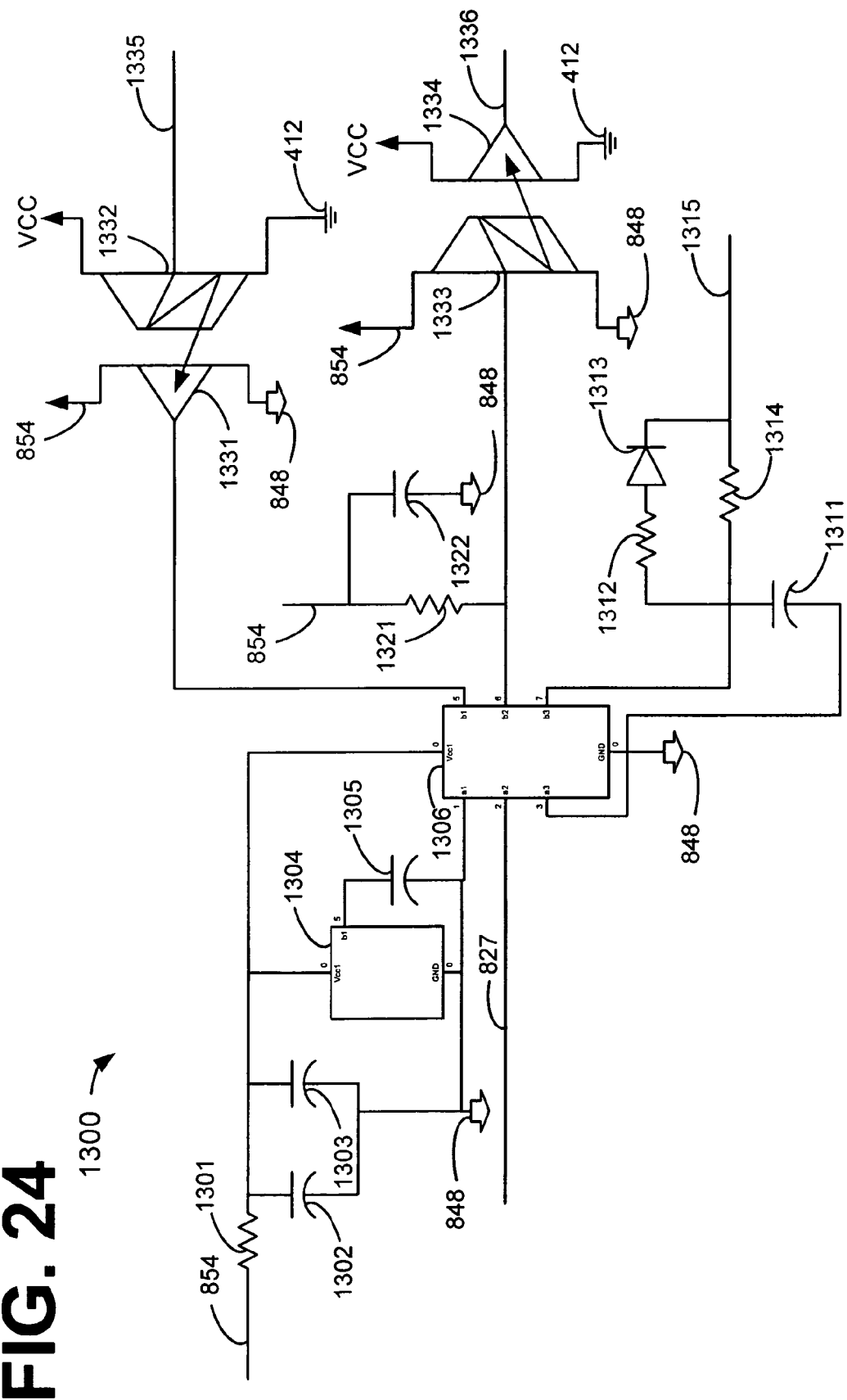
FIG. 24 is a schematic diagram illustrating an example of an A/D converter component in the power quality monitoring the remote power monitoring system of the present invention, as shown in FIG. 2B.

The circuitry 811-826 provides low pass filtering and analog signal conditioning using conventional techniques, before feeding the voltage signal 827 into the A/D converter 906 in FIG. 24. It is understood that other configurations of circuitry may be utilized to obtain the same result.

Current filtering and signal conditioning circuitry may be implemented utilizing well-known components or component 811 through 826 of the voltage input and scaling component 800 by utilizing slightly different values for the resistors and capacitors. When utilizing the circuit diagram of the voltage input and scaling component 800 for current filtering and signal conditioning, it would be obvious to one of ordinary skill in the art as to the approximate component values to acquire the desired bandwidth.

The FIG. 24 is a schematic diagram illustrating an example of an A/D converter component 1300 in the power quality monitoring of the remote monitoring system 100 of the present invention, as shown in FIG. 2C. This device digitizes the incoming analog signal for processing with the signal processing component of FIG. 25A, using conventional techniques.

In order to achieve the required size and performance, three conventional control lines needed to interface the A/D converter to the signal processor could not be used. In the preferred embodiment, a novel multiplexing scheme was devised to derive the A/D chip select signal for A/D converter 1306 from the A/D clock signal for A/D converter 1306, using a combination of RC delays and a diode, as shown in FIG. 24.

When the clock signal goes low, the RC constant formed by capacitor 1311 and resistor 1312 insures that the chip select line on A/D converter 1306 goes low for at least 55 nanoseconds after the clock line, thus meeting required setup times on the A/D converter. As the A/D clock toggles high and low, the RC time constant formed by resistor 1314 and capacitor 1311, in combination with diode 1313 insures that the chip select line stays low during the entire A/D conversion sequence. This is provided that the clock period is significantly faster than the RC time of approximately 6 microseconds.

When the conversion is complete, the clock line on A/D converter 1306 gets asserted (i.e. goes high), and approximately 6 microseconds later, the chip select on A/D converter 1306 gets de-asserted (i.e. goes high), thus deselecting the A/D converter 1306, and making it ready for a new conversion. In this way, a separate chip select signal is not needed, and a prior required third digital isolator is eliminated. It is understood that other configurations of circuitry may be utilized to obtain the same result.

Digital isolators represented by component pair 1331-1332 and 1333-1334 maintain galvanic isolation between each of the voltage channels and the remaining circuitry of the remote monitoring device 100.

Figure 25A:
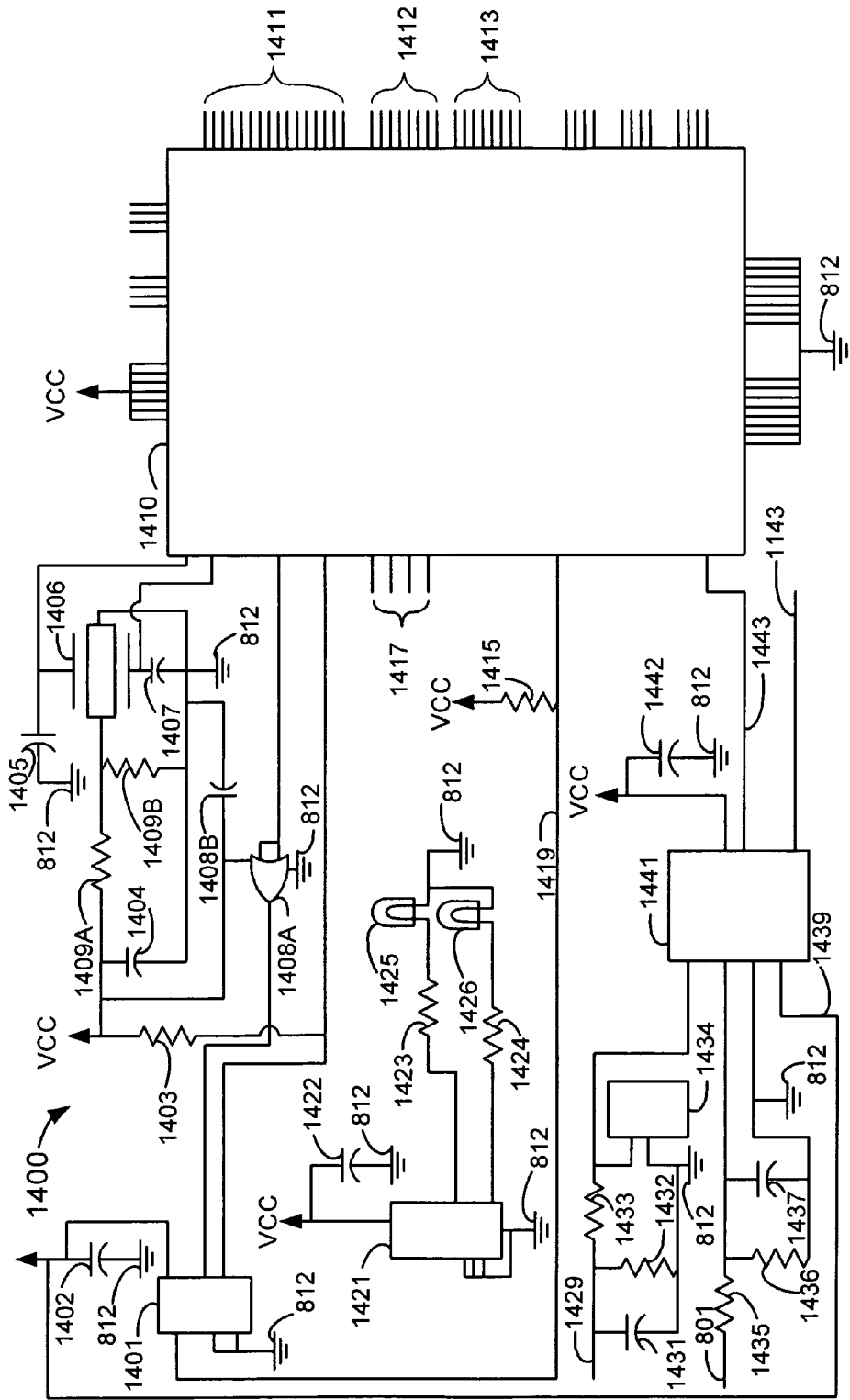
FIG. 25A is a schematic diagram illustrating an example of a signal processor component in the power quality monitoring the remote power monitoring system of the present invention, as shown in FIG. 2B.

FIG. 25A is a schematic diagram illustrating an example of a signal processor component in the power quality monitoring of the remote power monitoring system of the present invention, as shown in FIG. 2B. This processor (DSP) 1410 handles all signal processing, measurement, recording, and communications functions. It also decides when to switch to rechargeable battery power (based on the absence of power supply voltage from a wall adapter or voltage on channel one), and when to shut itself off to avoid complete discharge of the battery.

In the preferred embodiment, a real-time clock 1401 is used to store accurate system time. This real-time clock 1401 is battery-backed by a 3V lithium battery in the preferred embodiment. The once-per-second output 1419 from real-time clock 1401 is fed to the DSP through pull-up resistor 1415. The DSP 1410 uses this once-per-second output 1419 from real-time clock 901 to start the one-second tasks.

An input/output (I/O) expander 1421 provides for extra I/O lines for the DSP 910. These extra I/O lines can be utilized for expanded addresses for data lines. The light emitting diodes (LEDs) 1425 and 1426 provide indicators to the user of device state through different color combinations and blinking rates. In the preferred embodiment, LEDs 1425 and 1426 are integrated into a single LED. Other outputs from I/O expander 1421 include charge and shutdown lines (not shown) to the rechargeable battery 1434, and interface lines (not shown) to the wireless Bluetooth module. It is understood that other configurations of circuitry may be utilized to obtain the same result.

A power supervisory chip 1441 provides the master reset output 1503, and gives a low power warning to the DSP 1410 through the PFO line 1443. The power supervisory chip 1441 senses the system VCC voltage, and the B+ voltage 801 (FIG. 10) through the resistive divider of resistors 1435 and 1436, which is filtered by capacitor 1437. If the B+ voltage 801 drops to a low level, the power supervisory chip 1441 asserts the warning on PFO line 1443 to the DSP 1410.

The power supervisory chip 941 also feeds the 3V battery 1434 voltage to the SRAM and real time clock 901 through the VBACK line 1439. When the VCC voltage drops to a low level, the power supervisory chip 1441 switches the VBACK line 1439 from VCC to the voltage in battery 1434 on line 1429. This battery voltage is also divided by resistors 1432 and 1433 for sensing by the DSP 1410 through an auxiliary A/D. The user is warned then the voltage in battery 1434 is too low to maintain memory and time. It is understood that other configurations of circuitry may be utilized to obtain the same result.

The crystal 906 forms an oscillator using capacitors 1405 and 1407, along with the DSP 910. This oscillator drives the DSP 1410, and may also be the reference oscillator for any frequency measurement. It is understood that other configurations of circuitry may be utilized to obtain the same result.

Memory lines 1411 and 1413 provide addressing for SRAM 1521 and flash 1501 memory (FIG. 25B); while data lines 1412 provide data to the memory devices. The memory is herein described in further detail with regard to the description of FIG. 25B.

Figure 25B:
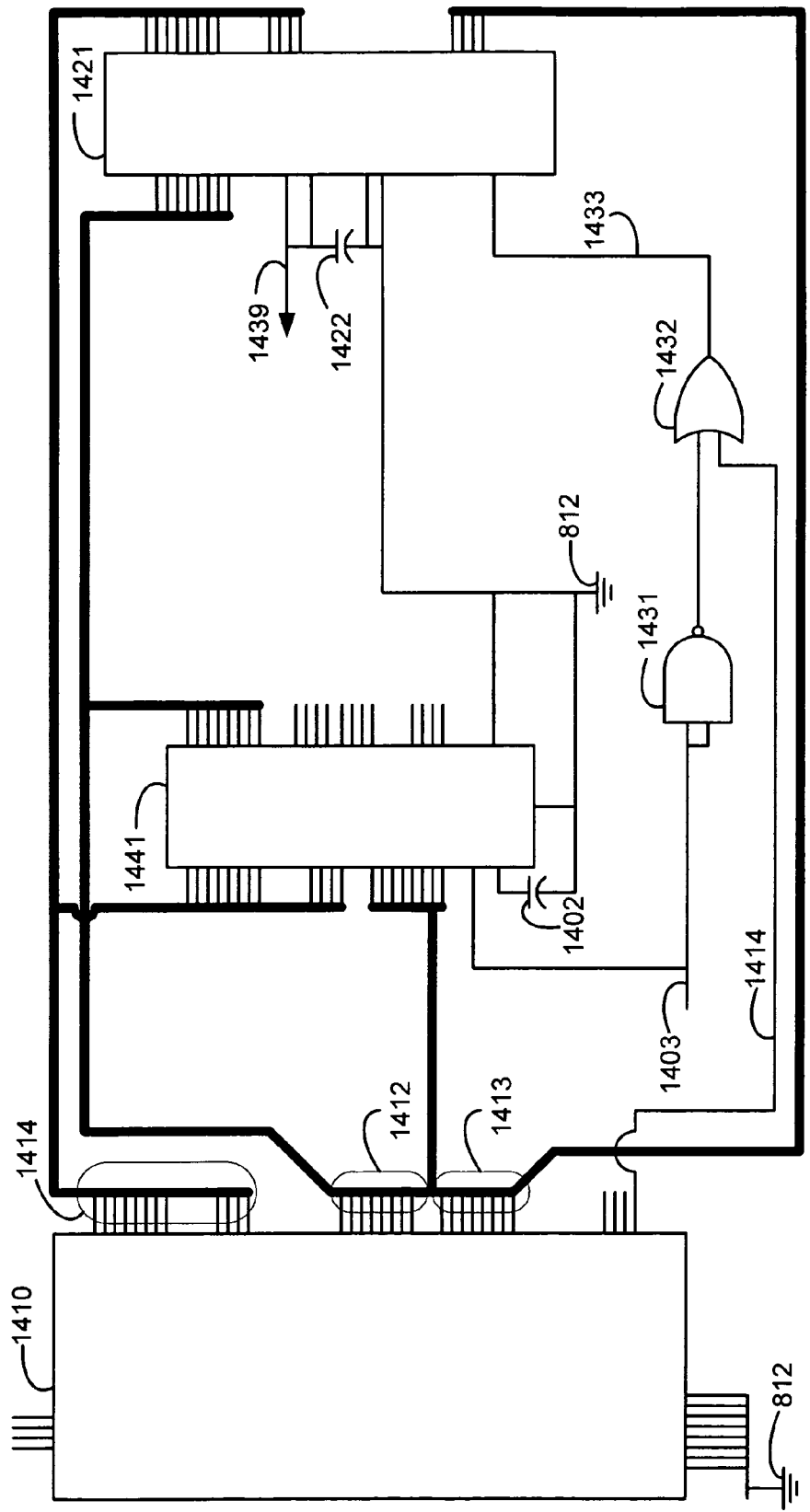
FIG. 25B is a schematic diagram illustrating an example of a fast volatile memory and static memory components connect to the signal processor component in the power quality monitoring the remote power monitoring system of the present invention, as shown in FIG. 2B.

FIG. 25B is a schematic diagram illustrating examples of a fast non-volatile memory, i.e. flash memory 1501, and static memory 1521 components. These components connect to the DSP 1410 in the power quality monitoring of the remote monitoring system 100 of the present invention, as shown in FIG. 2B. Flash memory 1501 and static memory 1521 components examples are illustrated with a limited number of address and data lines for simplicity of illustration only, and it is understood that any number of such address and data lines are utilized in these components. This memory 1500 is used to store executable code, scratchpad variables, setup parameters, status, and recorded data.

In the preferred embodiment, flash memory 1501 stores both firmware code and recorded data using two independent banks. Calibration data can also be stored in flash memory 1501, in a separate memory page. SRAM chip 1521 is utilized to store other recorded data, in addition to scratchpad and temporary values. Data which changes quickly (histogram data, waveform capture, etc.) are stored in SRAM 1521, while data which changes or is updated slowly is stored the flash 1501. Preferably, data is stored as strip chart data. Gates 1531 and 1532 insure that the SRAM 1521 is not enabled during a reset condition using not reset signal 1503 to avoid false writes during startup or bad power conditions. The not reset signal 1503 is generated by the power supervisory chip 1441 (FIG. 25A). The flash memory 1101 has internal circuitry to utilize the not reset signal 1503.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It will be apparent to those skilled in the art that many modifications and variations may be made to embodiments of the present invention, as set forth above, without departing substantially from the principles of the present invention. All such modifications and variations are intended to be included herein within the scope of the present invention, as defined in the claims that follow.

What is claimed is:

1. A method for providing remote control of a power device, the method comprising:
   directly coupling a monitoring device to the power device;
   acquiring an operating status data of the power device positioned in a hazardous location with the monitoring device, wherein acquiring the operating status includes directly sampling a physical characteristic of the power device with input and signal conditioning circuitry of said monitoring device; and
   transmitting control information to the power device, the power device being a high voltage power device.

2. The method of claim 1, further comprising the step of:
   displaying the operating status data describing a power condition of the power device.

3. The method of claim 1, further comprising the steps of:
   receiving a request from a service device to display a system parameter from the power device; and
   sending the request for the system parameter to the power device.

4. The method of claim 3, wherein the system parameter is a current system parameter.

5. The method of claim 3, wherein the system parameter is a default system parameter.

6. The method of claim 1, further comprising the steps of:
   receiving a request from a service device to adjust a system parameter in the power device; and
   sending the request to adjust the system parameter to the power device.

7. The method of claim 6, further comprising the step of:
   providing adjustment of the system parameter in the power device.

8. The method of claim 6, further comprising the step of:
   determining an operating status for the power device from a power condition of the power device.

9. The method of claim 1, further comprising the step of:
   acquiring a plurality of set points of the power device; and
   computing an operating region of the power device with the plurality of set points.

10. The method of claim 9, further comprising the step of:
    providing a command to the power device to provide a requested data.

11. The method of claim 1, wherein the control information is a switch open instruction.

12. The method of claim 1, wherein the control information is a switch close instruction.

13. The method of claim 1, wherein the control information is selected from the group consisting of block open switch instruction, clear block open switch instruction, protective close switch instruction, and clear protective close switch instruction.

14. A system providing remote control of a power device, comprising:
    a monitoring device directly coupled to the power device;
    a service device further comprising a receiver circuitry that receives operating status data of the power device from the monitoring device, wherein the operating status is acquired by directly sampling a physical characteristic of the power device with input and signal conditioning circuitry of said monitoring device, the power device being positioned in a hazardous location and the service device being configured to receive the operating status data of the power device at a non-hazardous location;
    a data input circuitry to accept control information from a user; and
    a transmitter circuitry to transmit the control information to the power device.

15. The system of claim 14, further comprising:
    a display circuitry that displays the operating status data describing a power condition of the power device.

16. The system of claim 14, further comprising:
    a display circuitry that displays a system parameter of the power device, and wherein the transceiver receives the system parameter from the power device.

17. The system of claim 16, wherein the system parameter is a current system parameter.

18. The system of claim 16, wherein the system parameter is a default system parameter.

19. The system of claim 14, further comprising:
    a set point acquisition circuitry that acquires a plurality of set points of the power device; and
    a computation circuitry that determines an operating region for the power device from a power condition of the power device.

20. The system of claim 19, wherein the control information is a switch open instruction.

21. The system of claim 19, wherein the control information is a switch close instruction.

22. The system of claim 19, wherein the control information is selected from the group consisting of block open switch instruction, clear block open switch instruction, protective close switch instruction, and clear protective close switch instruction.

23. The system of claim 14, further comprising:
    a computation circuitry that determines an operating status for the power device from a power condition of the power device.

24. A system providing remote control of a power device, comprising:
- a monitoring device directly coupled to the power device further comprising a transceiver circuitry that receives an instruction from a service device to display a system parameter from the power device, wherein the monitoring device is configured to directly sample, with input and signal conditioning circuitry of said monitoring device, a physical characteristic of the power device positioned in a hazardous location; and
- a control circuit that sends the request for the system parameter to the power device, the power device being a high voltage power device.

25. The system of claim 24, wherein the transceiver receives a request from the service device to adjust a system parameter from the power device; and wherein the control circuit sends the request to adjust the system parameter to the power device.

26. The system of claim 24, wherein the control circuitry provides adjustment of the system parameter in the power device.

27. The system of claim 24, wherein the control circuitry provides a command to the power device to provide a requested data.

28. A system for providing remote control of a power device, comprising:
- means for acquiring an operating status data of the power device positioned in a hazardous location, wherein the means for acquiring the operating status includes means for directly sampling a physical characteristic of the power device with input and signal conditioning circuitry of said monitoring device; and
- means for transmitting control information to the power device, the power device being a high voltage power device.

29. The system of claim 28, further comprising:
- means for displaying the operating status data describing a power condition of the power device.

30. The system of claim 28, further comprising:
- means for receiving a request from the service device to display a system parameter from the power device; and
- means for sending the request for the system parameter to the power device.

31. The system of claim 30, wherein the system parameter is a current system parameter.

32. The system of claim 30, wherein the system parameter is a default system parameter.

33. The system of claim 28, further comprising:
- means for receiving a request from the service device to adjust a system parameter in the power device; and
- means for sending the request to adjust the system parameter to the power device.

34. The system of claim 28, further comprising:
- means for providing adjustment of the system parameter in the power device.

35. The system of claim 28, further comprising:
- means for acquiring a plurality of set points of the power device; and
- means for computing an operating region of the power device with the plurality of set points.

36. The system of claim 28, further comprising:
- means for determining an operating status for the power device from a power condition of the power device.

37. The system of claim 28, wherein the control information is a switch open instruction.

38. The system of claim 28, wherein the control information is a switch close instruction.

39. The system of claim 28, wherein the control information is selected from the group consisting of block open switch instruction, clear block open switch instruction, protective close switch instruction, and clear protective close switch instruction.

40. The system of claim 28, further comprising:
- means for providing a command to the power device to provide a requested data.

41. A system for providing remote control of a power device, comprising:
- logic for acquiring an operating status data of the power device positioned in a hazardous location, wherein the logic for acquiring the operating status includes logic for directly sampling a physical characteristic of the power device with input and signal conditioning circuitry of said monitoring device; and
- logic for transmitting control information to the power device, the power device being a high voltage power device.

42. The system of claim 41, further comprising:
- logic for displaying the operating status data describing a power condition of the power device.

43. The system of claim 41, further comprising:
- logic for receiving a request from the service device to display a system parameter from the power device; and
- logic for sending the request for the system parameter to the power device.

44. The system of claim 43, wherein the system parameter is a current system parameter.

45. The system of claim 43, wherein the system parameter is a default system parameter.

46. The system of claim 41, further comprising:
- logic for receiving a request from the service device to adjust a system parameter in the power device; and
- logic for sending the request to adjust the system parameter to the power device.

47. The system of claim 41, further comprising:
- logic for providing adjustment of the system parameter in the power device.

48. The system of claim 41, further comprising:
- logic for acquiring a plurality of set points of the power device; and
- logic for computing an operating region of the power device with the plurality of set points.

49. The system of claim 41, further comprising:
- logic for determining an operating status for the power device from a power condition of the power device.

50. The system of claim 41, wherein the control information is a switch open instruction.

51. The system of claim 41, wherein the control information is a switch close instruction.

52. The system of claim 41, wherein the control information is selected from the group consisting of block open switch instruction, clear block open switch instruction, protective close switch instruction, and clear protective close switch instruction.

53. The system of claim 41, further comprising:
- logic for providing a command to the power device to provide a requested data.

* * * * *